United States Patent [19]

Segarra et al.

[11] 4,396,983

[45] Aug. 2, 1983

[54] DISTRIBUTED DATA PROCESSING SYSTEM HAVING SEVERAL LOCAL SYSTEM AND COMMUNICATION MODULES FOR USE IN SUCH DATA PROCESSING SYSTEM

[75] Inventors: Gerard Segarra, Jossigny; Francois J. Phulpin, Boussy Saint Antoine, both of France

[73] Assignee: U.S. Philips Corporation, New York, N.Y.

[21] Appl. No.: 216,105

[22] Filed: Dec. 15, 1980

[30] Foreign Application Priority Data

Dec. 21, 1979 [FR] France ................. 79 31468

[51] Int. Cl.³ ............... G06F 15/16; G06F 15/56
[52] U.S. Cl. ................................. 364/200
[58] Field of Search ............. 364/200; 370/86, 88, 370/90

[56] References Cited

U.S. PATENT DOCUMENTS 4,031,512 6/1977 Faber ...................... 364/200 X
4,271,468 6/1981 Christenson ............... 364/200
4,315,310 2/1982 Bayliss et al. .............. 364/200

*Primary Examiner*—Harvey E. Springborn
*Attorney, Agent, or Firm*—James J. Cannon, Jr.

[57] ABSTRACT

A distributed data processing system including a general, passive, communications network, and a plurality of local systems which each have a central processing unit, associated memory, and at least one peripheral device. The control of the intercommunication is effected by respective system intercommunication processors, each interfacing one local system to the network. Each systems intercommunications processor is attached to the network by means of a respective communication module. A communication module has sequences for controlling in a first sequence of steps an addressed logical link from a source local system to a single destination local system and in a second sequence of steps controlling a broadcast logical link from a source local system to one or more destination local systems. The sequences include a plurality of conditionally executable steps, namely, logical link establishing steps, logical link maintaining steps, logical link closing steps, logical link breaking steps, error detection and retrying steps, and logical link cancelling steps. For establishing a broadcast logical link the source station does not need to know initially either the number of connected links or the number of potential destination stations. All establishing steps comprise inherent priority level signalizations. In a destination station conflicts are resolved by choosing a higher priority addressed logical link over a lower priority addressed logical link and a broadcast logical link over any addressed logical link.

14 Claims, 46 Drawing Figures

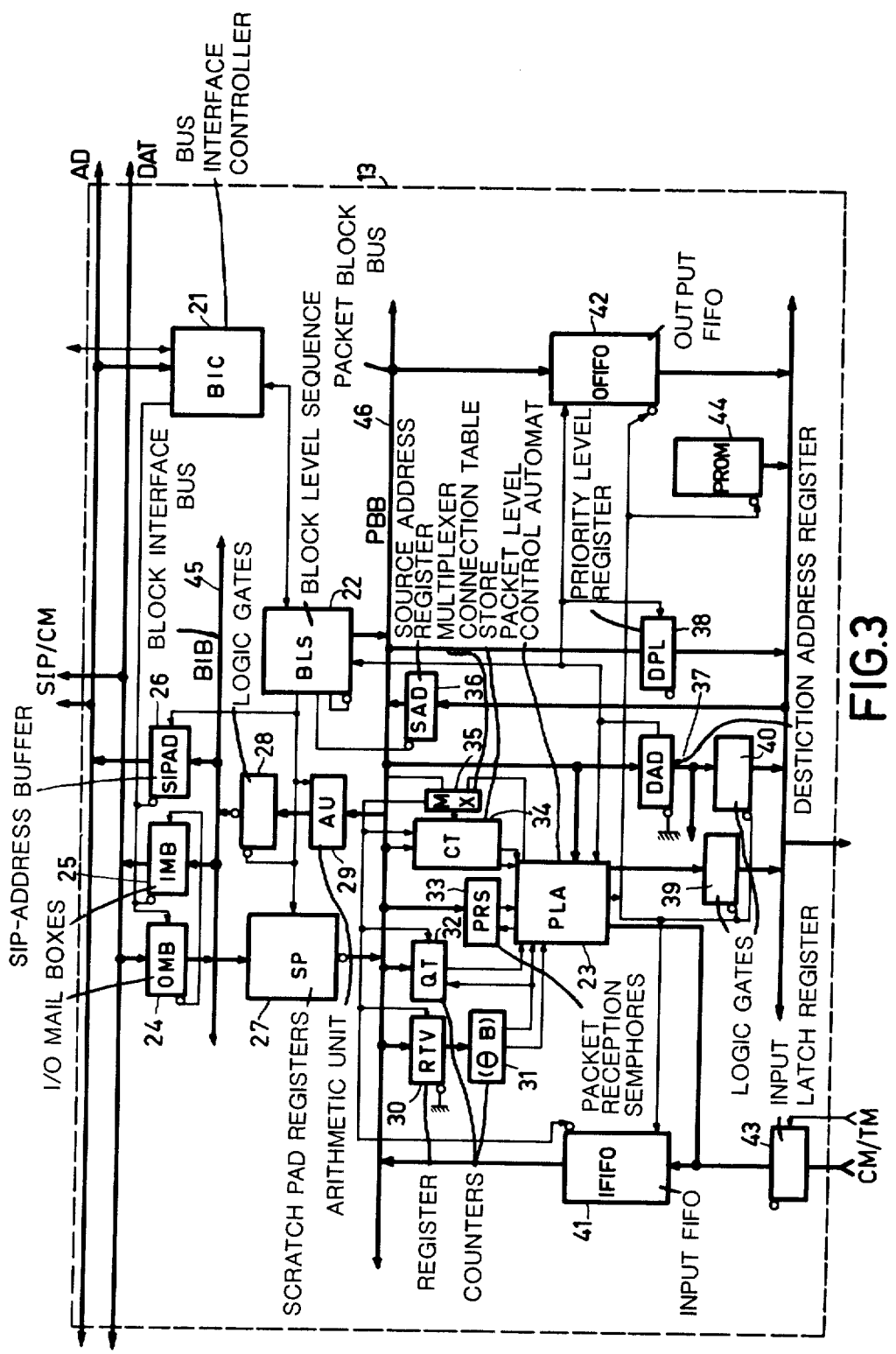

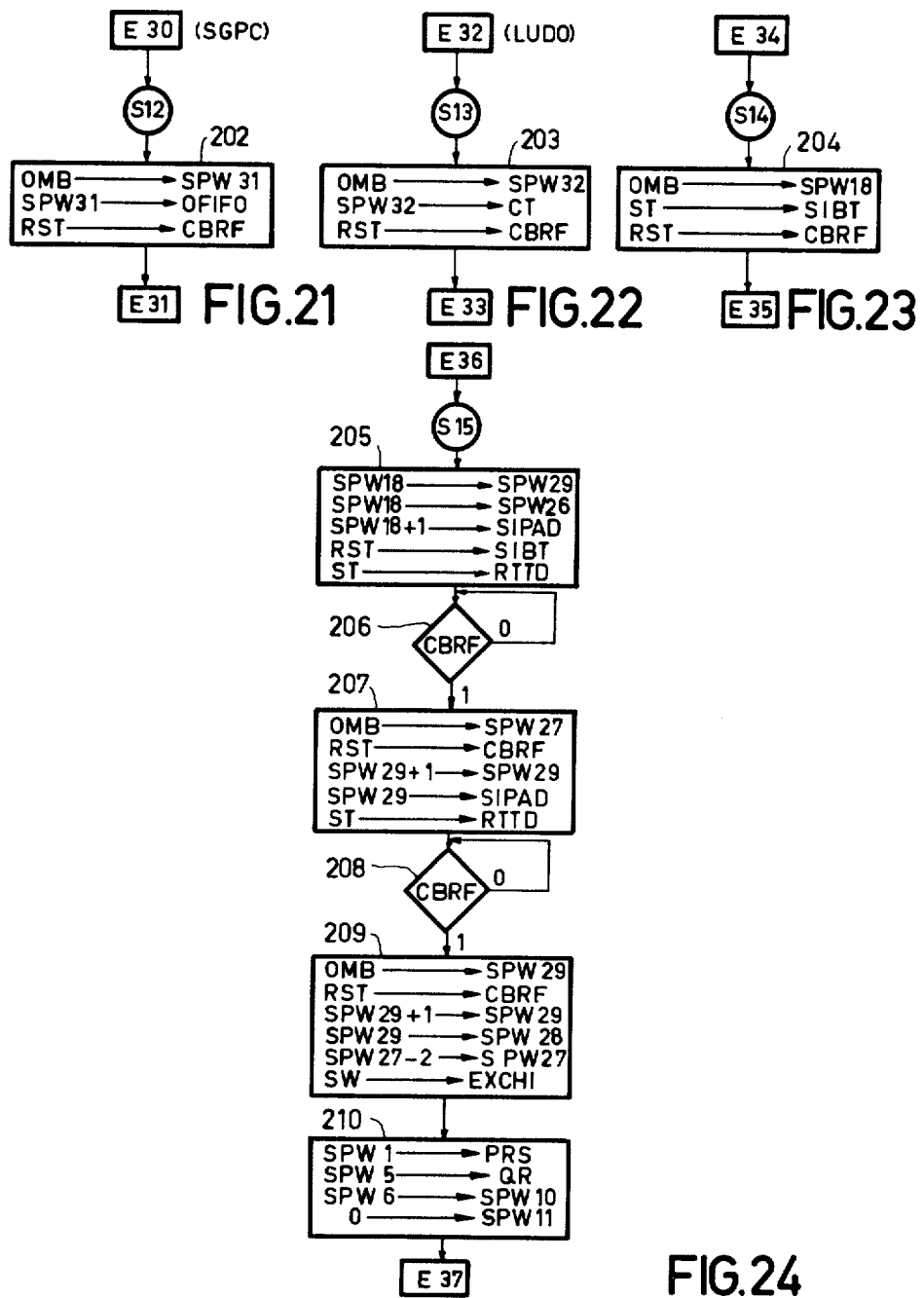

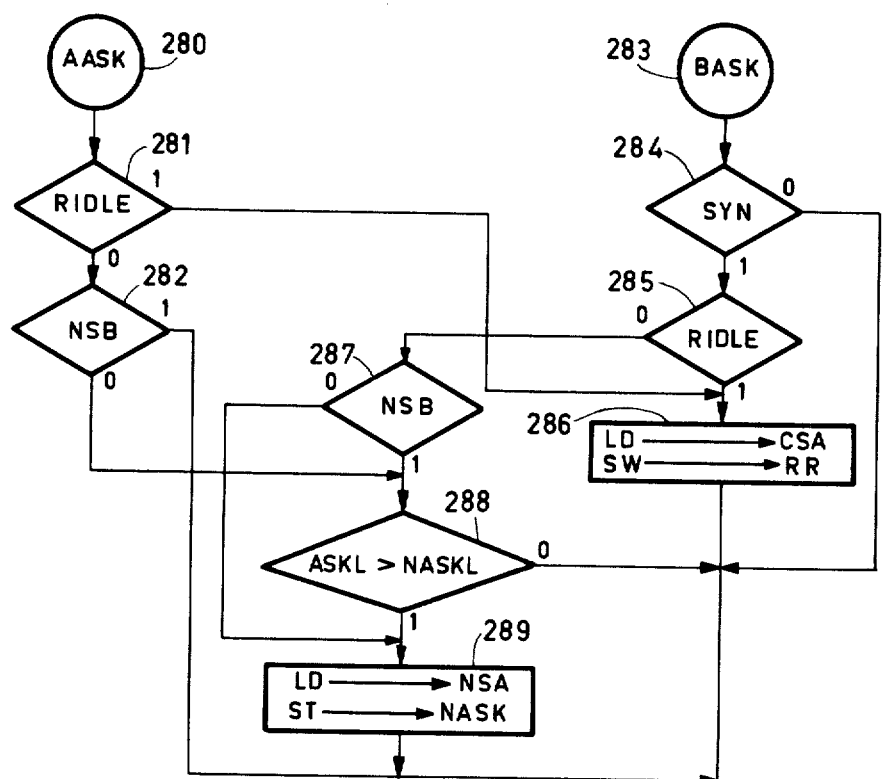
FIG.34a
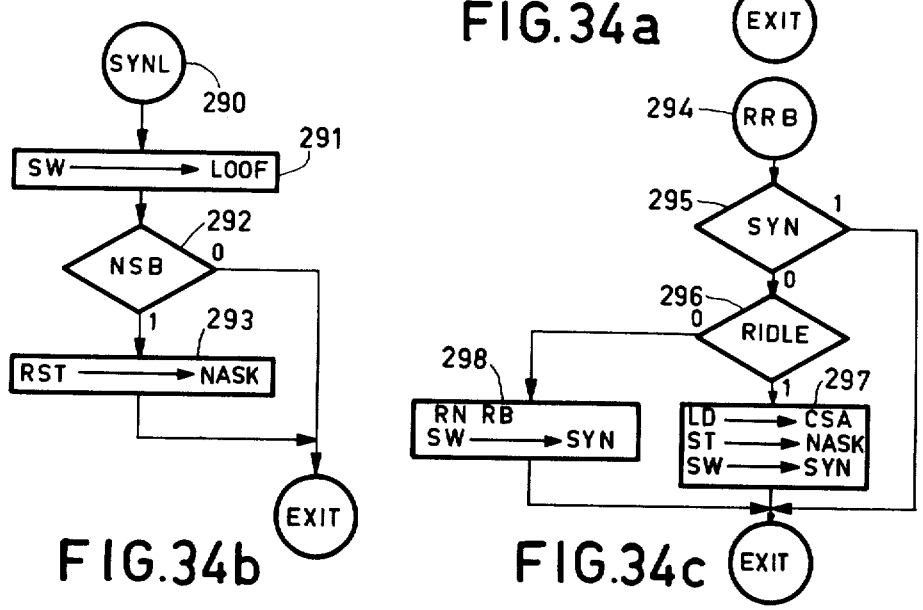
FIG.34b
FIG.34c

DISTRIBUTED DATA PROCESSING SYSTEM HAVING SEVERAL LOCAL SYSTEM AND COMMUNICATION MODULES FOR USE IN SUCH DATA PROCESSING SYSTEM

BACKGROUND OF THE INVENTION

1. Field of the Invention

This invention relates to a distributed data processing system having a passive communications network, several local systems, each local system including at least one central processing unit with associated stores, peripherals and processes, the coordination between said local systems being managed by systems intercommunication processors situated in a functional coordination layer of said distributed system and the communication between local systems occurring via a general communications network controlled by said communications protocols.

2. Description of the Prior Art

Technological progress in the field of integrated circuits (LSI) and their low cost has resulted in an evolution in the architecture and use of dataprocessing systems towards distributed systems. In distributed data processing systems there is a tendency towards subsystems exclusively devoted to users, others for the management of the resources of the distributed system and still others for managing communications between the various local subsystems connected to the general communications network.

Monitoring the communications between the local systems in a distributed system necessitates the creation of well defined communication protocols.

The main differences between the communications protocols of this invention and those of the prior art, e.g. "High level data link procedures", ref. ISO/TC 97/SC6, Data Communication Secretariat U.S.A. (ANSI) are given below.

SUMMARY OF THE INVENTION

This invention comprises two communications modes, an addressed mode and a broadcast mode, the latter allowing a local system to call all the other local systems linked to the communications network without the need for preliminary identification of the addressed local systems. The local systems then all detect the same global sequence of system events, i.e. the behavior of all of them is based on the same events received in the same order. There is a maximum time within which every local system called must reply, and this time may be changed depending upon the average packet size of the collection of tasks to be processed.

The present invention makes it possible for any local system to communicate directly with any other local system without passing via a "primary" system. A source local system can only monopolize a destination local system for a defined time period. There are no privileged local systems, i.e. decentralization is total. In the event of conflicts, once a priority has been allocated, communications are carried out as a function of a logical priority at dynamic communications level.

In addition, communications protocols are managed in this invention by specialized communications modules located in a functional communications layer of the distributed system. Other differences between this invention and the prior art cited will clearly be shown in the detailed description of an embodiment.

This invention is designed for use in a distributed system with the following characteristics:

- the distributed system is medium-scale type (MSDS) capable of interconnecting several tens of local systems on the general communications network and dealing with a collection of different applications;
- the general communications network used for communication between the local systems is an optical bus (loop or star);
- the transmission rate on the optical bus permits full duplex transmission of 300 kwords/second (16 bits/-word) per local system; (this should not be implied to recite a strict limitation;)
- the physical characteristics of the optical bus limit the distribution of the local systems to distances of a few kilometers.

The subject of this invention is specifically directed to the communications protocols managed by the communications modules (CM) located in a functional communication layer, situated between the functional coordination layer managed by the intercommunications processors (SIPs) and the communications network of the distributed system. The coordination layer managed by the SIP forms the subject of U.S. patent application Ser. No. 202,809, filed Oct. 31, 1980.

In the present invention said communications protocols are managed by communications modules (CMs) located in a functional communications layer between said coordination layer and said communications network, each of said CMs comprising specialized hardware and software controlling the addressed and broadcast logical links as well as error detection and recovery procedures of said communications protocols between said source and destination local systems (LSs), said logical links also comprising:

- protocol phases for establishing, maintaining, closing, breaking, retrying and cancelling said addressed and broadcast logical links, said broadcast links having a higher priority than said addressed links;
- broadcast mode for allowing any source to call, using a supervision word (BASK), all the destinations connected to said communications network without having to know either the number of said connected links or that of said destinations which are capable of replying positively to said broadcast call (BASK);
- broadcast mode selection allowing all said destinations to select the same following logical link;
- broadcast mode synchronization allowing all said destinations to observe the same global order of events in order to prevent the dispersion of said broadcast logical links;
- broadcast mode permitting desynchronized destinations to resynchronize themselves by analyzing the behavior of the synchronized destinations;
- preventing the monopolizing of a destination by a source by defining the duration ($\theta T$) of a logical link in which the positive or negative replies of the destinations are guaranteed, and by granting the next logical link as a function of the logical priority level of the calling source, said duration ($\theta T$) being modifiable;
- said error detection and recovery procedures also including retrying an erroneous transmission until it succeeds or abandoning it if the number of erroneous retries reaches a predetermined value.

An initial objective of this invention is to provide communications protocols capable of accommodating in a flexible and efficient manner to the requirements of the defined MSDS, allowing for a set of different applications with a high transmission rate per local system (LS) and on the overall system. The definition of the broadcast and addressed logical link modes provide this flexibility. For example, the broadcast mode, which has a higher priority than the addressed mode, is particularly effective in updating multiple files in a data base application, or to locate quickly the resources requested by an LS in a real-time application. The addressed mode is effective when a (source) LS wishes to communicate with another (destination) LS. The broadcast mode may, for instance, be used to locate certain resources requested, and the addressed mode thereafter to communicate efficiently with said located resources.

Another objectives allows a source to call all the destinations in the broadcast mode without knowing the number of destinations connected to the network, providing a very efficient method of communication which minimizes overhead.

A further objective is to provide great flexibility in the broadcast mode. Thus a broadcast mode call with no waiting time makes it possible for a source to identify all the destinations which can reply positively within the time period of a single call (used in real-time applications).

Yet another objective is to ensure that every destination gives a positive or negative reply within a given time $\theta T$, so that a source does not wait unnecessarily when a destination is not ready. $\theta T$, which defines the duration of a logical link, is programmable as a function of the packet size and the transmission speed, and thus may be adapted for a set of applications to implement the optimal logical link.

Yet another objective is to present in the broadcast mode the same order of global events to all LSs, so that each LS has a corresponding view of the overall state of the distributed system, because usually the operations within a local system provide only partial information of the overall operations in the system. This allows a desynchronized destination local system to resynchronize itself by observing the behavior of the synchronized destinations.

Another objective is to maintain the implicit logical links, which is an effective means of communication. After a logical link has been established, the end of the transfer of the packet concerned, if it is not the end of the message, contains an implicit request by the source for the next logical link which is automatically selected by the destination if there is no higher-priority request active.

A further objective permits synchronization of the destinations by a source before a broadcast call is sent. This can be useful when it is necessary to update all destinations and to ensure positive replies to a broadcast call with a waiting time.

Yet another objective is to prevent the monopolizing of a destination by a source by the definition of a duration $\theta T$ for a logical link, the next logical link being selected as a function of the priorities of the calling sources.

Facilities for retrying, up to a predetermined value, either of a call when a destination is not ready to receive or of the transmission of a packet when an error is detected adds flexibility and a certain independence of action at the level of the CM. The number of retries of a call or transmission of erroneous packets may be programmed in the counters concerned as a function of occupation of the overall system (number of applications, of communications, etc.) without any perturbation of operation of the higher level of the data processing system except when the impossibility of making a call or transmission has been established.

By and large, it is the main purpose of the invention to minimize at the system level the interference caused by the connections, disconnections or failures of the individual LS.

The MSDS characteristics listed hereinbefore limit the full duplex flow rate at the LS and thus at the CM to 300 kwords/sec. This flow rate is intended to increase in future when new technologies result in better optical buses and the use by the LS of a new, higher performance range of computers. Hence, the performance of the CM, which is microprogrammed, may be improved by the replacement of the present components by higher-performance ones (e.g. microprogrammed automats, read/write read/only stores, etc.) while retaining the same architectural philosophy (instructions, interfaces, control etc.).

These advantages and certain others of this invention will clearly be shown in the following description of an embodiment. The description refers to the P 800 series of mini and microcomputers made by Philips Data Systems. Only the architecture of the P 800 as it applies to this invention (the input/output commands, for instance) is described. The detailed descriptions of the P 800 architecture may be found in the cited references.

BRIEF DESCRIPTION OF THE DRAWINGS

A brief description of the figures is given.

FIG. 3 is a block diagram of the communications module (CM) showing the main components and their connections;

FIGS. 10 to 30 are flow charts describing the control sequences of the communications protocols executed by the BLS;

FIGS. 34a, 34b and 34c are flow charts showing the selection mechanisms controlled by the reception automat (RA);

The Appendix contains:
(1) a description of the physical interface between the SIP and the CM;
(2) a description of the physical interface between the CM and the TM.

The architecture of the P 800 microcomputers is described in the references below published by Philips Data Systems:

| P 856M/P857M | CPU Service Manual | 5111-991-2695X |
| P 856M/P857M | System Handbook | 5122-991-26931 |
| P 851M | Vol. I CPU & Memories Technical Manual | 5122-991-28073. |

DESCRIPTION OF THE PREFERRED EMBODIMENT

Figure 1:
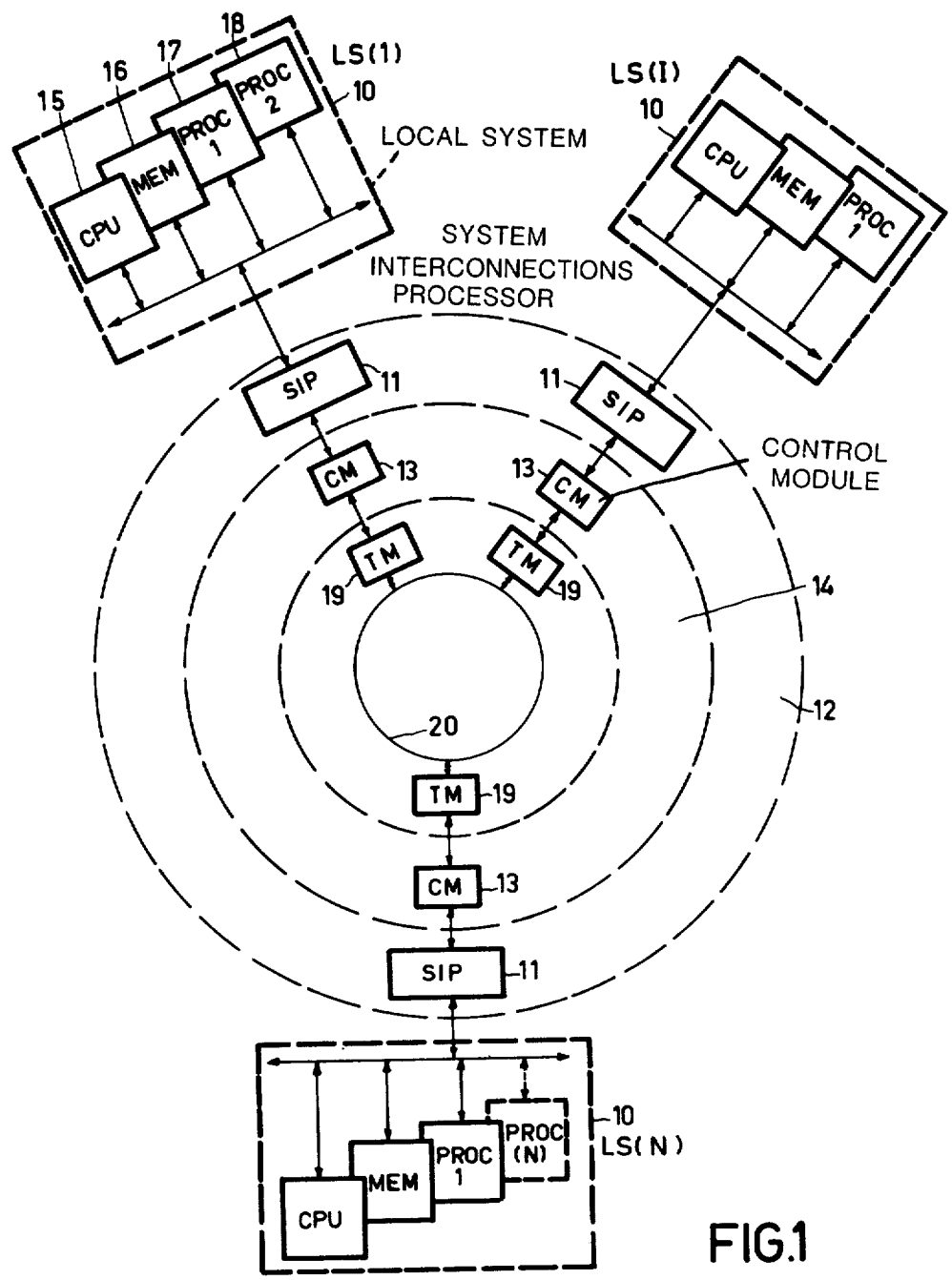
FIG. 1 is a synoptic diagram of a distributed data processing system showing the main subsystems and functional layers.

In FIG. 1, items 10 represent the various local systems (LS1 ... LSI ... LSN). The systems intercommunication processor SIPs corresponding to each LS are represented by 11 and are located in the functional coordination layer represented by 12. The SIPs are described in copending U.S. patent application Ser. No. 202,809, filed Oct. 31, 1980. The communications modules (CMs) 13 for controlling the communcations protocols between the various LSs are located in the functional communications layer 14.

The CMs communicate with the communications network 20, which is an optical bus, via transport modules (TMs) 19, which effect the initialization, reception and emission of information at the optical bus.

An LS 10 may consist of various components. LS(1), for instance, is made up of CPU 15, main read/write and read only stores 16 and processes 17 and 18. An user task may consist of several processes and may be distributed over several LSs for reasons of economy and security.

Firstly an explanation will be given of the basic philosophy of the communications protocols managed by the CM, followed by a description of the exchange mechanisms between the SIP and the CM, and then a description will be given of the architecture of the CM followed by a detailed description of the control of the communications protocols with reference to the associated figures and flow charts.

The communications protocols managed by the CM ensure the exchange of information and cooperation between the various LSs connected to the communications network, on the basis of the following principles.

Any LS may at any time initiate communication with one or several other LS.

When several LSs are addressed by the same message, the message is transmitted only when all the LSs are ready to receive it.

The coherence of the message is ensured whatever the information flow rate of the various LSs.

The same global order of events is maintained at each LS.

Neither the connection nor disconnection, nor the failure, nor the difference in information flow rate of an LS with respect to another LS any interference at the other LS.

The main purpose of the communications protocol is to identify the partners concerned in a communication and to maintain message coherence throughout the communication. To avoid any overhead due to the formal procedures and to control the information flow rate, the "two-party" communications protocol uses a logical link concept between partners. This means that, after the identification of the partners involved and the acceptance of the link by the destinations concerned, a message may be exchanged without the need for further identification and acceptance until the end of the logical link.

Figure 2A:
FIGS. 2a-2d shows the permissible logical links.
Figure 2B:
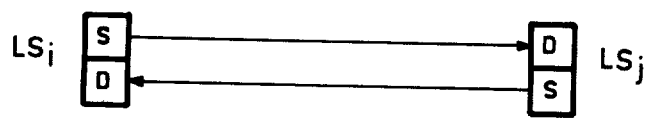
Figure 2C:
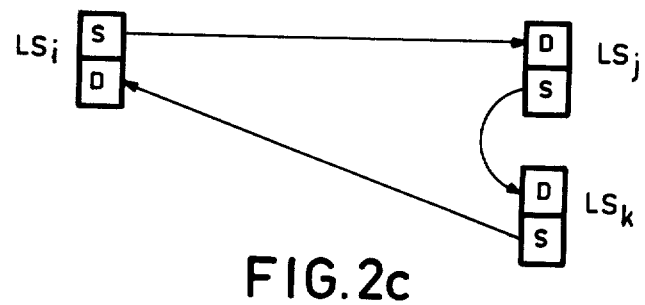
Figure 2D:
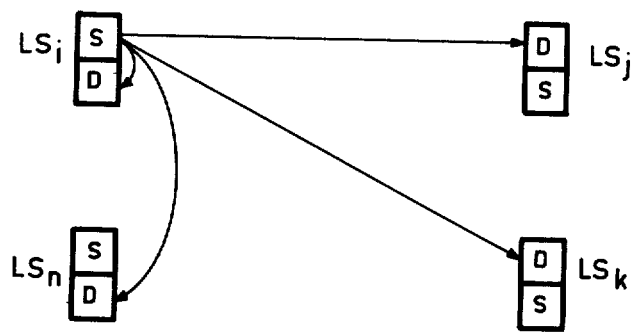

The various types of link permitted are shown on FIGS. 2a to 2d. FIG. 2a shows a half duplex logical link between source LSi (S) and destination LSj (D). In FIG. 2b, the logical link between LSi and LSj is full duplex, meaning that each LS can simultaneously transmit and receive. The logical link in FIG. 2c is multiple and full duplex between LSi, LSj and LSk, while that shown in FIG. 2d is a broadcast link where LSi (source) broadcasts a communication to all (LSj, LSk, LSn and LSi itself).

The multiple source logical link, where several source LSs simultaneously emit to a particular destination LS is forbidden in order to prevent the overloading of the input buffer of the destination and to avoid complex loading of several simultaneous incoming messages.

The inter-LS logical links are predetermined at each LS. The logical links shown in FIGS. 2a to 2c are always permitted, whereas link 2d is permitted only via a programmable connection table (PCT). The purpose of this PCT is to define the channels to be analyzed at each LS during a broadcast call. This selection is necessary in order to prevent disturbance to the LSs which cannot tolerate this mode of communication or which do not belong to the same group of user programs as the source involved.

The PCT may be reprogrammed on detecting the abnormal operation of a destination, which may be isolated from the sources which have detected such abnormal operation and on the replacement of a defective LS or the putting into operation of a new LS.

The logical links are monitored by special words, called "supervision" words. The transparency of information, and data in particular, is obtained by the addition of one bit to the 16 bits of the normal word. This 17th bit defines the type of word (data or supervision).

The monopolization of a destination by a source can be avoided if any logical link has a limited duration. Two parameters are used to this end:
the definition of a maximum length for the block of information being transferred during a logical link;
the transmission speed of the block, which may be independent of the transmission speed of the source and must be limited only by the transmission speed on the optical bus.

Thus each block transmitted is divided into packets of predetermined size and a logical link is established as soon as a complete packet is ready for transmission. The source LS must, therefore, at the level of the communications layer, have an output buffer of capacity at least equal to that of a packet. As will be described later, this method has certain other advantages relative to the real-time criteria of a distributed system and will be very useful for the broadcast mode.

THE ESTABLISHMENT OF A LOGICAL LINK IN THE ADDRESSED MODE

As soon as a source LS wishes to send a message to a destination LS, communication begins with the emission of a supervision word ASK addressed to the destination concerned. This word ASK contains the communication priority level, used to select the winning logical link in the event of conflict when several sources request the same destination. After sending ASK, the source awaits its destination's reply.

A destination may be in one of the following states on receipt of ASK:

IDLE and ready to receive a packet

The destination has no established logical link and its input buffer can receive a complete packet. In this case, the reply to the first incoming ASK request is RR (ready to receive) to the source concerned.

Reception

Here, the destination already has a logical link with another source. The addressed destination selects the next logical link and the associated source depending upon the priorities of all the ASK requests received in this state. At the end of reception of the current packet, the destination effects the logical link to the next source selected, which becomes the current source (reply RR to the source selected).

Destination not ready to receive

If, for instance, the input buffer is not empty, the reply to the destination is RNR (destination not ready to receive a packet).

On the detection of a parity error, all the destinations reply with "abort" (AB) (i.e. cancel the communication) to the source concerned. In this case, the source must retry the call to the destination(s) concerned.

Each destination replies at the end of receipt of the current packet, at the latest. Thus, a source may know exactly the maximum waiting time for the reply to an ASK and may detect the failure of a destination.

An RR reply addressed to a source (i) is implicitly considered as an RNR to the other source. The latter must retry the call (ASK) to the destination they are themselves.

As soon as the source receives an RR reply, it has a "credit" to transmit a packet without any further formality, as the logical link has been established. The last word of a packet is implicitly interpreted as an ASK and may cause the logical link to be maintained with the same source if the communication priority level of the logical link is detected as the highest by the destination.

THE BROADCAST MODE

This mode is of particular interest for at least two main reasons.

Firstly, this mode makes possible the simultaneous transmission of a message to all destinations, and is used to interrogate (query) all of them in order to locate and select the required resources. This could also be useful in other conditions, e.g. updating multiple copies of a data base file.

Secondly, this mode makes it possible to present the same global events order to each of the destinations concerned. Where the control of the overall system is distributed and where each LS has only a partial knowledge of the overall state of the system, it is very important for each LS to observe the same order of global events in order to avoid deadlocks or misunderstandings.

For the broadcast mode to play an important role in improving the performance of a distributed system however, the following problems must be solved:

Before a broadcast message is sent, there must be certainty that a logically connected LS is ready to receive the message (synchronization). For reasons of fault tolerance and modularity, there must be a mechanism permitting communication to be initiated without any knowledge of the number of LSs capable of replying to a broadcast call.

With respect to simultaneous requests from several sources, the common destinations must select the same next source in order to prevent the dispersion of logical links which could cause misunderstandings.

During a broadcast communication, the abnormal operation of one LS must affect the others as little as possible.

The solutions to these problems and the differences with respect to the addressed mode are described below.

The source of the message to be broadcast sends a supervision word ASK to all. The source then waits for a predetermined time ($\theta T$) and transmits its message if all the replies received are RR. A knowledge of the size of the packet makes possible a precise calculation of the value of $\theta T$. In fact, a clock $\theta T$ is defined by the maximum duration of the logical link in the addressed mode, and this allows all destinations to control completely a logical link and select the next one.

---

$\theta T$ = the time (phase) for establishing the link
+ the link maintenance phase
+ the link closing phase
(in the addressed mode).

---

Where an RNR is received during $\theta T$, there are two possible actions which are programmable at the next higher level for each message transmission command.

Firstly, transmission with a waiting time is used when the source renews its call broadcast to all. This may be repeated several times up to a predetermined value, beyond which the communication is abandoned. This policy is necessary when the message is intended for several precisely defined destinations.

Secondly, a transmission without any waiting time is used when the source sends the message directly upon receipt of at least one RR during $\theta T$. This policy avoids overhead when any one destination can satisfy the request.

If an AB (abort) is received during $\theta T$, the source retries the call phase until a predetermined value is reached. A broadcast communication has a higher priority than an addressed communication, thus preventing the dispersion of logical links.

The destinations are synchronized and are in the same states at the same times in the broadcast mode. In the event of a loss of synchronization due to a local event, the destination LS concerned tries to resynchronize itself by analyzing the behavior of the synchronized destinations, especially their replies to broadcast calls. A desynchronized destination cannot reply to broadcast calls until it is resynchronized, in order to prevent dispersion.

The maintenance phase of a logical link will now be described. Each time a logical link is established, the source requesting the link has a credit to transmit a packet, and this credit is immediately renewable at the end of the transfer of the current packet if there are no other requests of higher priority.

After the transmission of a data packet, the source awaits a reply from the destination. This reply may be RR or RNR. If the reply is RR, it is possible to send another data pocket. If, on the other hand, the reply is RNR, the source may not issue another data packet. In this case, the source may once more call the destination to ask for the reallocation of the logical link and may repeat the call each time that an RNR reply is received up to a predetermined maximum.

During the logical link, the source may receive a supervision AB indicating the receipt of an erroneous data packet by the destination. Here, the current logical link is maintained until the end of the recovery of the erroneous packet.

The closing phase of a logical link is now described. The closure may be carried out either by the source or by the destination.

If it is the source that closes, when the message has been fully transmitted (after the transmission of the last word), the source sends the supervision BR (break logical link) and awaits the reply RNR from the destination recognizing BR. After the transfer of a packet, if the source is not ready to transmit the next one, the same transmission of BR is used.

If the destination closes the logical link (when the next selected source at the end of the receipt of a packet is not the current source), it sends the reply RR to the new source selected, and this will be interpreted as RNR by the former source. If, during a logical link, the source becomes abnormally silent (detected by the clock $\theta R$), the destination breaks the logical link and sends a supervision AB to the source.

In the broadcast mode, a logical link is not established if all the replies received are RNR. Here, the source once more sends the supervision BR and awaits RNR.

The recovery procedures performed on error detection will now be described. These procedures on error detection (parity checking) depend upon the states of the source and the destination.

When an error is detected during an establishment phase or closure phase of a link, the source once more sends its last supervision (ASK or BR). When an error is detected during the maintenance phase of an existing logical link, the source inhibits the emission of the current packet and retransmits the same packet preceded by the supervision RY (retry).

During a current logical link (maintenance phase), the destination sends the supervision AB on error detection and switches to the recovery state, on stand-by, for the retransmission of the packet from the current source preceded by RY (retry).

Clearly, only the detection of errors in the channels relating to established logical links will entail error recovery. It may happen that the sources and destinations are not in agreement on error detection. In this case, each behaves in accordance with its own state and takes no account of the supervisions received from the others.

The behavior of a destination in an occupied state will now be described. In an occupied state (input buffer not cleared or packet recovery state) the destination transmits a supervision RNR to all, every $\theta T$, in order to ensure a reply within a time $\theta T$ for the sources in the call phase.

THE EXCHANGE MECHANISMS BETWEEN THE SIP AND THE CM

The SIP uses its input/output buffers (256 words) to communicate with the CM via the SIP/CM interface defined in the Appendix. An I/O buffer contains the directives, parameters and possibly the data to be transmitted. The CM is capable of interpreting the command received and of executing it. After execution, the CM loads a status word concerning the execution into the I/O buffer which had contained the command. The CM is capable of directly accessing the I/O buffers allocated to it. The allocation of a buffer to the CM is made by the transmission to it of an I/O instruction (write). The contents of the bus then specify the address of the buffer to be processed and its nature. An end of execution is signalled to the SIP by the transmission of an interrupt from the CM. The SIP can then specify the address of the buffer containing the result by executing an I/O instruction (read). Two output buffers and two input buffers may be allocated simultaneously to the CM. This permits full duplex transfers, simultaneously processing of a block of kind (input and output) simultaneously and connection to the stand-by buffers after the end of the execution of the current buffers. The input/output buffers may be located in the whole of the addressable storage space which is accessible to the SIP/CM bus (64 kwords).

Input/output instructions used:

WRITE COMMAND

This instruction is used to synchronize the communications module (CM) for the execution of a command explicitly stored in the associated I/O buffer. A distinction may be made between four different commands:
(1) Connection of an LS to the communications network. Here, parameters relating to the intended communications are provided.
(2) Disconnection of LS.
(3) Data transmission, reflected in a request for the transmission of a block of data (less than 64 kwords), specifying the transmission parameters.
(4) Data reception, reflected in the making available of an empty block (less than 64 kwords) used for the reception of incoming data.

Information on the SIP/CM bus during the execution of this instructions:
Bus addresses (SIP→CM)

| no significance | | |
|---|---|---|
| 1 1 1 1 1 1 1 1 | $C_6{}^M C_5{}^M C_4{}^M C_3{}^M C_2{}^M C_1{}^M$ | $C_2{}^D C_1{}^D$ |

CM1 to CM6 specify the CM address
CD1, CD2 indicate the nature of the command defined below.

| CD$_2$ | CD$_1$ | Nature of the command |
|---|---|---|
| 0 | 0 | Data transmission (indirect) |
| 0 | 1 | Data reception (indirect) |
| 1 | 0 | Command defined on data bus (direct) |
| 1 | 1 | Connection (indirect) |

During a direct command, the data bus specifies the command. In the other cases the data bus contains the address of the buffer to be executed.

Data bus definition during a direct command.

CD2, CD1 = 1 0
→data bus

| $D_{16}$ | $D_{15}$ | | |
|---|---|---|---|
| 0 | 0 | DEST ADDRESS (6 bits) | G P C (8 bits) |

GPC = send a general purpose command to the destination defined.

This command is interpreted by the CM and may be used for different actions depending upon the CM programming.

| $D_{16}$ | $D_{15}$ | | | $D_1$ |
|---|---|---|---|---|
| 0 | 1 | Source address (6 bits) | No significance | 0/1 |

D1 = 0 connected specified source connection (creation of a logical link)
D1 = 1 disconnection specified source defined (suppression of a logical link)

| $D_{16}$ | $D_{15}$ | | |
|---|---|---|---|
| 1 | 0 | Source address (6 bits) | No significance |

General disconnection from the communications network (the source is working in isolation, for instance).

READ STATUS (SST)

This instruction is used to synchronize the SIP after the execution by the CM of a command sent to it. On receipt of an interrupt from the CM, the SIP executes a Read Status instruction and thus recovers the address of the buffer executed.

Information on the SIP/CM buses during the execution of this instruction:
Bus addresses (SIP→CM)
no significance

| 1 1 1 1 1 1 1 1 | CM CM CM CM CM CM 6 5 4 3 2 1 | 0 |
|---|---|---|

CM1 to CM6 specify the CM address.
Data bus (CM→SIP)

| Address of the buffer executed in the command WRITE |
|---|

Connection block for the SIP to the communications network

| Word 1 | Connection | | STATE word (16 bits) | | |
|---|---|---|---|---|---|
| word 2 | X | X | PSI (8 bits) | | |
| word 3 | X | X | TTV (8 bits) | | |
| word 4 | X | X | MNN (8 bits) | | |
| word 5 | X | X | MORYN (8 bits) | | |
| word 6 | X | X | RTV (8 bits) | | |
| word 7 | X | X | MIRYN (8 bits) | | |
| word 8 | | | connection block length (CTL) | | |
| word 9 | (6 bits) L.S. No. | X | | X | 0/1 |
| | (6 bits) L.S. No. | X | | X | 0/1 |

-continued

| word i | L.S. No. | X | X | 0/1 |
|---|---|---|---|---|

The block is defined thus:
PSI Packet size
TTV Values of the transmission timer watchdog used to determine $\theta T$
MNN indicates the maximum number of RNR permitted while a source LS repeats its call after receipt. This timer makes it possible to detect the permanent and abnormal occupation of a called LS. RNR is a signal defining that the destination (receiver) is not ready to accept a transmission.
MORYN maximum number of retries in the output mode, defines the maximum number of retries on a parity error or on AB detection before signalling the impossibility of transmission to the next higher level.
MIRYN maximum number of retries in the input mode on a parity error or an AB detection before signalling impossibility of reception to the next higher level.
For the broadcast mode, the LS number identifies the LS connected or disconnected, with a maximum number of 64 connections being possible. The least significant bit defines whether or not there is a connection.
$\theta R = RTV.FD$ indicates the maximum time interval permitted between the issue of two words by a source LS. This timing makes it possible to detect a failure in the transmitting LS.
$\theta T = TTV.FD$ indicates the maximum time interval after which any connected LS must have replied to a call (ASK). This times makes it possible to detect a failure in the called LS on an addressed call and triggers data transmission on a broadcast call (synchronization).
FD is a base clock located in the TM.
The connection mode makes it possible to define closed user (application) groups and to inhibit the broadcast mode for systems with no filter mechanisms (SIP) based on local capacities available.

In order to alter the connection parameters, a disconnection must be made before a reconnection specifying a new parameter value may be made. After a connection, the SIP may transmit.
Definition of the transmission block

| word 1 | W B TSW (transmission of STATUS word) |
|---|---|
| word 2 | Length of data block (16 bits) |
| word 3 | Address of data block to be transmitted (16 bits) |
| word 4 | C1 C2 Dest address (6 bits) Communications level priority indicator |
| | data block |

Await RNR in the broadcast mode
If W = 0, on the receipt of 1 RNR the system no longer waits, but the message is transmitted to the LSs which are ready.
If W = 1, the system waits on receiving 1 RNR and the call is retried.
B = 1 broadcast mode
B = 0 addressed mode
In the addressed mode, the destination address specifies the destination LS. In the broadcast mode, if destination address ≠0, the message is intended for all. C2, C1 indicate the situation of the block in the message as described below.

| $C_2$ | $C_1$ | Block situation |
|---|---|---|
| 0 | 0 | Intermediate |
| 0 | 1 | Start of message |
| 1 | 0 | End of message |
| 1 | 1 | Message complete |

The communications priority level (8 bits) is used in the event of conflicts (selection of the highest priority).

After a transmission, a block defining the result of transmission is constructed.

| word 1 (TSW) | 0 0 LS No. (6 bits) X-----X $S_3$ $S_2$ $S_1$ |
|---|---|
| word 2 | RODBL |
| word 3 | RODBA |

The result of the transmission is loaded into the TSW (word 1) of the transmission block.
$S_1 = 1$ network not operational
$S_2 = 1$ called LS abnormally occupied
$S_3 = 1$ transmission fault on the network.

The number of the LS causing the problem in the broadcast mode is also loaded into TSW.

RODBL defines the current length of the data block remaining to be transmitted (loaded into word 2) in the event of a fault.

RODBA defines the current address of the data block to be transferred in the event of a fault (loaded into word 3).

After a connection, an LS may receive a transmission from another LS, either in reply to a transmission, or because a particular LS has something to transmit.

DEFINITION OF THE RECEPTION BLOCK

| word 1 | RSW = 0 |
|---|---|
| word 2 | Length of the reception block allocated to the CM |
| word 3 | ┌─Reception block address |
|  | └─>Free space for data reception |

RSW reception status word initially at zero
Definition of the result of a reception block

| word 1 RSW | Source address (6 bits) X--------X $S_3$ $S_2$ $S_1$ |
|---|---|
| word 2 | X -------------------------------------------------X |
| word 3 | X -------------------------------------------------X |
|  | $C_2$ $C_1$ Source address Packet length (8 bits) |
|  | Packet |
|  | $C_2$ $C_1$ Source address Packet length (8 bits) |
|  | Packet |
|  | 0 0 0----------0 0-----------------0 |

The result is loaded into the RSW (word 1)
$S_1 = 1$ network not operational
$S_2 = 1$ transmission error
$S_3 = 1$ reception fault on the network In the event of a fault, the source address is loaded. Words 2 and 3 in the reception block are kept unchanged. The data per packet are loaded into the space allocated to the CM. The meaning of $C_2 C_1$ is as defined. Several packets may be received, each defined by its length and its source address. At the end of a packet, the word loaded with zeroes defines the end of reception.

The command will implicitly be regarded as executed if:

(a) the input buffer is full;
(b) after the end reception of the current packet if another buffer is allocated;
(c) on receipt of an end of text (ETX);
(d) on detection of a fault.

THE ARCHITECTURE OF THE FUNCTIONAL COMMUNICATIONS LAYER AND THE COMMUNICATIONS MODULE

Some command words have already been mentioned, but are redefined for the sake of accuracy and clarity.

A distinction may be made between two types of word:

data words which are not interpreted (processed) by the CM (CM transparency);

supervision (control) words making possible the management of the protocols by the CM.

Thus the format of a word is defined below:

| | | 16 bits |
|---|---|---|
| C | K | Data or supervision |

C parity bit
K type of word; K=0, data; K=1, supervision.

Table I defines the coding and functions of the supervision words needed to control the logical links.

TABLE I

| C | 1 0 0 | Destination address | Communications level | Request for transmission of a packet in a message (ASK) |
|---|---|---|---|---|
| C | 1 1 0 | Destination address | GPC code | General purpose command (GPC) |
| C | 1 1 1 | 1 1 1 1 1 1 1 | 1 1 1 1 1 1 1 | Initialization word (IW) |
| C | 1 1 1 | Destination address | 0 0 0 0 0 0 0 0 | Destination not ready (RNR) |
| C | 1 1 1 | Destination address | 0 0 0 0 0 0 0 1 | Destination ready in addressed mode (RRA) |
| C | 1 1 1 | Destination address | 0 0 0 0 0 0 1 1 | Destination ready in broadcast mode (RRB) |
| C | 1 1 1 | Destination address | 0 0 0 0 0 0 1 0 | Abort communication (AB) |
| C | 1 1 1 | Destination address | 0 0 0 0 0 1 1 0 | Signal requesting a break in a logical link (BR) |
| C | 1 1 1 | Destination address | 0 0 0 0 0 1 0 0 | CM synchronization (SY) |
| C | 1 1 1 | Destination address | 0 0 0 0 0 1 0 1 | Retry packet command (RY) |
| C | 1 1 1 | 0 0 0 0 0 0 | 1 0 0 0 0 0 0 0 | IDLE |
| C | 1 0 1 | Reserved | Communications | Call to call |

TABLE I-continued

| level | (broadcast ASK) |
|---|---|

ASK sent by the source to request the establishment of a logical link either with an addressed destination or with all.
GPC general purpose command sent by the source and used for remote control of certain parts of the LS.
IW sent by the source during the initialization phase, used to synchronize the phase lock loop (PLL) on the optical bus and to ensure the transmission of the words in the channels allocated to the LS.
RNR sent by the destination when a communication request is refused due to its temporary inability to store a complete packet.
RRA sent by the destination and indicating the acceptance, after selection, of a communication in the addressed mode.
RRB sent by the destination and indicating the acceptance, after selection, of a communication in the broadcast mode. This supervision is used by the destinations which have lost synchronization in order to resynchronize themselves.
AB sent by the destination and used either to abort (cancel) a supervision or a data packet on error detection, or to abort a logical link because of the abnormal silence of a source.
BR sent by the source and used to interrupt or break a logical link at the end of the transfer of a packet, either because the source is not ready to transmit a new packet, or when the last word of the message has been sent.
SY sent by the source and used to synchronize all the destinations to avoid dispersion in the RR replies in broadcast mode.
RY sent by the source and used to indicate that the next data packet is a recovered packet.

The physical interfaces between the CM and the SIP, the CM and the TM are defined in the Appendix.

DESCRIPTION OF THE CONTROL MODULE

FIG. 3 is a block diagram of the CM 13 and shows the main components with their connections (data, addresses and control). CM 13 is basically a physical communications path between SIP 11 and communications network 20 via TM 19, controlled by three main components operating in parallel: the bus interface controller with the SIP (BIC) 21, block level sequencer (BLS) 22 and packet level control automat (PLA) 23.

BIC 21 controls the SIP/CM interface, interprets commands coming from the SIP and accesses on the SIP/CM interface for the direct exchange of data between the mailboxes (MB) of the CM and the input/output buffers of the SIP.

BLS 22 analyzes and executes the commands from the SIP and returns the results to it as soon as the commands have been fully executed or upon abnormal events. The commands accepted by BLS 22 are: connection of an LS to the communications network, transmission of a data block, reception of a data block, transmission of a general purpose command (GPC), connection or disconnection of the LS to and from a defined remote LS, and disconnection of an LS from the communications network, as already described.

In addition, the BLS assures the exchange of data on detection of an error and also retries a call (ASK) on a reply RNR. The maximum number of retries is defined in the connection block.

PLA 23 controls the logical links under the directives of BLS 22.

The other components of FIG. 3 are briefly described; their precise use will become apparent from the detailed description of the various sequences of the communications protocols. The output (OMB) and input (IMB) mailboxes are represented by 24 and 25 and the SIP address buffer (SIPAD) by 26. A group of 32 registers of the "scratch pad" (SP) type is represented by 27 and stores the parameters. Logic gates 28 form the interface with the internal block interface bus (BIB) 45, and the arithmetic unit (AU) is 29. Counters 31 and 32 represent the two clocks for determining $\theta R$ and $\theta T$ respectively. Transparent register 30 keeps the value RTV. A packet reception semaphore (PRS) defining the size of the packet being received is represented by 33 and a store 34 (256 words × 1 bit) contains the connection table (CT). Multiplexer (MX) 35 permits multiple access to the CT. The current source address is loaded into register (SAD) 36, which is used at the end of the transfer of a packet. Register 37 (DAD) specifies the address of the destination, and register 38 (DPL) the priority level of the communication in output mode. Logic gates 39 and 40 form the CM/TM interface (source and destination address), while FIFO 41 and 42 (first in first out store) are the input (IFIFO) and output (OFIFO) FIFOs, each with the capacity to store at least a complete data packet. An input register (latch) is represented by 43 and a PROM (programmable read only memory) containing the control field of the supervision words is represented by 44. Internal bus PBB 46 (packet block bus) provides the interface between the block and packet levels.

Figure 4:
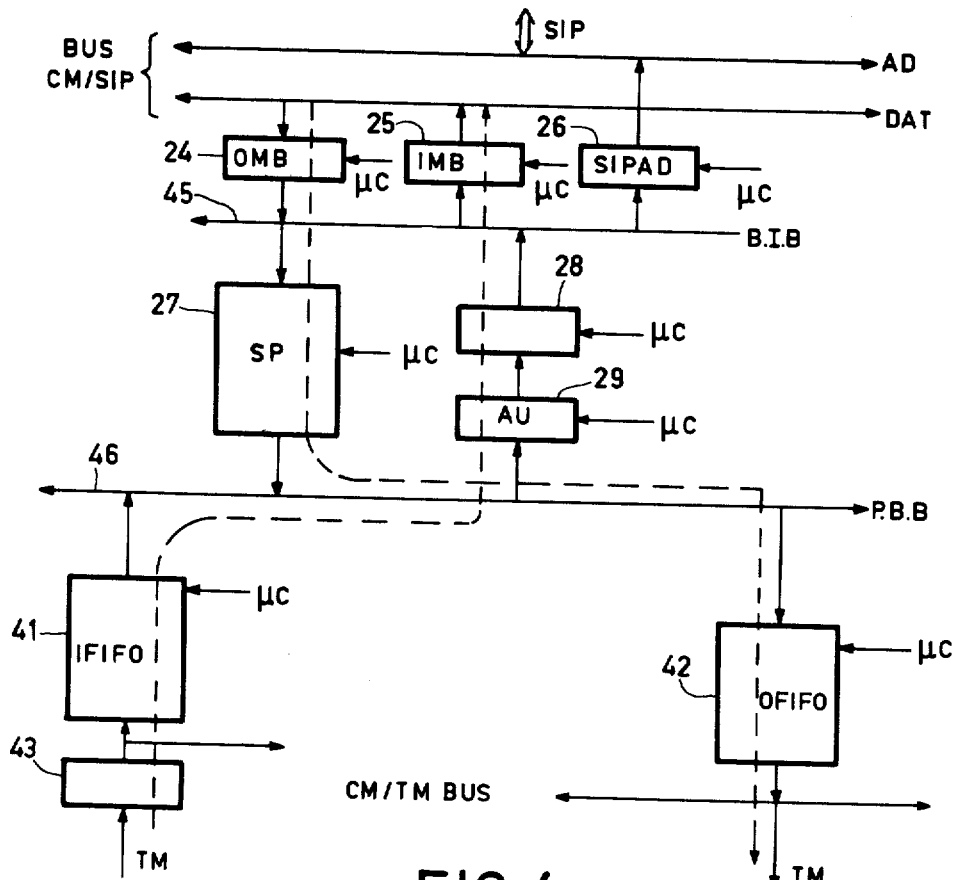
FIG. 4 is a synoptic diagram showing the data path through the CM.

FIG. 4 is a partial diagram showing the data path through the CM. The data coming from a selected source (input data) are transferred by PLA 23 from input register 43 into IFIFO 41 (RR is sent to the source when IFIFO has sufficient unused capacity to store a packet). The data pass through IFIFO 41, and BLS 22 effects transferring a data word to the input buffer of the allocated SIP via AU 29, logic gates 28 and IMB 25. The latter is controlled via BIC 21 which puts a request to the CM/SIP bus and performs the physical transfer of the data word. The current address of the SIP input buffer is loaded into the address register (SIPAD) 26 by the BLS.

In the output mode, as soon as OFIFO 42 has the unused capacity to store a word, an output request is sent to the BLS which in turn asks the BIC to transfer a word from the output buffer from the SIP to OMB 24. As soon as the word is loaded into OMB 24, the BIC activates a "flag" (bit) to inform the BLS. This last controls the transfer of the data word through SP 27 to OFIFO 42. The data word passes through OFIFO and is sent to the communications network by the PLA as soon as a complete packet is loaded into OFIFO, performed by means of a request to send (RTS) activated by the BLS.

The various components mentioned are controlled by the appropriate microcommands ($\mu c$) of the BIC, BLS and PLA. The data paths are shown in dotted lines. Arithmetic unit (AU) 29 has a 16-bit counter which, after being loaded with a value, can perform incrementation or decrementation operations on this value, the zero transition of which is detected by a signal BORROW (switches to 1). The AU is used to update the addresses and the lengths of the data blocks being transferred (input and output), to divide the blocks into packets, to reconstitute the packets and to count the number of retries during a block transmission or reception. Logic gates 28, of the three-state type, facilitate the control of internal bus BIB 45.

The command parameters relating to the connections and transfers being executed are memorized in SP 27 and updating is carried out during the execution of commands. The organization of these parameters in SP 27 is shown in Table II and they are defined below. A few addresses in SP 27 are not currently used, making it possible to add other parameters or to use them for temporary operations.

The parameters PSI, TTV, MNN, MORYN, RTV, MIRYN, ROBBL and RODBA are defined in the description of the exchange mechanisms between the SIP and the CM.

CTL counter specifying the current length of CT 34. CTL is initially loaded with the length of the connection table during the processing of a connection command and is decremented each time that the state of a channel is loaded into CT. When CTL is zero, the updating of the CTL is completed.

CNN a counter specifying the current number of retries on a reply RNR. It is decremented each time after reception of a reply RNR during a call phase (except in state WAIT.RNR). As soon as the logical link requested is established, this counter is reloaded with MNN. If CNN=0, a status word "destination occupied" indicating that transmission is impossible is sent to the appropriate higher level.

CIRYN number of current retries on reception. This counter indicates the number of errors during the reception of a packet. Initially loaded with MIRYN, it is decremented on each error detected. If CIRYN=0, a status word "reception fault" is sent to the appropriate higher level.

CORYN specifies the number of current retries on a parity error, or an AB detection, during the transmission of a data packet. As soon as a data packet has been completely transferred, this counter is again loaded with MORYN. If CORYN=0, a status word "transmission impossible" is sent to the appropriate higher level.

IEPL specifies the actual length of the packet being received, used to indicate the size of the packet received, this value being associated with each data packet loaded into IFIFO 41.

IEPLR specifies the actual length of the packet to be recovered. This is used when a parity error is detected to eliminate during the recovery of the packet the part which has been correctly received before the error.

OEPLN specifies the actual length of the packet being transmitted and makes it possible for a block to be divided into packets. Initially, this counter OEPLN is loaded with PSI, and each time a word is loaded in OFIFO 42, OEPLN is decremented. As soon as OEPLN=0, a status bit EOP (end of packet) is loaded with the last word into OFIFO and RTS is activated.

CIEPLR counter specifying the current value of IEPLR during the recovery of a packet.

NOBSA specifies the starting address of the next output block to be transferred. This block is taken into account as soon as the current block is transferred.

NIBSA specifies the starting address of the next reception block allocated. This block is loaded with the incoming data as soon as the loading of the current packet has been performed in the input buffer.

COBSA specifies the starting address of the current output block.

CODBL specifies the length of the current output data block.

NODBL defines the length of the next output data block.

CODBA defines the current address of the output data block.

NODBA defines the starting address of the next output data packet.

CIBSA defines the starting address of the current input data block.

CIDBL defines the current length of the data block being received.

CIDBA defines the current address of the input data block.

CWA defines the address of the word reserved for loading the characteristics relating to the received packet (source number and packet length, for instance).

TDATA defines a word reserved for the temporary storage of the data in transit between OMB 24 and OFIFO 42.

SLADR defines a word reserved for the temporary storage of a GPC command or the address of the destination and the priority level in transit before it is loaded into OFIFO 42.

TABLE II

| word 1 | PSI | address 0 |
|---|---|---|
| word 2 | TTV | |
| word 3 | MNN | |
| word 4 | MORYN | |
| word 5 | RTV | |
| word 6 | MIRYN | |
| word 7 | CTL | |
| word 8 | CNN | |
| word 9 | CORYN | |
| word 10 | CIRYN | |
| word 11 | IEPL | |
| word 12 | IEPLR | |
| word 13 | OEPLN | |
| word 14 | CIEPLR | |
| word 15 | | |
| word 16 | | |
| word 17 | NOBSA | |
| word 18 | NIBSA | |
| word 19 | COBSA | |
| word 20 | CODBL | |
| word 21 | RODBL | |
| word 22 | NODBL | |
| word 23 | CODBA | |
| word 24 | RODBA | |
| word 25 | NODBA | |
| word 26 | CIBSA | |
| word 27 | CIDBL | |
| word 28 | CWA | |
| word 29 | CIDBA | |
| word 30 | | |
| word 31 | TDATA | |
| word 32 | SLADR | address 31 |

BIC 21 is a "Moore" type automat controlling the interface with the next higher layer i.e. the functional layer represented by the SIP. Moore-automats have been known and described in the art for a long time. Cf. Montgomery Plister, Logical Design of Digital Computers, John Wiley, 1963, p. 144 ff. The exact functions of BIC 21 are defined below.

On a request coming from BLS 22:

Emission of an interrupt to the higher level (SIP) to provide a status word contained in IMB 25;

request to control the CM/SIP bus in order to directly access the I/O buffers of the SIP to read/write a word.

On the input/output instructions coming from the higher level (SIP):

reply to a write command and loading of OMB 24 with the contents of the CM/SIP bus, followed by the activation of a signalling bit to synchronize BLS 22;

reply to a read command by transferring the contents of IMB 25.

SP 27 is a group of 32 random access registers (word 1 to word 32). The parameters loaded into words 1 to 14 use only 8 bits each of a word, while the other parameters use the full capacity of the word (words 17 to 32). Some words (words 15, 16 and 30, for example) which are not used presently could be used later to memorize new parameters.

Figure 5:
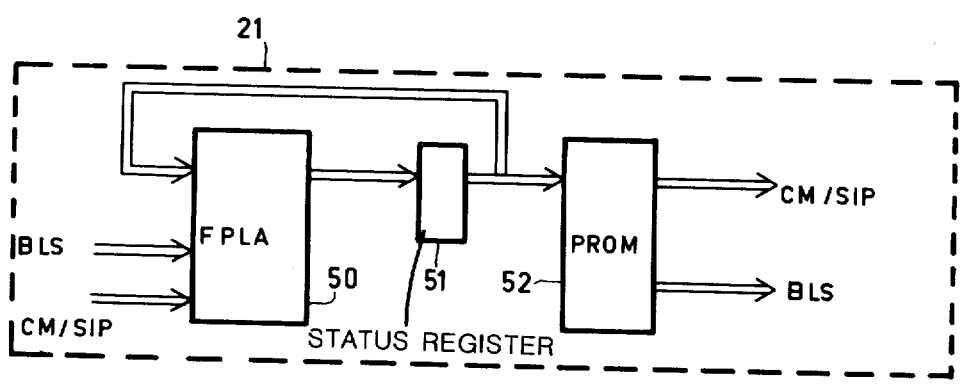
FIG. 5 shows the structure of the bus interface controller (BIM) with the SIP.

FIG. 5 shows the structure of BIC 21. Here, 50 represents an FPLA (field programmable logic array) the outputs of which are connected to a status register 51. In its turn, register 51 is connected to the input of FPLA 50 and a PROM 52. Depending upon the existing state of FPLA 50 (contents of register 51) and information from BLS 22 and the CM/SIP interface, register 51 is loaded with the next state, which selects the appropriate microcommands ($\mu c$) from PROM 52. These microcommands are transmitted to the components concerned, such as BLS 22, the mailboxes, SP 27 and the CM/SIP interface.

Figure 6:
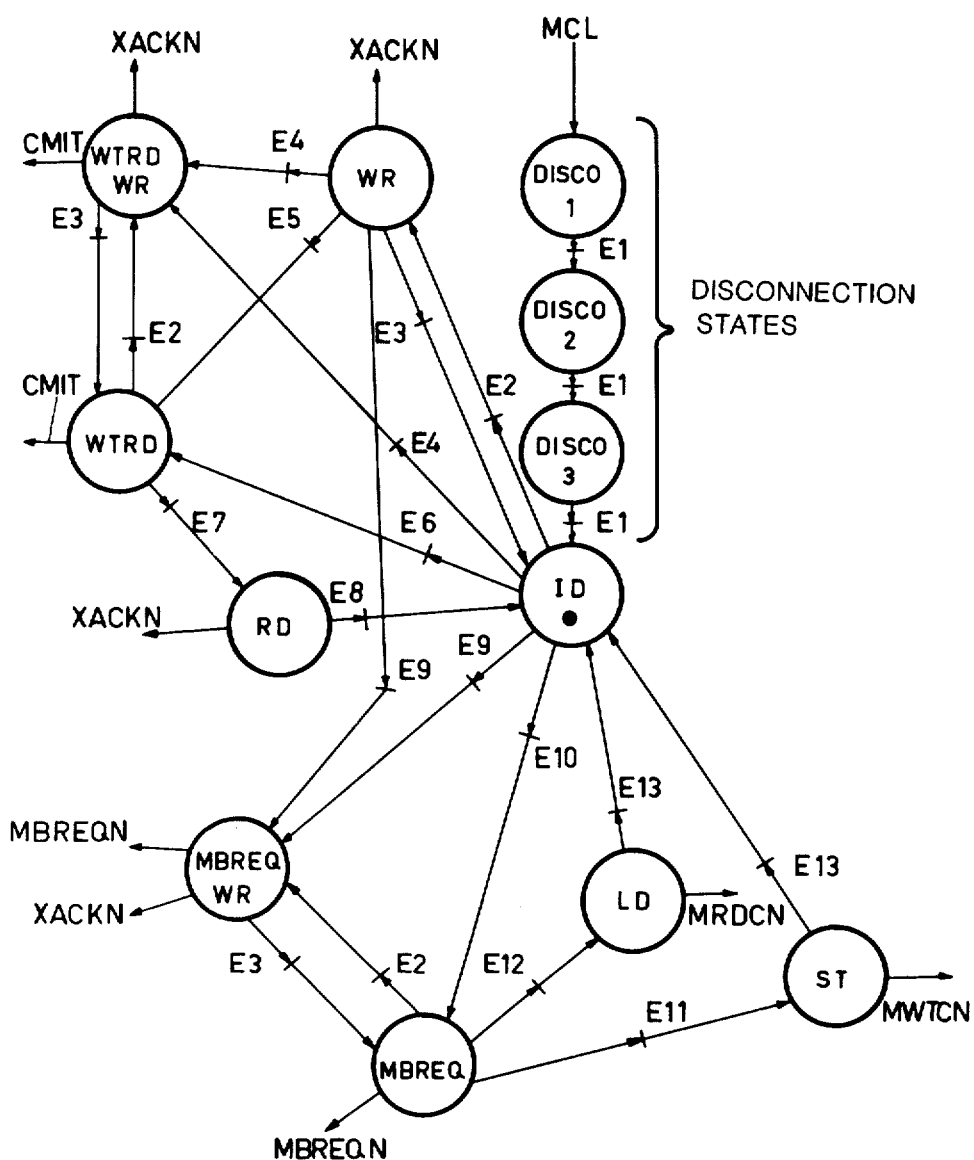
FIG. 6 is a Petri network of the BIM control automat.

The switching of the states of the BIC control automat is described with reference to FIG. 6, which is a Petri network. In a Petri network, it is assumed that the automat is in a particular state, which state possesses a "token". The automat may be switched to a new state (fired) on the appearance of a defined event (Ei) by passing the "token" to the new state. In FIG. 6, for instance, the automat is in the idle state (ID) which has the token (symbolized by a block dot .), whereupon the automat may switch to the state WR on the appearance of event E2. Events E1 to E13 used by the automat of BIC 21 are defined below.

E1: unconditional (local clock)
E2: WT.$\overline{RTTD0}$.RTTD1
E3: EOW.$\overline{RTTD0}$.RTTD1
E4: WT.RTTD0.$\overline{RTTD1}$
E5: EOW.RTTD0.$\overline{RTTD1}$
E6: WT.RTTD0.$\overline{RTTD1}$
E7: RD
E8: EOR
E9: WT.RTTD1
E10: $\overline{WT}$.RTTD1
E11: MBA.$\overline{RTTD0}$
E12: MBA.RTTD0
E13: EOTE.

The various signals defining the events and the other signals used in FIG. 6 are defined below:
MBA—CM/SIP interface allocated
EOTE—end of execution of transfer
CMII—CM interrupt
XACKN—acknowledgement of command
MBREQN—request for the CM/SIP interface
MRDCN—read-out of mailbox, OMB 24 in output mode
MWTCN—loading of mailbox, IMB 25 in input mode
EOW—end of write
EOR—end of read
WT—write signal
RD—read signal
RTTD—request for exchange of data.

The requests from BLS 22 are defined and the value of RTTD1 and RTTD0 shown in table III.

TABLE III

| RTTD1 | RTTD0 | Meaning |
|---|---|---|
| 0 | 0 | Idle |
| 0 | 1 | BLS requests BIC to send a status word to SIP |
| 1 | 0 | Memorize a word (IMB 25 to SIP I/O buffer |
| 1 | 1 | Load a word (SIP I/O buffer → OMB 24) |

The commands from the SIP are the write commands defined in table IV.

TABLE IV

| AD1 | AD0 | D16 | D18 | Meaning |
|---|---|---|---|---|
| 0 | 0 | X | X | Transmit a data block |
| 0 | 1 | X | X | Receive a data block |
| 1 | 0 | 0 | 0 | Transmit a GPC |
| 1 | 0 | 0 | 1 | Disconnection or connection of a defined LS |
| 1 | 0 | 1 | X | General disconnection of the network |
| 1 | 1 | X | X | Connection of a local LS |

X = no significance.

With AD1, AD0=00, 01, 11, the data bus specifies the address of the start of the command block (indirect command). The BIC automat is activated on receipt of a request coming from the BLS or a command from the SIP. In FIG. 6, the automat switched to the idle state ID via the states DISCO 1, DISCO 2 and DISCO 3, which are disconnection states. This switching sequence is unconditional (E1) after an MCL (Master clear) for initializing all the components of the BIC, and this takes 600 ns (200 ns per DISCO). If the event E2 (SIP write command) appears during the idle state ID, the BIC automat switches the state WR (write) and acknowledge the the command from SIP (XACKN). At the end of writing (EOW), event E3 occurs and the automat switches to the idle state ID.

As already described, (while describing the SIP/CM exchange mechanisms) a command from the SIP to the CM is followed by the read-out of the state of the CM in order to obtain the result of the executed command. Thus, if event E6 takes place (request from the BLS), the automat switches to the state Wait Read (WTRD) and sends an interrupt (CMIT) to the SIP, which then sends a read command (E7), the automat switching to the read state (RD), acknowledges the SIP command (XACKN) and, on the request of the BLS (E8), loads the contents of IMB 25 on the CM/SIP bus. Thereafter, the automat switches to the idle state (ID).

Two events may occur simultaneously, e.g. a write command from the SIP and a request from the BLS. In this case, the automat switches to the states appropriate for solving conflicts. If in the write state (WR) the event E5 occurs, i.e. simultaneously a request from the BLS to send the status word, and an end of write, the automat will switch to the Await Read (WTRD) state and send an interrupt (CMIT) to the SIP. In this state, when E7 occurs, the path followed is as described WTRD→E7→state RD→E8→state ID.

If, in the write state (WR), event E4 appears (i.e. an SST request from the BLS simultaneously with the SIP write command), the automat switches to the Wait Write state (WT.RD.WR). The write acknowledge (XACKN) and an interrupt (CMIT) are sent to the SIP and on the appearance of E3 the automat switches to the state Wait Read (WTRD) whereafter the path followed is, as described, state WTRD→E7→state RD→E8→state ID. The switching between the states WTRDWR and WTRD is produced by the events E2 and E3 (either signal WT or signal EOW).

If event E6 (request from BLS) appears while the automat is in the idle state ID, the path followed is state ID→E6→state WTRD→E7→state RD→E8→state ID. When the automat is in either write state WR or idle state ID, event E9 (request from the BLS simultaneously with write) may appear; here the BIC automat is switched to a state MBREQ.WR. In this state the SIP executes a write, thus the BIC automat acknowledges this command (XACKN) and requests the SIP/CM bus (MBREQN) in order either to load a word from IMB 25 (input mailbox)→SIP I/O buffer, or to load a word from SIP I/O buffer→OMB 24 (output mailbox), this being defined by RTTD1=1. The appearance of E3 (end of write) causes the automat to switch the state MBREQ where a request for the SIP/CM bus is made (MBREQN). Depending upon RTTD0, either the sequence E11→state ST→E13→state ID, or the sequence E12→state LS→E13→state ID is executed. In the first sequence, the contents of IMB 25 are memorized in the SIP I/O buffer (MWTCN) via E11 which causes the automat to switch to state ST (store) and E13 which causes the automat to switch to state ID. In the second sequence, E12 causes the automat to switch to state LD (load), a word is loaded into OMB 24 of the SIP I/O buffer (MRRCN) and E13 causes the automat to switch to state ID.

The same sequences are followed if event E10 occurs in the idle state (ID). The switching between the states MBREQ.WR and MBREQ is performed by events E2 and E3, i.e. the presence or absence of a write command from the SIP.

Block level sequences (BL5) 22 executes the commands from the appropriate higher level, with the aid of the control automats of the BIC and PLA operating in parallel with the BLS. The commands from the higher level are directly communicated by the BIC to the BLS, which executes them and sends a status word to the higher level at the end of execution. During execution, the BLS processes the events from the PLA level. The BLS can perform the bidirectional transfer of data and can chain data blocks (on transmission and reception).

Figure 7:
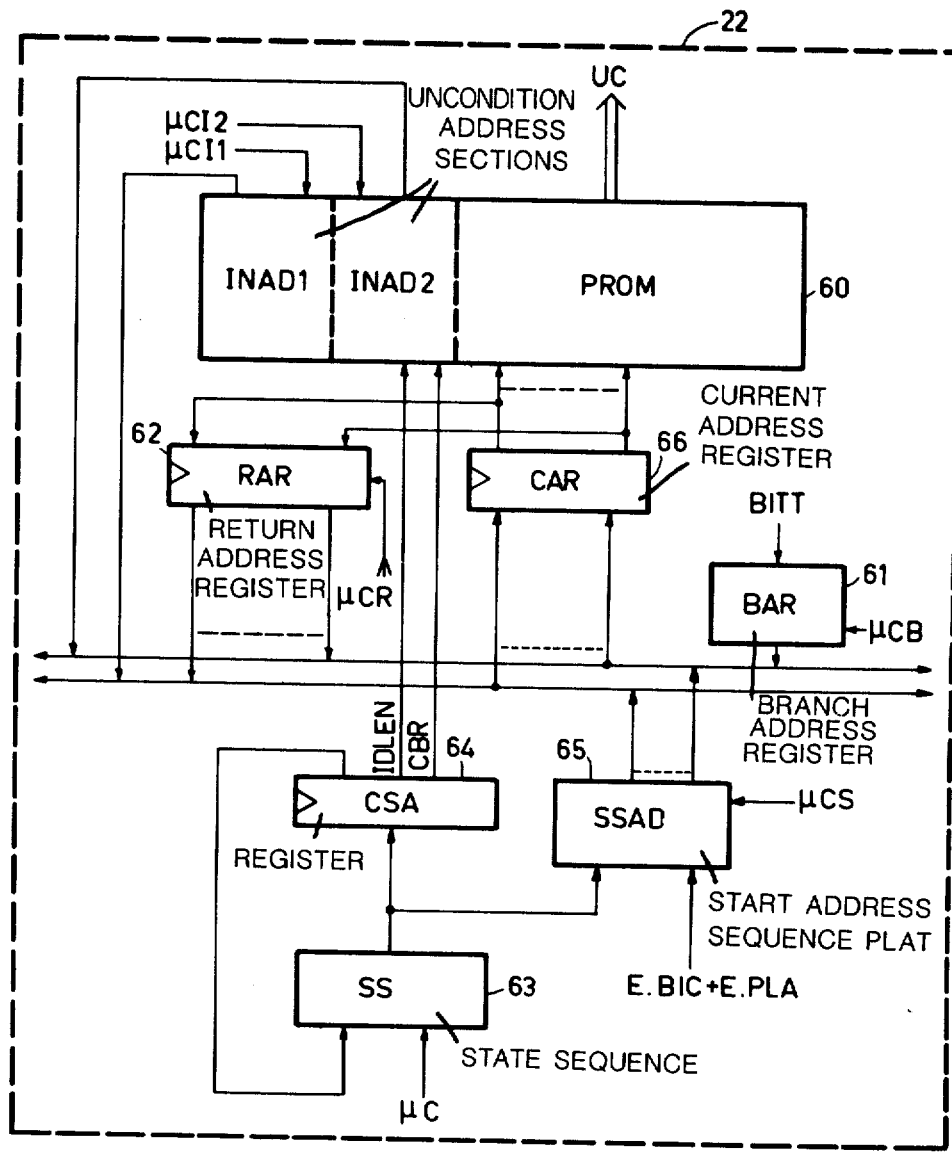
FIG. 7 shows the structure of the block level sequencer (BLS)

FIG. 7 shows the structure of BLS 22, which is a microprogrammed automat. Microprogrammed PROM 60 has a capacity of at least 1024 W×40 bits and contains all the microcommands (μc) for monitoring the various sequences and functions monitored by the BLS, i.e. the microcommands and events transmitted to BIC 21 and PLA 23 and to the state sequencer (SS) 63 of the BLS which is an FPLA. State sequencer 63 switches to the next state as a function of its current state stored in a register (CSA) 64 and the microcommand from PROM 60.

The start addresses of the sequences to be executed are loaded into start address sequence (SSAD) FPLA 65, either by μcs (in the idle state) or as a function of the state of the sequencer and the events from BIC 21 and PLA 23 (E.BIC+E.PLA). These addresses, which are taken into account at the end of the current sequences, are transferred into the current address register (CAR) 66, acting directly on PROM 60. PROM 60 has a section associated with the microcommands (32 bits) and unconditional address sections INAD1 and INAD2 (4 bits each); INAD1 and INAD2 are controlled by microcommands μcI1 and μcI2 when a direct address is supplied. A priority command from the BIC must be executed during the execution of a BLS sequence; each command coming from the BIC via SS 63 (shown by CBR) has the highest priority so that OMB can be cleared. Here, the contents of INAD1 and/or INAD2 are concatenated (compacted) with bit CBR (+256 defined by address bit CBR) and becomes the next address (branch address). The current address at the time when the sequence is interrupted is stored in a return address register (RAR) 62, so that the sequence in question may be executed later. In the case of condition branching (the end of the transfer of a packet for instance), the condition bit BITT is tested in BAR 61 (branch address register), facilitating a conditional branch to the appropriate micro-instruction. Microcommands μCR and μcB monitor RAR 62 and BAR 61 respectively.

The signal IDLEN defines the most significant address bit of PROM 60. When IDLEN=0, the automat of the BLS is inactive and awaits a connection command (address 0–255 in PROM 60). On receipt of a connection command (CBR=1), the connection sequence is executed (address 256–511). At the end of the execution of this sequence, the automat becomes active (IDLEN=1) and the various events may be taken into account, involving the execution of sequences located in the PROM (address 512–767). If a priority command comes from the BIC, the addressing of PROM 60 switches to zone 768–1025 (current address+256).

Figure 8:
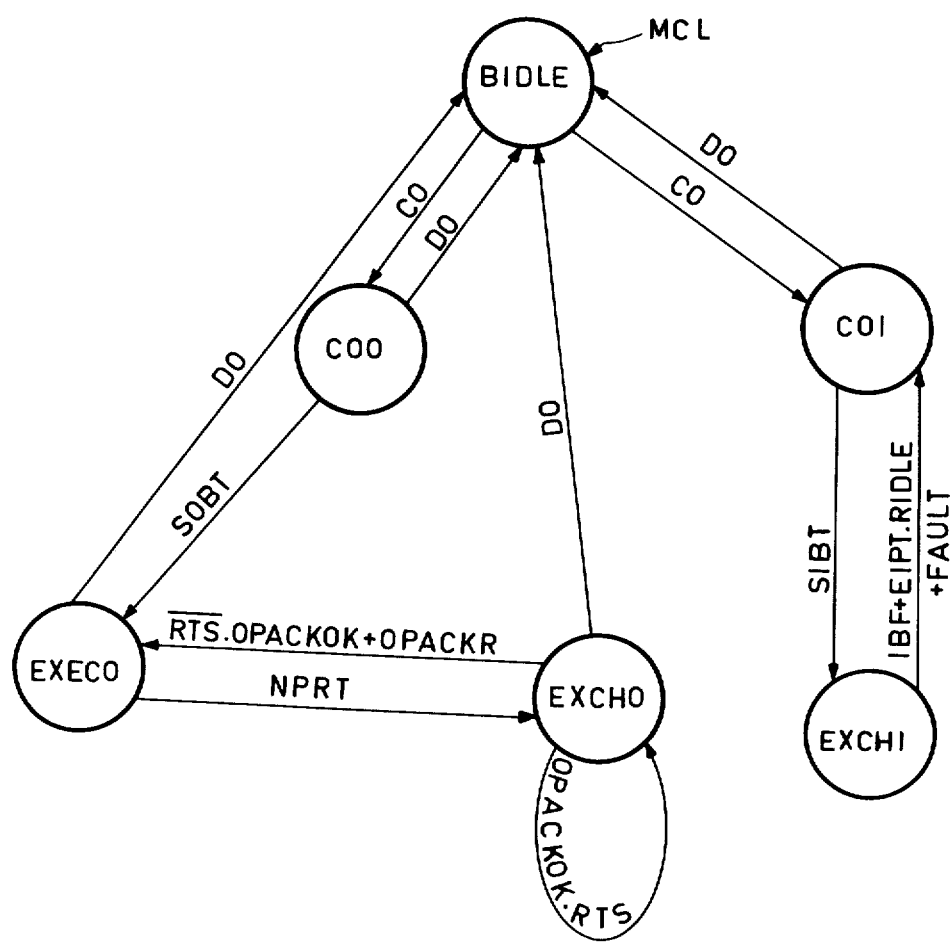
FIG. 8 shows the state sequencer of the BLS.

The execution of the commands and the control of the various sequences are described with reference to FIG. 8 (state sequencer of the BLS), FIG. 9 (Petri network of the BLS automat) and flow charts defining the associated control sequences of the BLS.

The state sequencer (FIG. 8) defines the principal current states of the execution of the commands. The Petri network of the BLS automat (FIG. 9) shows the principal states and the events (Ei) which cause the automat to switch between the main states and the sequences (Si) and between the sequences (Si) and the main states. Certain events do not switch the automat into another state but maintain it in the same one. In state CO, for example, events E38, E30, E32 and E34 are looped and do not cause the automat to switch to another state. They do, however, cause the execution of certain sequences and their use will be clear from the following description. For instance, sequence S15 is executed regardless of whether BLS automat is in the state CO or EXCHIO on the appearance of E36, the difference being that in the former case the automat switches to state EXCHIO on E37 at the end of S15 and in the latter case the automat remains in state EXCHIO on E37.

Figure 9:
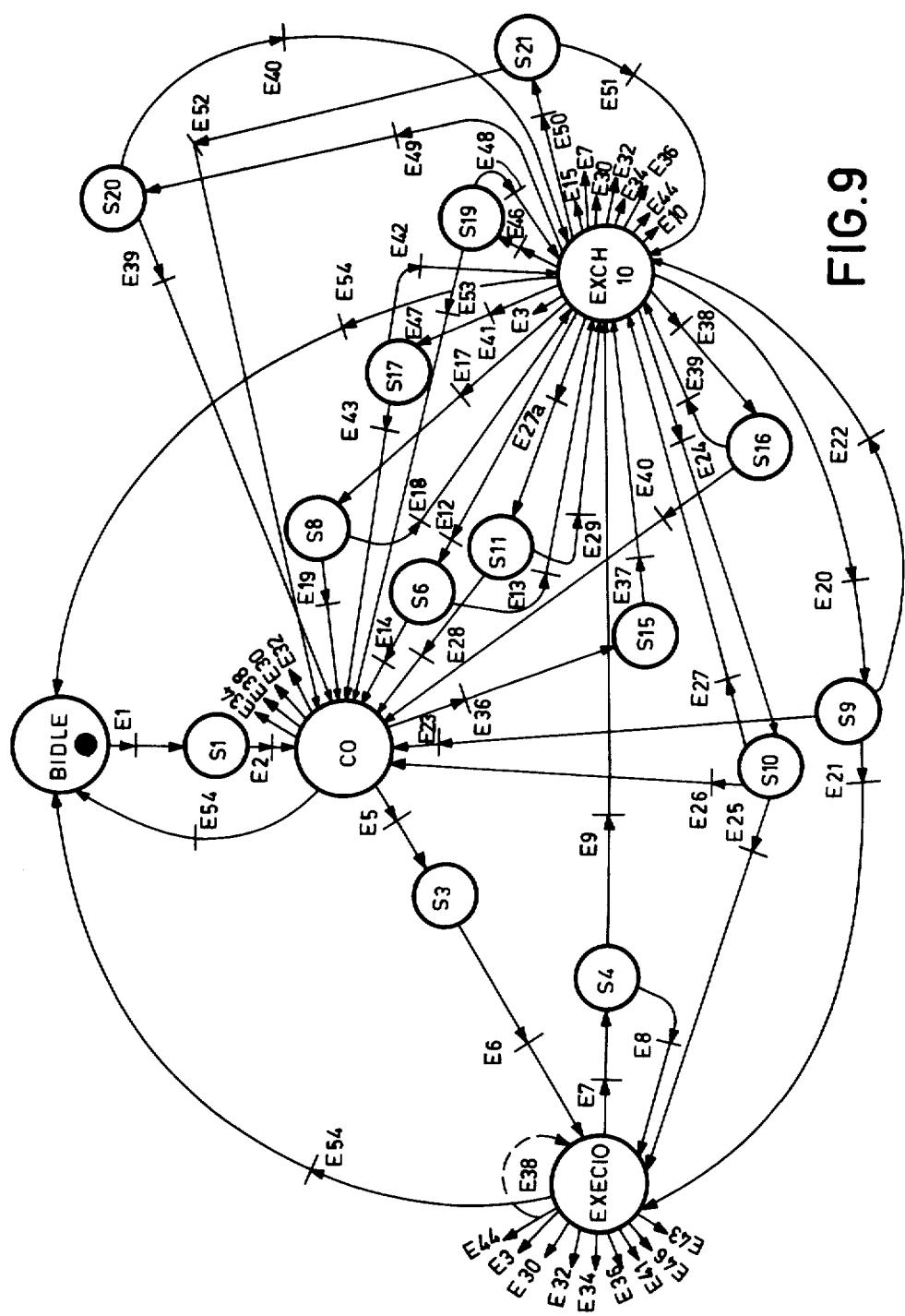
FIG. 9 is a Petri network of the BLS control automat.

Initially, state BIDLE has the "token" (.) in FIG. 9. The Petri net of the automat describes the control sequences of the BLS in the general way.

The most important signals and conditions at the BLS level causing the switching of the automat are defined below. Normally, the event which causes the termination of a sequence is the end of the sequence, e.g. the end of sequence S1 is automatically E2, but the input to sequence S3 is a defined event E5 (SOBT=start the transfer of the transmission block). Thus, in general, only the defined events (the inputs to the sequences) are described.

Transmission and reception events

E1 = CO→connection command
E27+E50 = NOTOP→network not operational
E30 = SGPC→send GPC
E32 = LUDO→command to update the line
E54 = DO→disconnection command Transmission events E3 = TO→transmission command
E5 = SOBT→start the transfer of the transmission block
E7 = IOFR→input of OFIFO ready
E10 = RR→destination (receiver) ready
E12 = RNR→destination (receiver) not ready
E15 = NOT→nothing received E17=TF→transmission fault
E20=RPACK→acknowledgment of transmitted packet
E24=PACKRY→request for retry (transmit again) of a packet Reception events E34=RO→reception command
E36=SIBT→start the transfer of the packet in reception (input packet)
E38=$\overline{RY}$.OIFR→IFIFO output ready
E41=SPE→source parity error
E44=SRYD→detection of a retry of the source
E49=OIER.RY→retry of the reception packet (input packet)
E53=RTV OUT→destination (receiver) time out The switching between states of the BLS sequencer (FIG. 8) will now be described. The state sequencer switches to state BIDLE (IDLE) either after an MCL (master clear of CM), or after a disconnection command (DO) from any state. The sequencer switches to state COO (transmission) and COI (reception) if a connection command (CO) is received from the SIP.

On receipt of a transmission command SOBT, the sequencer switches to state EXECO in which the OFIFO is loaded. On receipt of a command NPRT (next packet ready for transmission) from the BIC, the sequencer switches to state EXCHO (transmit a packet). If, in state EXCHO, the logic condition OPACKOK.RTS exists, i.e. if the acknowledgment of the current transmitted packet is received and at the same time if a request for transmission RTS is also received (next packet ready for transmission), the sequencer remains in state EXCHO and transmits the next packet. If the logic condition $\overline{RTS}$.OPAKKOK+OPACKR is true, i.e. the acknowledgment of the packet and no new request for transmission ($\overline{RTS}$.OPACKOK) or the retransmission of the packet already transmitted (OPACKR), the sequencer switches to state EXECU. Either the loading of the next packet for transmission or the reloading of the packet for retransmission into the OFIFO is done before the state sequencer switches to state EXCHO.

The sequencer switches to state COO if, in state EXCHO, an end of block transfer (EOBT) or a transmission error (FAULT) is detected. The sequencer switches to state EXCHI (reception of a packet) from state COI when a command to start reception of a data block SIBT is received from the BIC. The sequencer switches to state COI if the logic condition
IBF+EIPT.RIDLE+SIBT+FAULT is true;
IBF indicates that the reception buffer is full;
EIPT indicates the end of the packet;
RIDLE indicates the idle state of the reception automat at packet level;
SIBT indicates the allocation of a new input block with respect to the SIP;
FAULT indicates a reception error.

The state sequencer and the BLS automat operate in synchronism, each monitoring the state of the other, and this will become clear from the following sequence descriptions. References to FIGS. 8 and 9 are implicit as well as references explicitly to the relevant flow charts.

The state sequencer (FIG. 8) is in the state BIDLE (BLS idle) either after an MCL (master clear), or after a disconnection command (DO) received from the higher level (SIP). On detecting a connection command CO (E1), the automat executes the sequences S1 as described in the flow chart on FIG. 10. In this sequence, the connection parameters are loaded from the I/O buffer of the SIP, initially into SP 27 and next into the connection table (CT) 34. The block start address is specified during the communication of the command to the CM in OMB 24.

Figure 10:
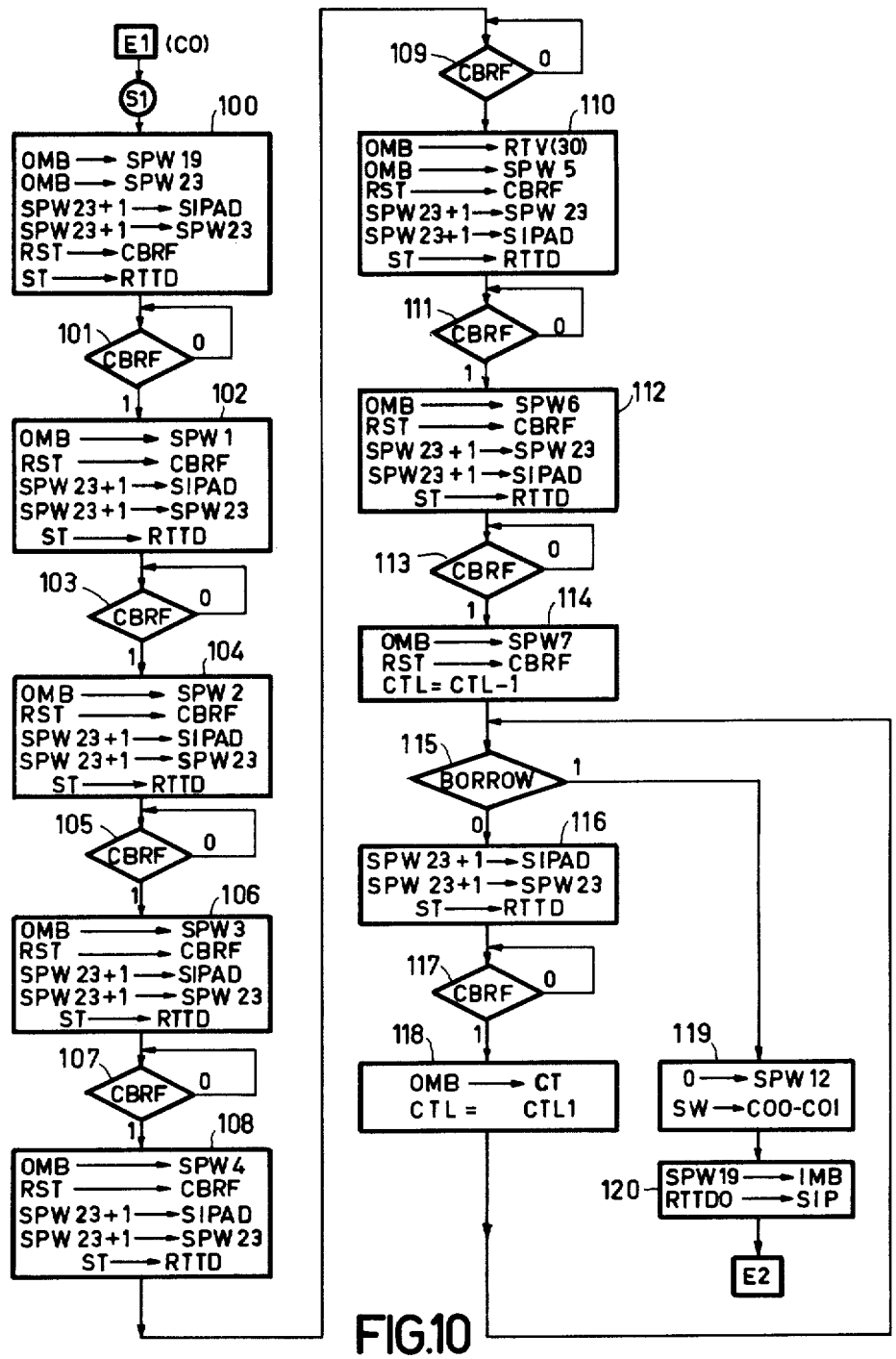
Figure 11:
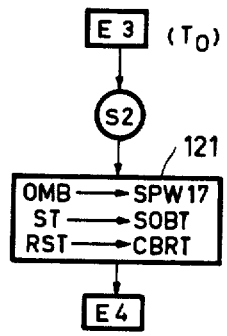

The flow chart of FIG. 10 will now be described in detail.

Block 100

The block start address is loaded into counters COBSA (start of current block) and CODBA (current block address), operations OMB→SPW 19 (SP word 19) and OMB→SPW 23. Next the address of the following word is loaded into the SIP address register SIPAD 26 to allow the next word to be loaded and also into counter CODBA (current address), the synchronization from the BIC (CBRF) is reset and the loading request (RTTD) is activated or set (ST); operations SPW 23+1→SIPAD, SPW 23+1→SPW 23, RST→CBRF, ST→RTTD.

Test 101 is made to determine whether the synchronization (CRBF) of the BIC is activated, i.e. if a word is ready for loading into the SP.

Block 102

If the BIC is synchronized, the contents of OMB 24 (packet size) are loaded into PSI, the synchronization is reset, the address of the next word is loaded into SIPAD and counter CODBA, and the loading request RTTD is activated, operations OMB→SPW1, RST→CBRF, SPW 23+1→SIPAD, SPW 23+1→SPW 23, ST→RTTD.

The synchronization (CBRF=1) of the BIC is awaited in test 103.

Block 104

The value of the transmission timer is loaded in TTV (OMB→SPW2), the synchronization is reset (RST→CBRF), the address of the next word is loaded into the current address counter CODBA (SPW23+1→SPW 23) and into the SIP address register SIPAD for loading the next word (SPW 23+1→SIPAD), and the load request RTTD is activated (ST→RTTD).

Once more the synchronization (CBRF=1) of the BIC is awaited in test 105.

Block 106

The value indicating the maximum number of RNR in reception mode is loaded into MNN (OMB→SPW3), the synchronization is reset (RST→CBRF), the address of the next word is loaded into SIPAD (SPW23+1→SIPAD) and also into the current address counter (SPW 23+1→SPW 23) and the load request is activated (ST→RTTD).

The synchronization (CBRF=1) of the BIC is awaited in test 107.

Block 108

The maximum number of output mode retries is loaded into MORYN (OMB→SPW4), the synchronization is reset (RST→CBRF), the next address is loaded into SIPAD (SPW23+1→SIPAD) and into counter CODBA (SPW23+1→SPW 23) and the load request is activated (ST→RTTD).

The synchronization (CBRF=1) is awaited in test 109.

Block 110

The value of the reception timer is loaded into the word of the SP, RTV (OMB→SPW5) and into counter 30, the synchronization is reset (RST→CBRF), the address of the next word is loaded into SIPAD (SPW23+1→SIPAD) and into the current address counter CODBA (SPW23+1→SPW 23) and the load request is activated (ST→RTTD).

The synchronization (CBRF=1) is awaited in test 111.

Block 112

The maximum number of retries in the input mode is loaded in MIRYN (OMB→SPW6), the synchronization is reset (RST→CBRF), the next address is loaded into the address register SIP and the current address counter (SPW23+1→SIPAD, SPW 23+1→SPW23) and RTTD is activated (ST→RTTD).

Once again, the synchronization (CBRF=1) is awaited in test 113.

Block 114

The loading of the connection table CT 34 begins. The current length of the connection block is loaded into CTL (OMB→SPW7), the synchronization is reset (RST→CBRF) and the length of the connection block decremented by the arithmetic unit AU 29 (CTL=CTL−1).

The AU signal BORROW is tested in test 115. If BORROW=0, the CTL is loaded (blocks 116 to 118); if BORROW=1, the operations of blocks 119 and 120 are executed.

Block 116

The address of the next word is loaded into SIPAD (SPW23+1→SIPAD) and into CODBA (SPW23+1→SPW23), and RTTD is activated (ST→RTTD).

The synchronization (CBRF=1) is awaited in test 117.

Block 118

The word associated with the current address of CT is loaded (OMB→CT), the operation CTL=CTL−1 is performed on the length of CTL and a branch made to test 115. If BORROW=0, the operations described in blocks 116 to 118 are again performed. If BORROW=1 (test 115), i.e. CTL=0, the loading of CT is complete and a branch is made to block 119.

Block 119

IEPLR (effective length of the packet to be recovered) is initialized (0→SPW 12) and the state sequencer (FIG. 8) switches to states COO/COI (SW→COO/COI).

Block 120

The address of the start of the current block is loaded into IMB (SPW19→IMB) and the status word sent to the SIP (RTTDO→SIP). On the appearance of event E2, the BLS automat (FIG. 9) switches to gate CO which represents the states COO and COI of the state sequencer. A disconnection command (DISCO) causes the state sequencer to switch to the idle state BIDLE whatever its state at the time, as this command is a general master clear for the CM (MCL).

On receipt of a transmission command (TO), event E3 appears and the sequence S2 shown in flow chart 11 is executed.

Block 121

The BLS loads the content of OMB (starting address of the next block to be transferred) into NOBSA (OMB→SPW17), the signal SOBT (start transmission block transfer) is activated and the BIC synchronization, is reset (RST→CBRF). The appearance of event E4 entails the switching of the BLS automat to state CO. The sequence S2 (TO) may be interpreted in all the states of the automat except for BIDLE.

Figure 12:
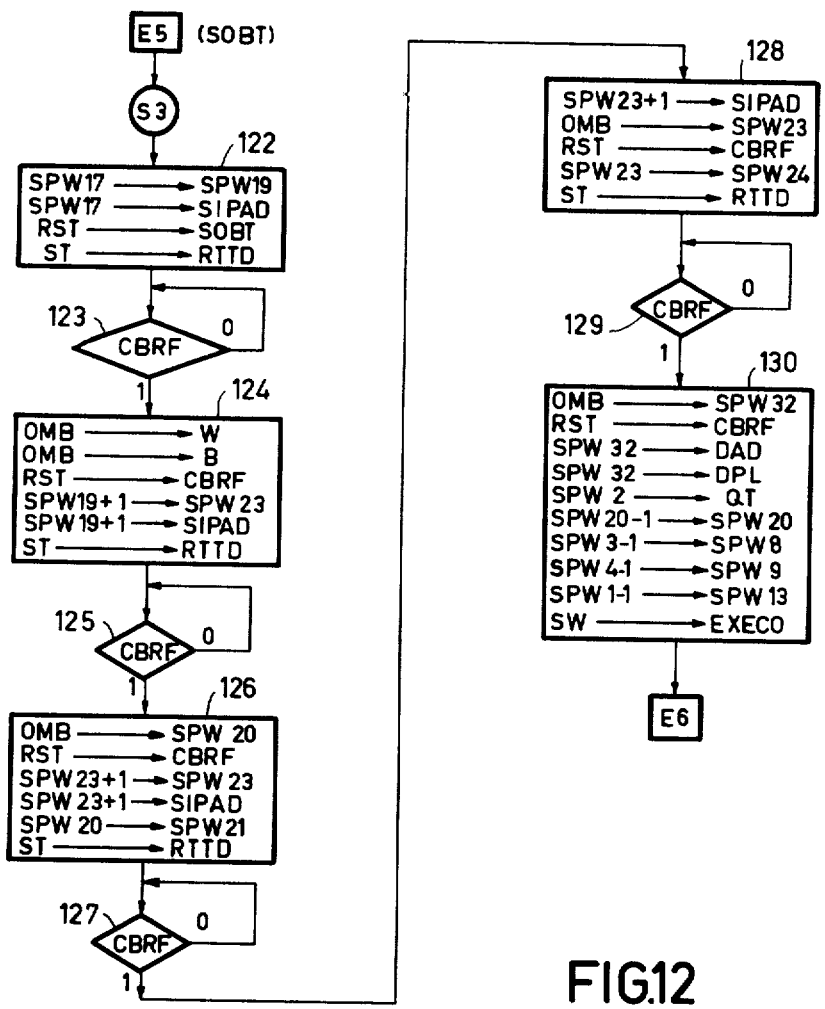
Figure 13:
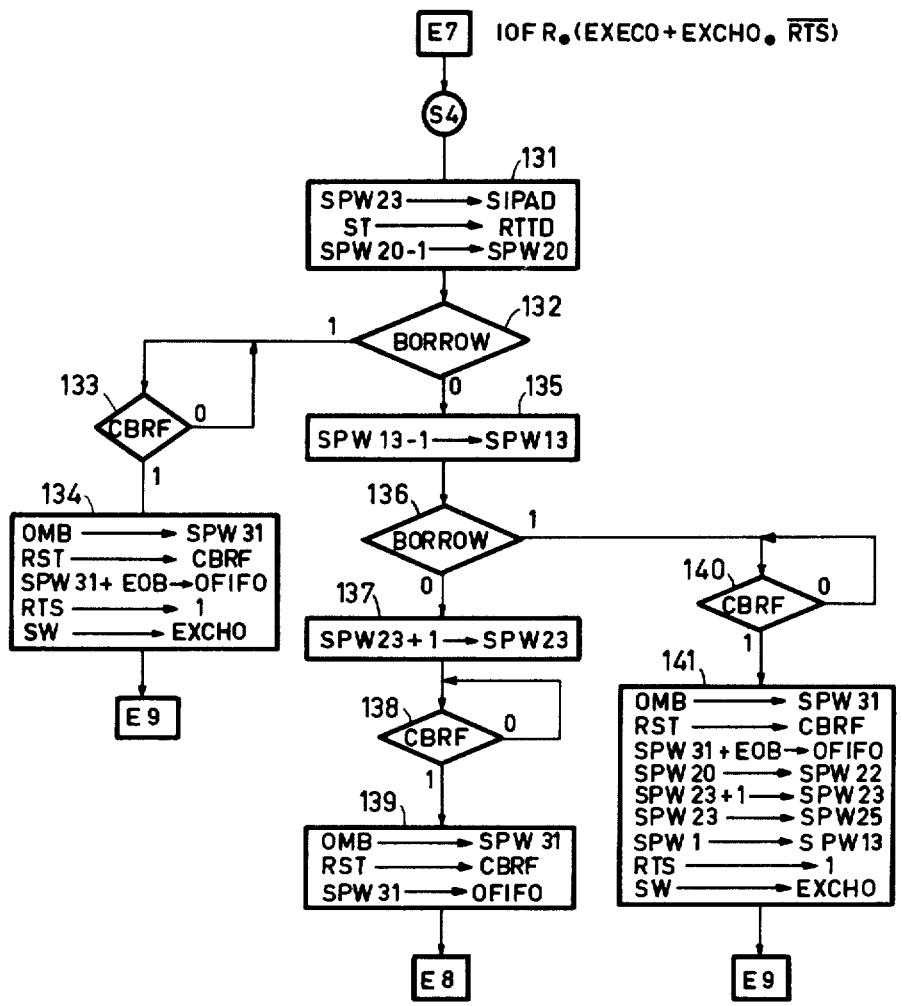

If the state sequencer is not ready to execute this command, NOBSA is kept in SPW17. As soon as the state sequencer switches to state COO at the end of the transfer of the current block, the transmission initialization sequence (S3), described in the flow chart of FIG. 12, may begin.

The appearance of E5 causes the automat to switch to S3 which is the initialization sequence for the transmission of a block.

Block 122

The starting address of the next block NOBSA becomes the starting address of the current block COBSA (SPW17→SPW 19), NOBSA is also loaded into SIPAD to read the first word of the SIP I/O buffer block (SPW17→SIPAD), SOBT is reset (RST→SOBT) and RTTD is activated (ST→RTTD) to load the first word.

The synchronization (CBRF=1) is awaited in test 123.

Block 124

The first word of the block, the flip-flops defining W (await or do not await RNR in the broadcast mode) and B (broadcast mode or addressed mode) are loaded (operations OMB→B, OMB→W); the synchronization CBRF is reset (RST→CBRF), the starting address COBSA is incremented by 1 to point to the next address and loaded in the current address counter CODBA (SPW19+1→SPW23) and also loaded into SIPAD to load the next word (SPW19+1→SIPAD), and RTTD is activated (ST→RTTD).

Once again the synchronization of the BIC is awaited in test 125.

Block 126

The length of the current block to be transferred is loaded into CODBL (OMB→SPW 20), the synchronization CBRF is reset (RST→CBRF), the address of the next word is determined (SPW23+1→SIPAD) and becomes the address of the current word (SPW23+1→SPW 23), the length of the current block to be transferred CODBL is loaded into the counter RODBL which defines the length of the block to be transferred in the event of a retry (SPW20→SPW21), and RTTD is activated (ST→RTTD).

The synchronization of the BIC is awaited in test 127.

Block 128

The address of the next word is calculated (SPW23+1→SIPAD), the starting address of the block is loaded into CODBA (OMB→SPW23), the synchronization CBRF is reset (RST→SBRF), the address of the current block is loaded into RODBA in the event of an error (SPW23→SPW24) and RTTD is activated (ST→RTTD) for the loading of the next word.

The synchronization (CBRF=1) is awaited in test 129.

Block 130

The destination address and the priority level are loaded into SPW32 (OMB→SPW32), the synchronization CBRF is reset (RST→CBRF), the destination address is loaded into the destination register 37 and the priority level into priority register 38 (SPW32→DAD, SPW32→DPL), the transmission timer value TTV is loaded into counter $\theta T$, 32 (SPW2→$\theta T$), the length of the current block is decremented by 1 (SPW20−1→SPW20), the maximum permissible number of RNR is decremented by 1 and loaded into CNN defining the current number of retries on RNR (SPW3−1→SPW8), the maximum number of output retries MORYN is decremented by 1 and loaded in the counter CORYN specifying the current number of retries SPW4−1→SPW9), the packet length PSI is decremented by 1 and loaded into the counter defining the effective length of the packet to be transferred OEPLN (SPW−1→SPW13), and the state sequencer switches to state EXECO (loading of OFIFO 42). The BLS automat, on the appearance of E6, switches to state EXECO.

The sequence S4 is executed on the appearance of E7 and consists in dividing the block into packets which are loaded into OFIFO 42 and in requesting the PLA to transmit a packet as soon as it has been loaded into the OFIFO. This sequence is shown in flow chart 13.

Block 131

The current block address is loaded into SIPAD (SPW23→SIPAD), RTTD is activated to read a word of the block (ST→RTTD) and the length of the block CODBL is deceremented by 1 (SPW20−1=SPW20).

Test 132 is made on the signal BORROW from the arithmetic unit to determine whether the block has been transferred (CODBL=0). If so, the synchronization (CBRF=1) is awaited in test 133, and the operations represented in block 134 are executed.

Block 134

The last word of the block is loaded into TDATA for temporary storage (OMB→SPW31), the synchronization CBRF is reset (RST→CBRF), the last word of the block and the indication of the end of the block (EOB) are loaded into the OFIFO (SPW31→OFIFO, EOB→OFIFO), the request to transmit is activated (RST→1) and the state sequencer switches to state EXCHO (transmission state), operation SW→EXCHO.

Block 135

If the block has not been completely transferred, the length of the packet to be transferred OEPLN is decremented (SPW13−1→SPW13) and the signal BORROW tested in test 136 to determine whether the complete packet has been loaded. If not, the operations of blocks 137 to 139 are executed.

Block 137

The address of the next word is loaded into CODBA (SPW23+1→SPW23).

The synchronization (CBRF=1) is awaited in test 138.

Block 139

The current word defined in block 131 is loaded into TDATA (OMB→SPW31), the synchronization CBRF is reset (RST→CBRF) and the contents of TDATA are loaded into the OFIFO (SPW31→OFIFO).

As shown on FIG. 9, the exit of this sequence is caused by event E8 which causes the automat to be looped in state EXCHO, the part of sequence S4 represented by 131, 132, 135 to 139 being repeated on the appearance of E7 until a block or packet is completely loaded into the OFIFO.

If a complete packet is loaded in test 136, the synchronization (CBRF=1) is awaited in test 140 before the operations of block 141 are executed.

Block 141

The last word of the packet is loaded into TDATA (OMB→SPW31), CBRF is reset (RST→CBRF), the contents of TDATA and the end of the packet (EOP) are loaded into the OFIFO (SPW31+EOP→OFIFO), the length of the current block to be transmitted CODBL is loaded into the counter NODBL defining the length of the next block to be transmitted in the event of an error (SPW20→SPW22), the current address CODBA is incremented (SPW23+1→SPW23) and also loaded into the counter NODBA defining the address of the start of the next block to be transmitted in the event of an error (SPW23→SPW25), the size of the packet PSI is loaded into the counter OEPLN defining the length of the output packet (SPW1→SPW13), the request to transmit is activated (RTS→1) and the state sequencer switches to state EXCHO (SW→EXCHO).

The exit for the BLS automat after loading of either a block or a packet is caused by E9 which causes the automat to switch to the exchange state EXCHIO (transmission and reception).

After having switched into state EXCHO, the BLS loads the next packet into the OFIFO and awaits the end of the transfer of the previous packet, this being followed by a validation of the transmitted packet (RR/RNR) by the destination. During the transfer of a transmission block, several events may occur and they are set out below in table V.

TABLE V

| Event | Significance |
|---|---|
| RR | Logical link established (S5) |
| RNR | Destination not ready (S6) |
| NOT | Nothing received (S7) |
| TF | Transmission error (S8) |
| TPACK | Acknowledgment of packets transmitted (S9) |
| PACKRY | Request for retrying a packet (retransmission) (S10) |

Figures 14, 15, 16:
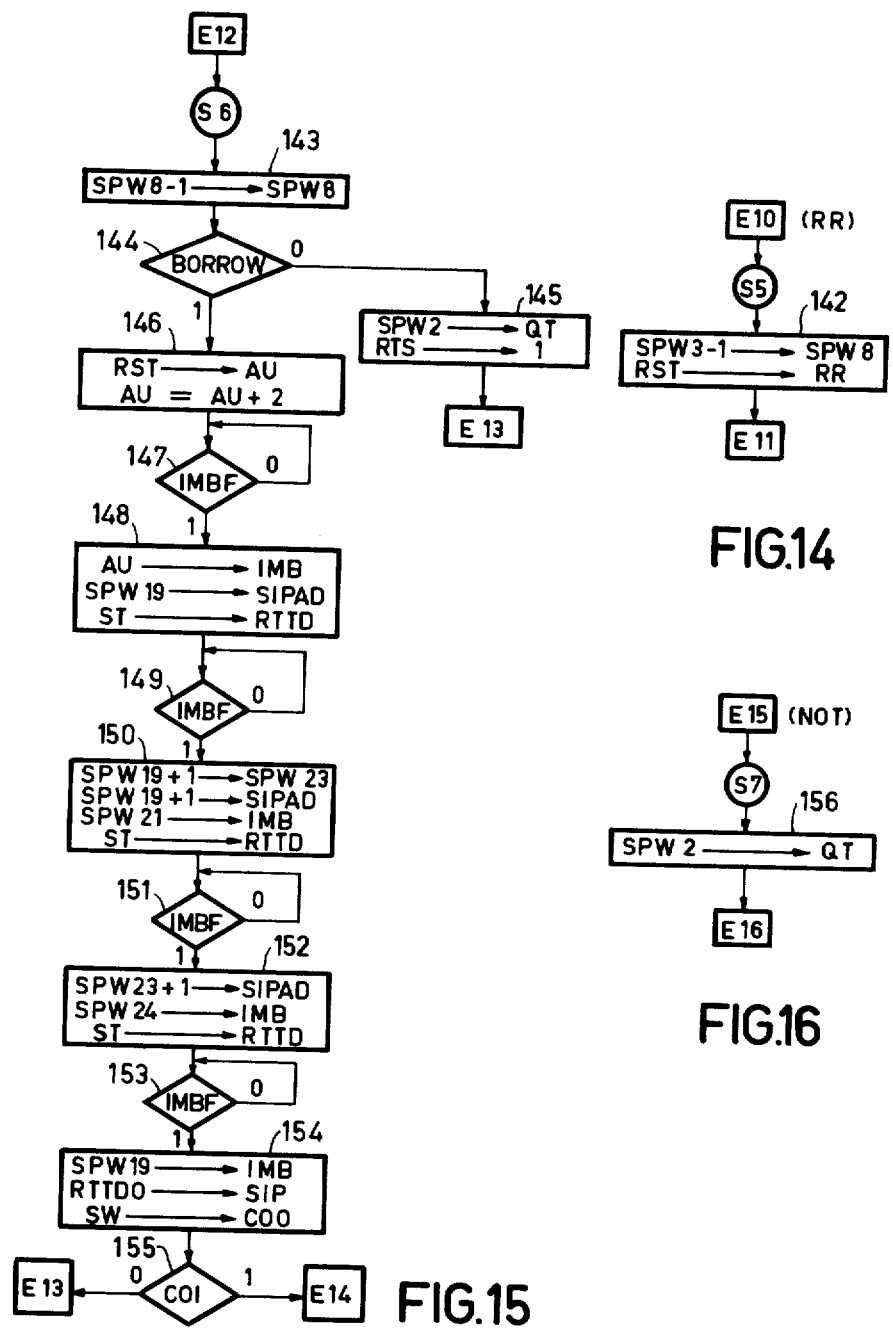

On the appearance of E10, sequence S5 shown in the flow chart of FIG. 14 is executed.

Block 142

With the logical link established, the maximum value of RNR decremented by 1, MNN, is loaded into counter CNN defining the current number of retries on a reply RNR (SPW3−1→SPW8) and RR is reset (RST→RR). Event E10 causes the BLS automat to switch to the same state EXCHIO.

On the appearance of E12 (RNR), sequence S6 shown in the flow chart of FIG. 15 is executed.

Block 143

The counter of RNR (CNN) is decremented (SPW8−1→SPW8).

Test 144 on the signal BORROW shows whether CNN is at 0 or not. If not, a branch is made to block 145.

Block 145

The value of the transmission timer TTV is loaded into counter 32 defining $\theta T$ (SPW2→$\theta T$) and a transmission request is activated (RST→1) E13 is awaited to retransmit the packet.

Block 146

If CNN is at 0 in test 144, a branch is made to block 146. The arithmetic unit AU is reset (RST→AU) and incremented by 2 (AU=AU+2) to position the status word (LS called abnormally occupied).

The release of IMB 25 is awaited (IBMF=1) in test 147. In the next part of this sequence a block defining the transmission result is constituted as already described (block of three words: status word, RODBL and RODBA).

Block 148

The status bits are loaded into the IMB (AU→IMB), the start address COBSA is loaded into SIPAD (SPW19→SIPAD) and a request to load the buffer of the SIP with the status bits is activated (ST→RTTD).

The release of IMB is awaited (IMBF=1) in test 149.

Block 150

The next word is calculated, i.e. COBSA+1 is loaded into CODBA (SPW19+1→SPW23) and into SIPAD (SPW19+1→SIPAD), the length of the block to be transferred in the event of an eeror RODBL is loaded into IMB (SPW21→IMB) and an RTTD to load the SIP buffer with RODBL is activated (ST→RTTD).

In test 151 the freeing of IMB (IMBF=1) is awaited.

Block 152

The next address CODBA+1 is calculated and loaded into SIPAD (SPW23+1→SIPAD), the address of the current block RODBA in the event of an error is loaded into IMB (SPW24→IMB) and an RTTD to load the SIP buffer with RODBA is activated (ST→RTTD).

In test 153, the freeing of IMB is awaited.

Block 154

COBSA is loaded into IMB (SPW19→IMB) and RTTDO is sent to the SIP (RTTDO→SIP) to indicate the end of a transmission, and the state sequencer switches to state COO (SW→COO). In test 155, if the reception part is inactive, (COI), the BLS automat switches to an inactive state (CO), otherwise on (E13) the BLS automat switches to the active reception state (EXCHIO).

In state EXCHIO, E15 (NOT) causes sequence S7 to be executed, as shown in the flowchart of FIG. 16.

Block 156

In this sequence S7, nothing is received (NOT) and the value of the transmission timer TTV is loaded into counter 32 defining $\theta T$ (TTV→$\theta T$) to call the destination again.

Figure 17:
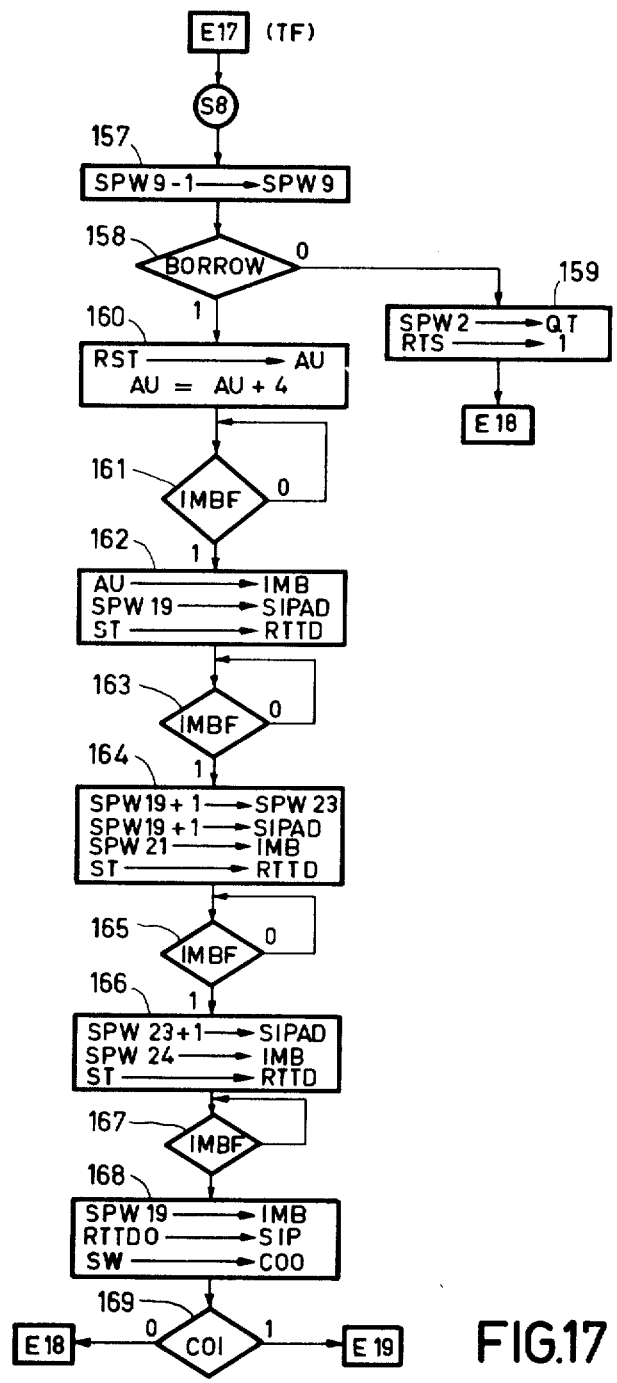

The appearance of E17 (TF) triggers sequence S8, shown in the flow-chart of FIG. 17. In this sequence, if the maximum number of retries is reached, the result block is loaded, otherwise the packet is retransmitted.

Block 157

The maximum number of retries on a reply RNR loaded in CORYN is decremented (SPW9−1→SPW29).

Test 158 on BORROW determines whether CORYN=0, if not 0 block 159 is executed.

Block 159

The maximum value of the transmission timer TTV is loaded into counter 32 defining $\theta T$ (SPW2→$\theta T$) and a request to restart the call is activated (RST→1) as in this case the packet has not been transmitted.

If test 158 determines that CORYN=0, a branch is made to block 160.

Block 160

The arithmetic unit is reset (RST→AU) and incremented by 4 to position the bits in the status word (transmission error) (AU=AU+4).

Figure 18:
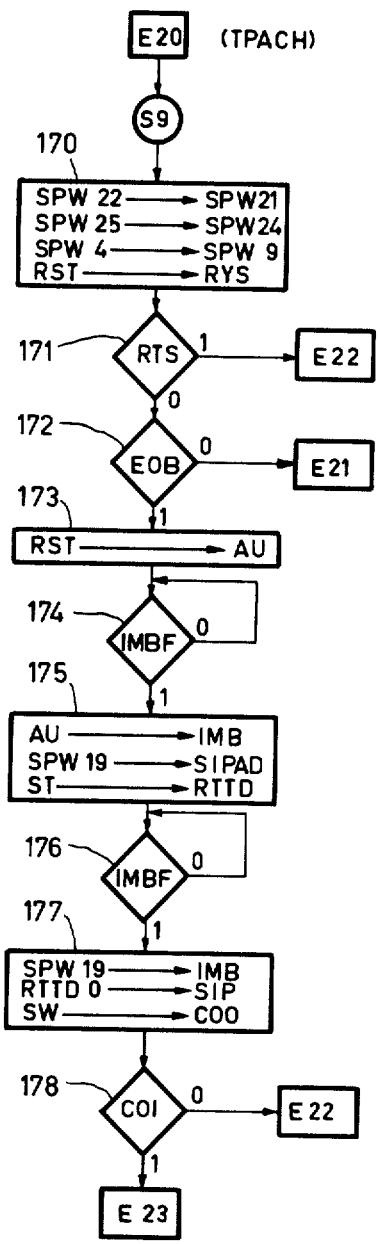

The freeing of the IMB is awaited in test 161. The next part of this sequence (refs. 162 to 169) is identical to that of sequence S6 of FIG. 14 (refs. 148 to 155) i.e. the block defining the result of transmission consists of: status word, RODBL and RODBA. These sequences differ only in their status bits. The BLS automat switches to state CO (E19) or EXCHIO (E18) depending on the state of the reception part (COI). The appearance of E20 (TPACK) causes sequence S9, shown in the flowchart of FIG. 18, to be executed. In this sequence, a packet has been properly transmitted (reply TPACK) and the transmission of the next packet if there is a following packet is prepared.

Block 170

The next block to be transmitted becomes the current block. Thus the length of the next block to be transmitted in the event of an error NODBL, is loaded into RODBL, the length of the current block to be transmitted in the event of an error (SPW22→SPW21), the starting address of the next block in the event of an error NODBA is loaded into RODBA, the starting address of the current block in the event of an error (SPW25→SPW24). The maximum number of retries in the event of an error MORYN is loaded into CORYN, the current number of retries (SPW4→SPW9) and RYS is reset (packet transmitted without an error, hence recovery not required) (RST→RYS). Test 271 determines whether a transmission request (RTS=1) is activated. If so, E22 causes the automat to switch to state EXCHIO where a new transmission can begin. If RTS=0 a transmission request is not ready and test 172 determines whether there is an end of block (EOB). If not (EOB=0), event E21 causes the automat to switch to state EXECO where OFIFO may be loaded with another packet. If there has been an end of block (EOB=1), arithmetic unit AU 29 is reset (RST→AU) in block 173.

The freeing of IMB is awaited in test 174.

Block 175

The coded status bits without an error (000) are loaded into the TSW (transmission status word). The contents of the AU are loaded into the IMB (AU→IMB), the starting address of the current block COBSA is loaded into SIPAD (SPW19→SIPAD) and a request to load the contents of IMB into TSW is activated (ST→RTTD).

The freeing of IMB is awaited in test 176.

Block 177

The starting address of the current block COBSA is loaded into IMB (SPW19→IMB), the status word is sent to the SIP (RTTDO→SIP) and the state sequencer switches to state COO (SW→COO).

In test 178, the BLS automat switches to state CO (E23) or EXCHIO (E22) depending on the reception part (COI).

Figure 19:
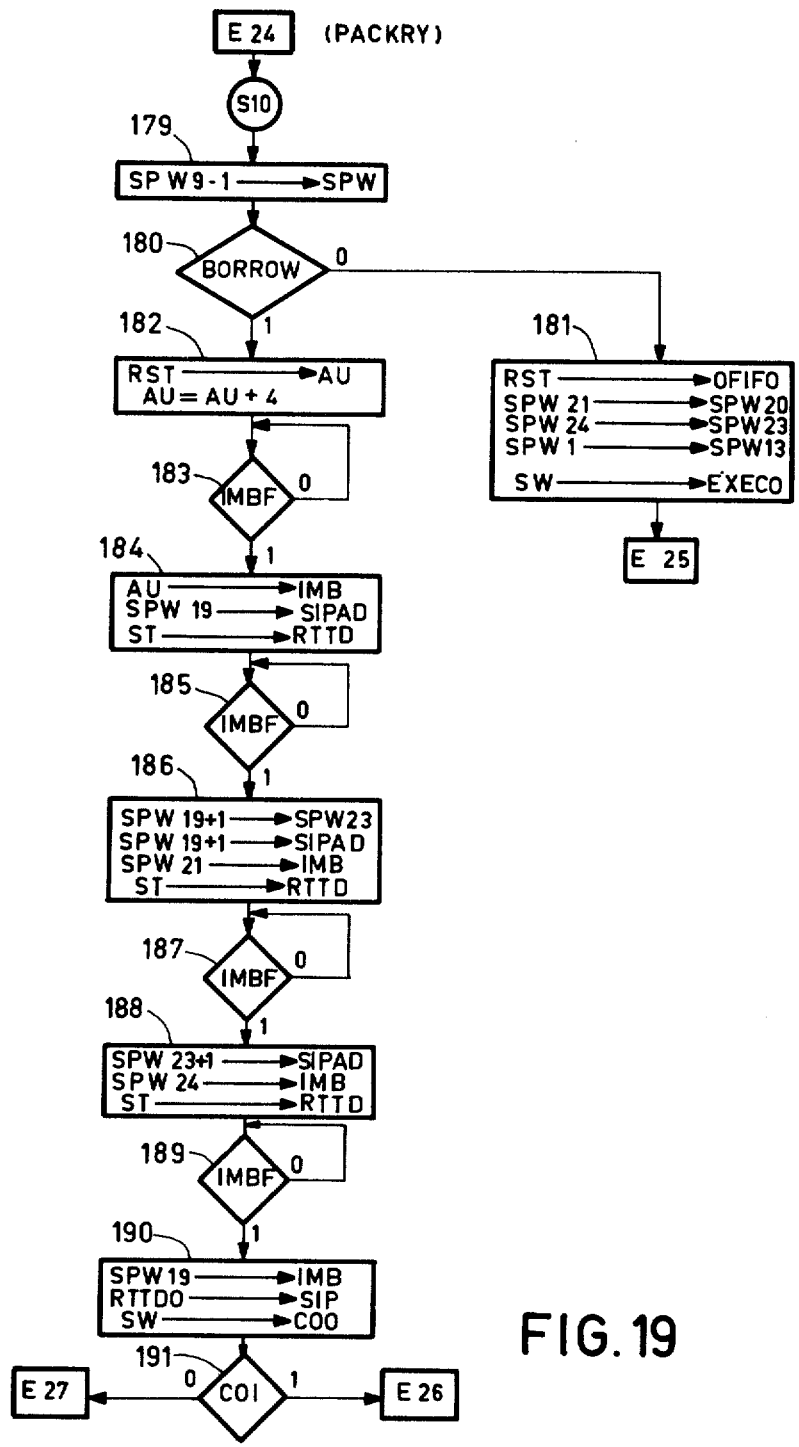

On the appearance of E24 (PACKRY), the sequence S10 shown in the flowchart of FIG. 19 is executed. In this sequence, either a retransmission of the erroneous packet is executed, or the SIP is warned of a transmission error on the network if the maximum permitted number of retries is reached.

Block 179

The counter defining the current number of retries CORYN is decremented by 1 (SPW9−1→SPW9).

If the state of BORROW in test 180 (BORROW=0) determines that CORYN≃0, the operations of block 181 are executed.

Block 181

The OFIFO is reset (RST→OFIFO), the length of the current block remaining to be transferred RODBL is loaded into the counter CODBL defining the current length of the block to be transferred (SPW21→SPW20), the current address of the block still to be transferred RODBA becomes the current address of the block CODBA (SPW24→SPW23), the size of the packet PSI is loaded into OEPLN (size of the packet in transmission) (SPW1→SPW13) and the BLS automat switches to state EXECO (SW→EXECO) on the appearance of E25.

If, in test 180, CORYN=0 (BORROW=1), a branch is made to block 182.

Block 182

The AU is reset (RST→AU) and the operation +4 is performed on it (AU=AU+4) to position the status bits in the status word TSW.

The freeing of IMB is awaited in test 183.

Block 184

The status bits are loaded into TSW. The contents of the AU are loaded into IMB (AU→IMB) and the starting address of the block COBSA in SIPAD (SPW19→SIPAD), and the request to load them into the SIP buffer is activated (ST→RTTD).

The freeing of IMB is awaited in test 185. In references 186 to 190, the same operations as those of sequence S6 (FIG. 15) described above (references 150 to 154) are executed. This means that the transmission result block (3 words) is loaded with the status word, RODBL and RODBA.

In test 191, the BLS automat switches to state CO (E26) or EXCHIO (E27) depending on the state of the reception part (COI).

Figure 20:
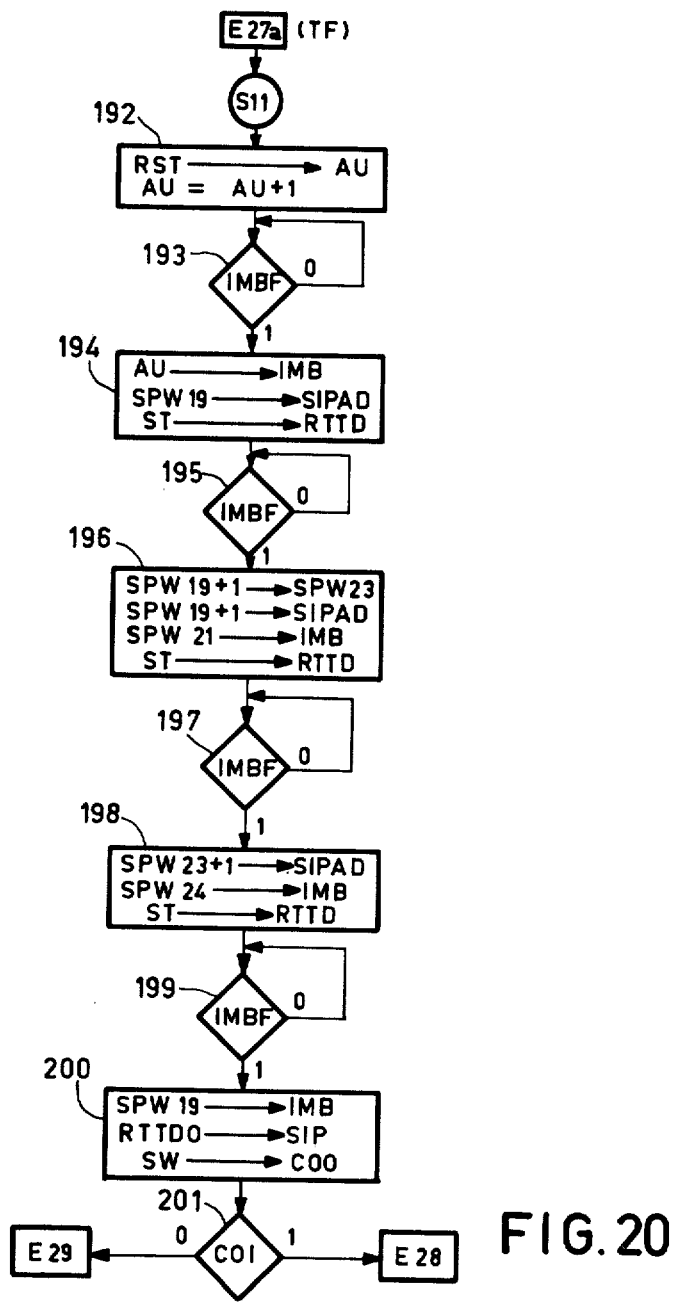

If the transmission network (especially the TM) becomes inoperational, defined by E27a(TF) during an active transmission state (EXCHIO), sequence S11 shown in the flowchart of FIG. 20 is executed.

Block 192

The AU is loaded with the status bits (001) defining the inoperational state of the network by the reset (RST→AU) and +1 (AU=AU+1) operations of the AU.

In references 193 to 200, the same operations as those described in references 147 to 154 of sequence S6 (FIG. 15) are executed, i.e. the transmission result block (3 words) is loaded with the status bits: status word, RODBL and RODBA. This is carried out as already described by the loading of information in IMB and address in SIPAD. The BLS automat switches to state CO (E28) or state EXCHIO (E29) depending upon the state of the reception part (CO1).

On the reception and interpretation of the command (supervision) GPC (E30), sequence S12 shown in the flowchart of FIG. 21 is executed, i.e. command GPC is loaded into OFIFO.

Block 202

The contents of OMB (GPC command) are loaded into the word reserved for temporary storage TDATA (OMB→SPW 31), TDATA is then loaded into OFIFO (SPW31→OFIFO) and synchronization CBRF is reset (RST→CBRF; BLS automat switches either to state EXCHIO or CO. On the appearance of E32 (LUDO), the command updates the line status sequence S13 of FIG. 22 is executed, and the command is loaded into connection table CT.

Block 203

The command is temporarily loaded from OMB into SLADR (OMB→SPW32) and then from SLADR into CT (SPW32→CT) and synchronization CBRF is reset (RST→CBRF). BLS automat switches either to state EXCHIO or CO. On receipt of a reception command RO (event E34), BLS executes sequence S14 shown in FIG. 23 and switches either in state EXCHIO or CO.

Block 204

In this sequence, the starting address of the current reception block in NIBSA defines the starting address of the next reception block (OMB→SPW18), the signal authorizing the reception block is activated (ST→SIBT) and the synchronization is reset (RST→CBRF).

If the state sequencer is ready to execute this command, sequence S15 of FIG. 24 is executed on the appearance of E36. A reception data block is initialized in this sequence.

Block 205

The starting address of the next reception block NIBSA becomes the starting address of the current block CIBSA (SPW18→SPW26) and (SPW18→SPW29) the SIP buffer address is loaded (SPW18+1→SIPAD), signal SIBT is reset (RST→SIBT) and request RTTD is activated (ST→RTTD) to load the first parameter into the SP.

The synchronization (CBRF=1) is awaited in test 206.

Block 207

The length of the current reception block is loaded into the counter CIDBL (OMB→SPW27), the synchronisation is reset (RST→CBRF), the current address CIDBA is updated (SPW29+→SPW29) and loaded into register SIPAD (SPW29→SIPAD) and a request to load the next parameter is activated (ST→RTD).

On receipt of the synchronization in test 208, the operations of block 209 are executed.

Block 209

The starting address of the block is loaded into counter CIDBA (OMB→SPW29). The synchronization is reset (RST→CBRF), the current address of the block CIDBA is updated (SPW29+1→SPW29) and stored in CWA for the subsequent loading of the source address and the block length (SPW29→SPW28), the block length CIDBL is updated (SPW27−2→SPW27) and the sequencer switches to state EXCHI (SW→EXCHI).

Block 210

The semaphore PRS is loaded with the size of the packet to be received (SPW1→PRS), the value of reception timer RTV is loaded into θR (SPW5→θR), the value of retry counter CIRYN is initialization (SPW6→SPW10) and the length of the current packet IEPL is reset (0→SPW11). The exit from this sequence is via E37.

Figure 25:
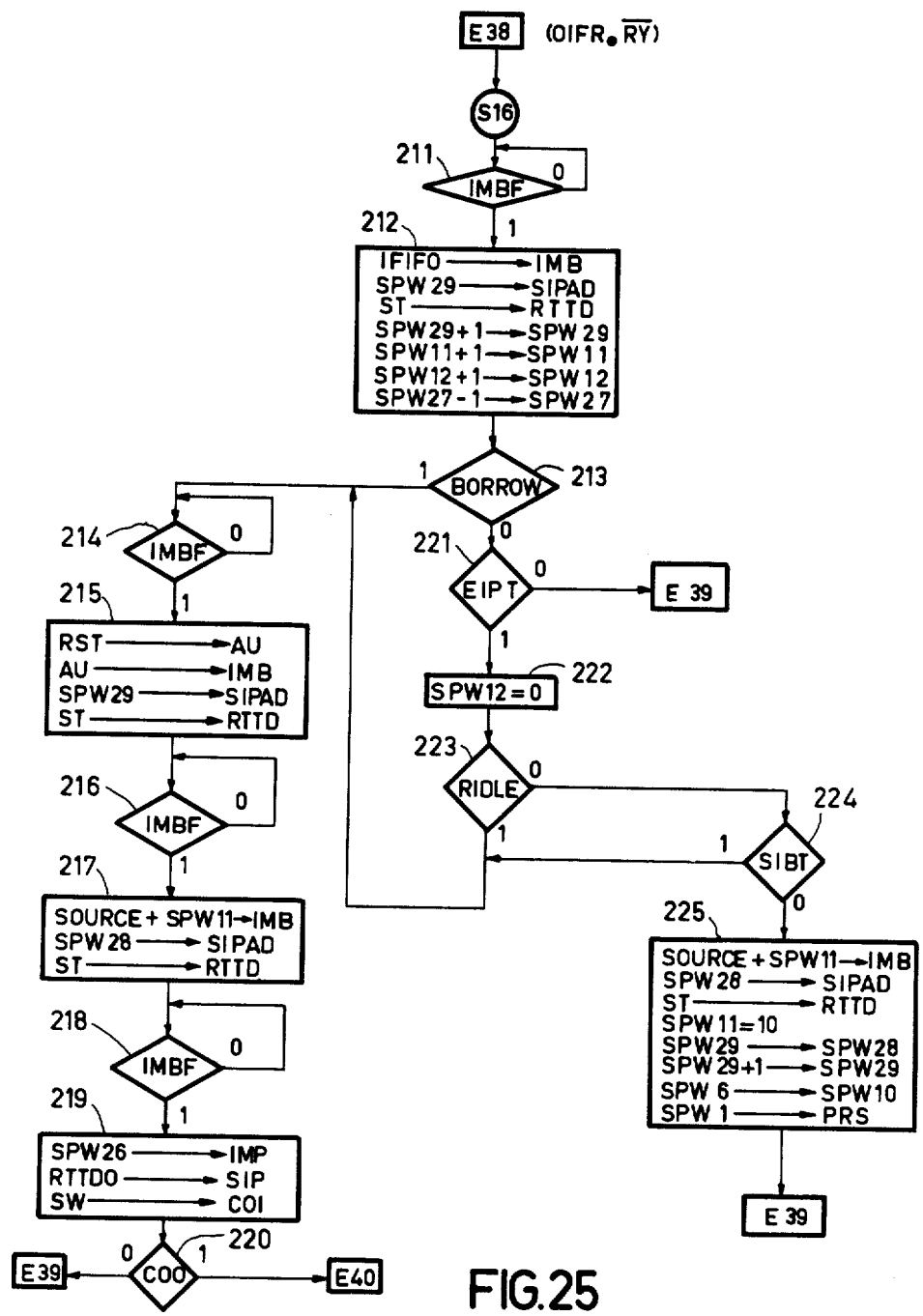

On the appearance of E38 (OIFR.$\overline{\text{RY}}$), sequence S16 of FIG. 25 is executed. This sequence consists in assembling the reception packets and loading them into the allocated input buffer, specifying the source address.

Test 211 determines whether IMB is free (IMB=1).

Block 212

The output (1st word) of IFIFO 41 is loaded into IMB (IFIFO→IMB), the current address of the reception block CIDBA is loaded into the address register of the SIP (SPW29→SIPAD) and a request to load the SIP buffer with the content of IMB is activated (ST→RTTD). The current address of the block CIDBA, the actual length of the packet IEPL, the actual length of the packet to be recovered in the event of an error IEPLR and the length of the block to be transferred CIDBL are updated (operations SPW 29+1→SPW29; SPW11+1→SPW11; SPW12−1→SPW12; SPW27−1→SPW27).

The signal BORROW is tested in test 213 to determine whether the allocated input buffer is full. If so (BORROW=1), a branch to test 214 is made.

The freeing of IMB is awaited in test 214.

Block 215

The AU is reset (RST→AU), the contents of AU are loaded into IMB (AU→IMB), the address of the current word CIDBA is loaded into SIPAD (SPW 29→SIPAD) and next loaded into the SIP input buffer (ST→RTTD).

The freeing of IMB is awaited in test 216.

Block 217

The source address of SAD 36 and the actual length of the packet IEPL are loaded into IMB (SOURCE+SPW11→IMB), the address of the word reserved to keep these parameters (CWA) is loaded into SIPAD (SPW28→SIPAD) and a request to load the SIP buffer is activated (ST→RTTD).

The freeing of IMB is awaited in test 218.

Block 219

The starting address of the current block CIBSA is loaded into IMB (SPW26→IMB) and the SIP is alerted by a status read command (RTTDO→SIP). The state sequencer switches to state COI (SW→COI) and the BLS automat switches to state CO (E40) or into an active transmission state on E39, i.e. EXECO or EXCHIO. If, in test 213, the input buffer is not full (BORROW=0), a subsequent test, 221, is made to detect the end of the transfer of the reception packet (EIPT=1). Otherwise (EIPT=0), an exit is made via E39. If an end of packet transfer is detected (EIPT=1), the length of the packet to be recovered IEPLR is reset (SPW12=0) in block 222.

Thereafter, the state of the reception automat at packet level is tested in test 223 (RIDLE). If the automat is inactive (RIDLE=1), a branch is made to block 214, followed by the sequence for the input buffer full.

If RIDLE=0, a test 224 is made to determine if the signal to start the transfer of a reception block is activated (SIBT=1). If so, a branch is made to block 214. If not (SIBT=0), the operations of block 225 are executed.

Block 225

The source address and the actual length of the packet IEPL are loaded into IMB (SOURCE+SPW1-1→IMB), the address of the word reserved to keep these parameters (CWA) is loaded into SIPAD (SPW28→SIPAD) and a request to load the SIP buffer is activated (ST→RTTD). Next the actual length of the packet IEPL is reset (SPW11=0), the current address of the block CIDBA is loaded into CWA, reserved to load the parameters (SPW29→SPW28), the current block address is updated (SPW29+1→SPW29), the maximum number of reception retries MIRYN is loaded into the counter defining the current number of retries CIRYN (SPW6→SPW10) and the size of the packet PSI is loaded into the semaphore PRS (SPW1→PRS).

At the end of the various sub-sequences described, the BLS automat may switch on the appearance of E39 into state EXCHIO or EXECO. In this state S16 may begin again on the appearance of E38 (IFIFO ready to transmit). During the reception of a packet, certain events may appear, and these are defined in table VI.

TABLE VI

| Event | Significance |
|---|---|
| SPE | Parity error in the channel used by the source (S17) |
| SRYD | Detection of a retry by the source (S18) |
| RTVOUT | Value of the reception timer reached (time out) (S19) |

Figure 26:
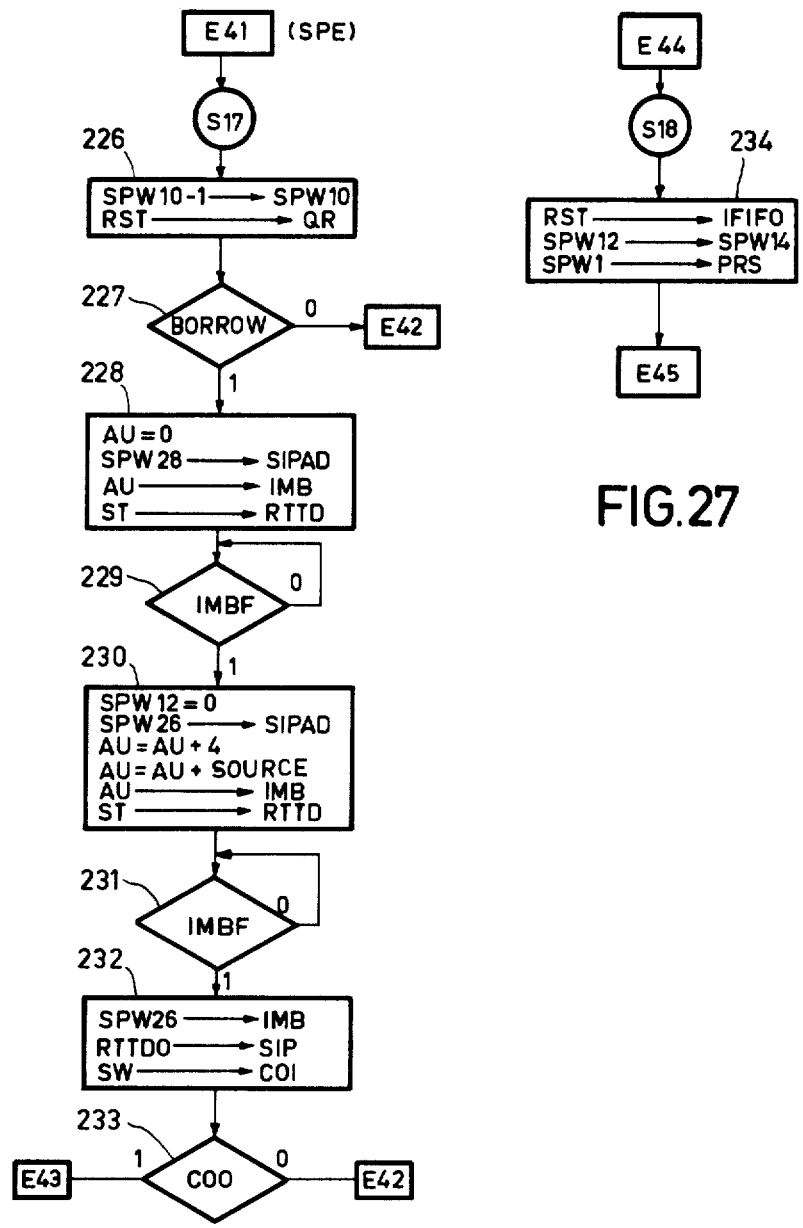

On the detection of a parity error (E41), sequence S17 is executed (FIG. 26). In this sequence, either the number of retries is decremented, or the result is loaded into the RSW (reception status word) if the maximum number of retries has been reached.

Block 226

The number of current retries CIRYN is updated (SPW10−1→SPW10) and counter 31 defining the maximum time OR between the transmission of two words by a source is reset (RST→θR). CIRYN=0 is tested in test 227. If BORROW=0, CIRYN≈0 and the BLS automat switches to state EXCHIO or EXECO via E42 and the packet may be retried.

Block 228

If BORROW=1, CIRYN=0, the AU is reset (AU=0), the address of the word reserved to keep the parameters, CWA, is loaded into the SIP address register (SPW28→SIPAD), the contents of AU are loaded into IMB (AU→IMB) and O is loaded into the address defined by CWA via an activation of RTTD (ST→RTTD).

The freeing of IMB is awaited in test 229 (IMBF=1).

Block 230

The length of the packet to be recovered IEPLR is reset "recovery impossible" (SPW12=0), the starting address of the block is loaded into the SIP address register (SPW26→SIPAD), the operation +4 is performed on AU (AU+4=AU), the source address is loaded into the AU in the suitable position bits (AU+SOURCE=AU), the contents of AU are loaded into IMB (AU→IMB) and then loaded into the RSW of the block via a load request (ST→RTTD). As soom as IMB is freed in test 231, block 232 is executed.

Block 232

Figure 27:
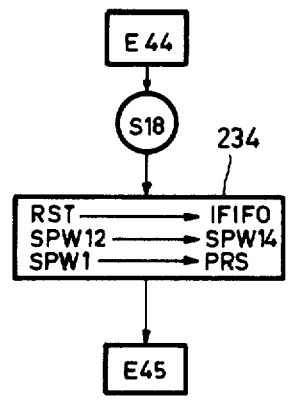

The starting address of the block CIBSA is loaded into IMB (SPW26→IMB) and a read status word command is sent to the SIP (RTTDO→SIP) so that SIP may read the result loaded into RSW. The state sequencer switches to state COI (SW→COI). The BLS automat switches to state CO (E43) or EXECO/EXCHIO (E42) depending on the state of the transmission part. On the detection of a retry by the source (E44), sequence S18 of FIG. 27 is executed, i.e. the recovery parameters are loaded.

Block 234

The IFIFO is reset (RST→IFIFO). The length of the packet to be recovered IEPLR is loaded into CIEPLR this counter defining the current value of IEPLR during the recovery (SPW12→SPW14), and the packet size PSI is loaded into the semaphore PRS (SPW1→PRS). The automatic switches to state EXCHIO or EXECO.

Figure 28:
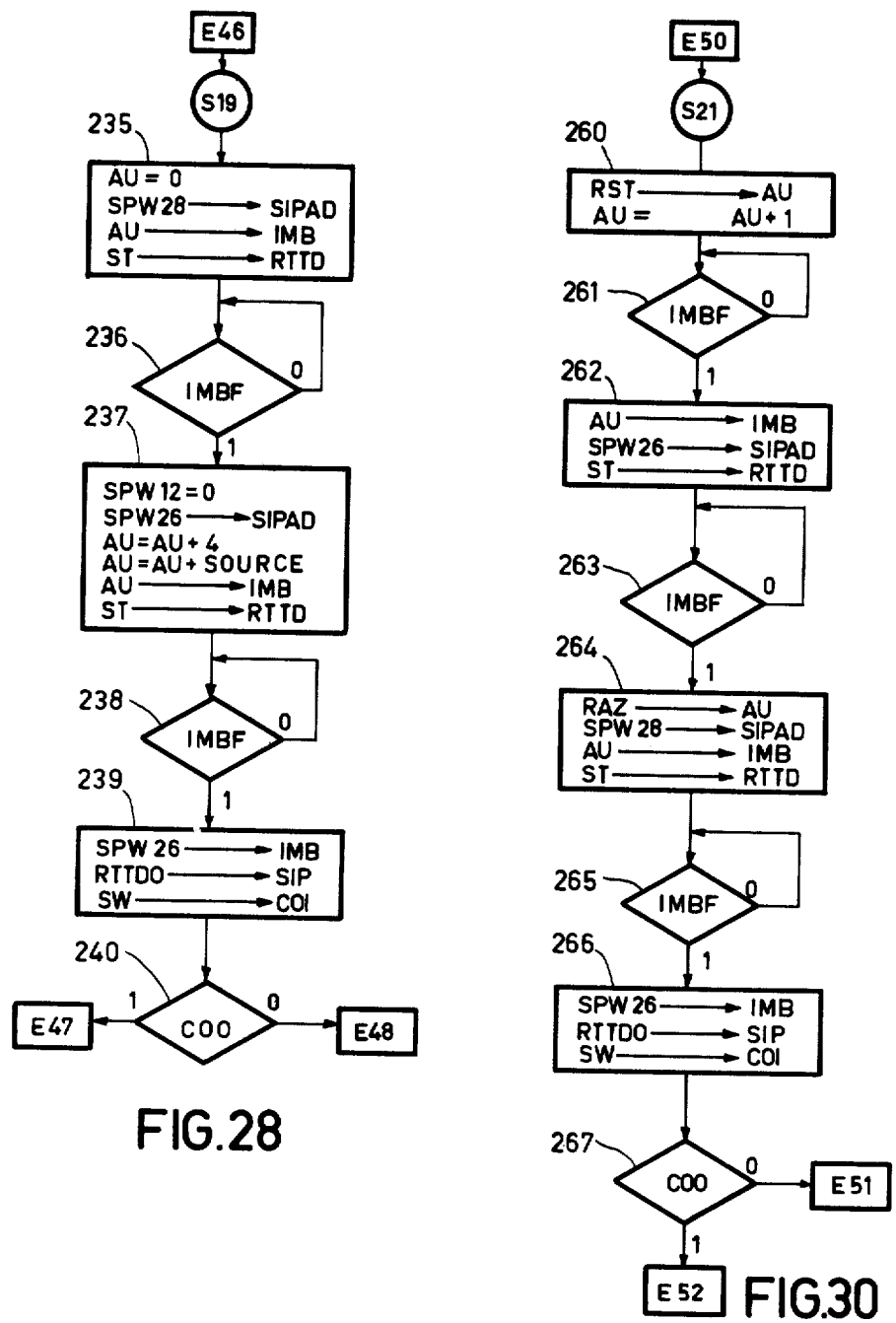

On the appearance of E46 (RTVOUT), signifying the exceeding of the value allocated to the timer RTV, sequence S19 of FIG. 28 is executed. In this sequence, the SIP is informed of the abnormal behaviour of the source by loading of the appropriate status bits in the SIP buffer, and the various counters concerned are reset. In fact, the operations performed in blocks 235 to 240 are the same as those executed in blocks 228 to 233 of sequence S17.

The BLS automat switches to state CO (E47) or EXCHIO/EXECO (E48) depending on the state of the sequencer's transmission part.

Figure 29:
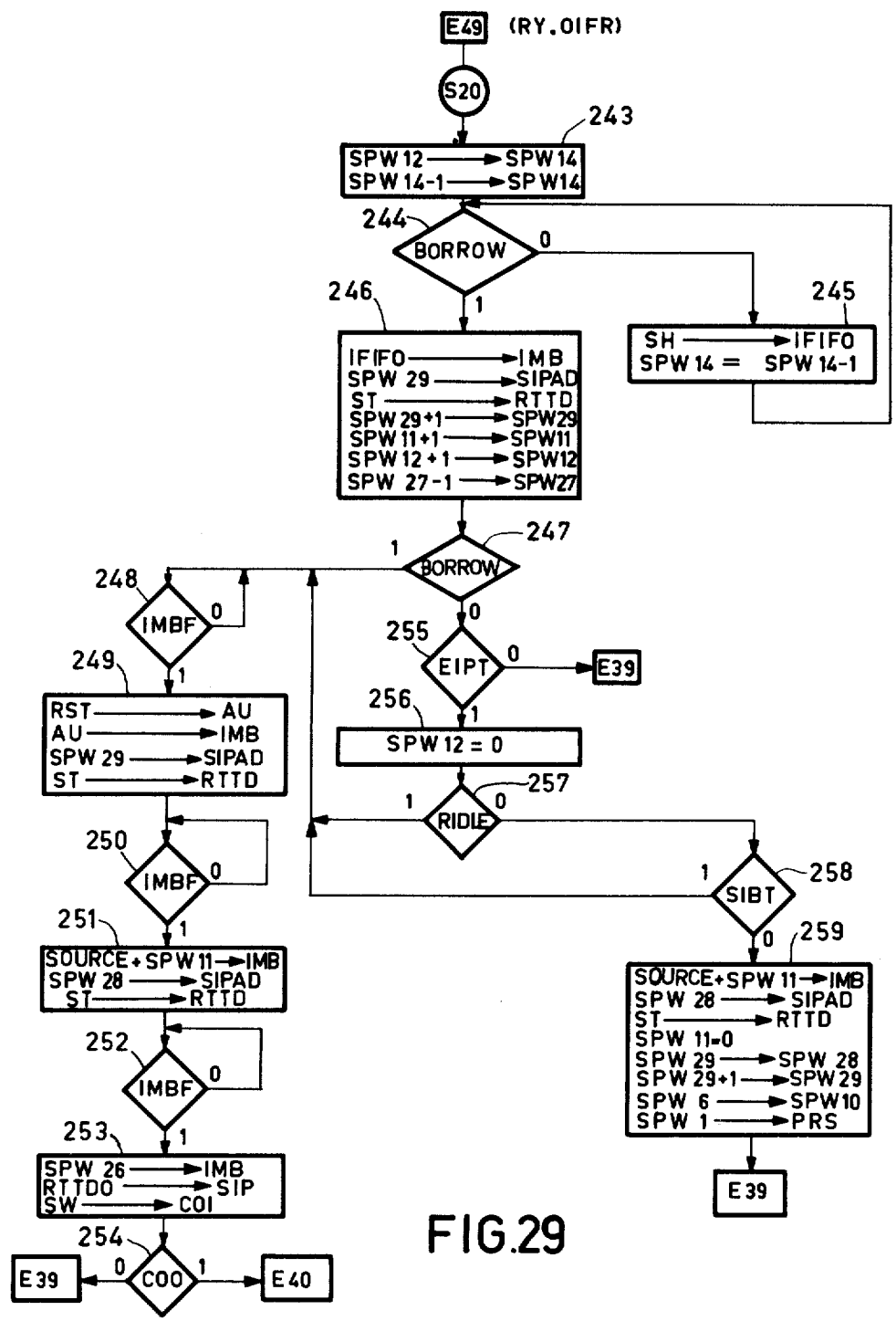

When a packet retry is received, sequence S20 of FIG. 29 is executed on the appearance of E49 (RYOIFR). This sequence, which consists in assembling the received packets and loading them into the allocated input buffer specifying the source address, is the same as that of FIG. 25 except that in this sequence the packet is a retry packet and the counters concerned must be updated.

Block 243

The length of the packet to be recovered IEPLR is loaded into the counter CIEPLR defining the current value of IEPLR during recovery (SPW12→SPW14) and CIEPLR is then updated (SPW14−1→SPW14).

The BORROW signal is tested in test 244. If BORROW=1, CIEPLR=0, the packet to be recovered is fully transferred and a branch is made to block 246. If BORROW=0, CIEPLR≈0, the packet is not transferred and the operations of block 245 are performed, consisting in eliminating the words received correctly from the recovered packet.

Block 245

The IFIFO is shifted i.e. the next word is issued (SH→IFIFO), counter CIEPLR is updated (SPW14 SPW14−1) and test 244 on BORROW=performed.

In the next part of sequence S20, references 246 to 259, the operations are the same as in sequence S16 (FIG. 25), references 212 to 225. This means that the tests for a full buffer, the reception automat in the idle state RIDLE, the end of packet transmission, etc., are executed and the counters concerned are updated.

If event E50 (NOTOP) occurs in the state EXCHIO or EXECO, sequence S21 of FIG. 30 is executed. In this sequence, the status "network not operational" is loaded into the input buffer and the SIP is alerted.

Block 260

The AU is reset (RST→AU) and the operation +1 is then carried out (AU=AU+1), i.e. the status bit (network not operational) is positioned.

The freeing of IMB is tested in test 261.

Block 262

The state bits are loaded into IMB (AU→IMB), the start address of block CINSA is loaded into the address register of the SIP (SPW26→SIPAD) and the SIP buffer is loaded (ST→RTTD) Once again the freeing of IMB is tested in test 263.

Block 264

The AU is reset (RST→AU), the contents of CWA, the address of the word reserved to load the parameters relating to the packet, are loaded into the SIP address register (SPW28→SIPAD), O is loaded into IMB (AU→IMB) and the contents of IMB are loaded into the SIP buffer (ST→RTTD).

Once again the freeing of IMB is awaited in test 265.

Block 266

The starting address of the block CIBSA is loaded into IMB (SPW26→IMB) and the SIP is informed by a status read command (RTTDO→SIP). The state sequencer switches to state COI and the BLS automat to state CO (E52) or EXCHIO/EXECO (E51) depending on the state of the transmission part of the sequencer.

In FIG. 3, PLA 23 consists of the following four components:
transmission automat (TA) effecting the transmission of packets under control of BLS 22,
reception automat (RA) for selecting sources (control of the start of transmission) and for the reception of valid packets;
the word level automat (WLA) for emitting words of various types (data, GPC, destination supervision, source supervision, etc.) in the appropriate LS channels, said words coming from the TA and RA;
a decoder to decode the information coming from the TM.

Figure 31:
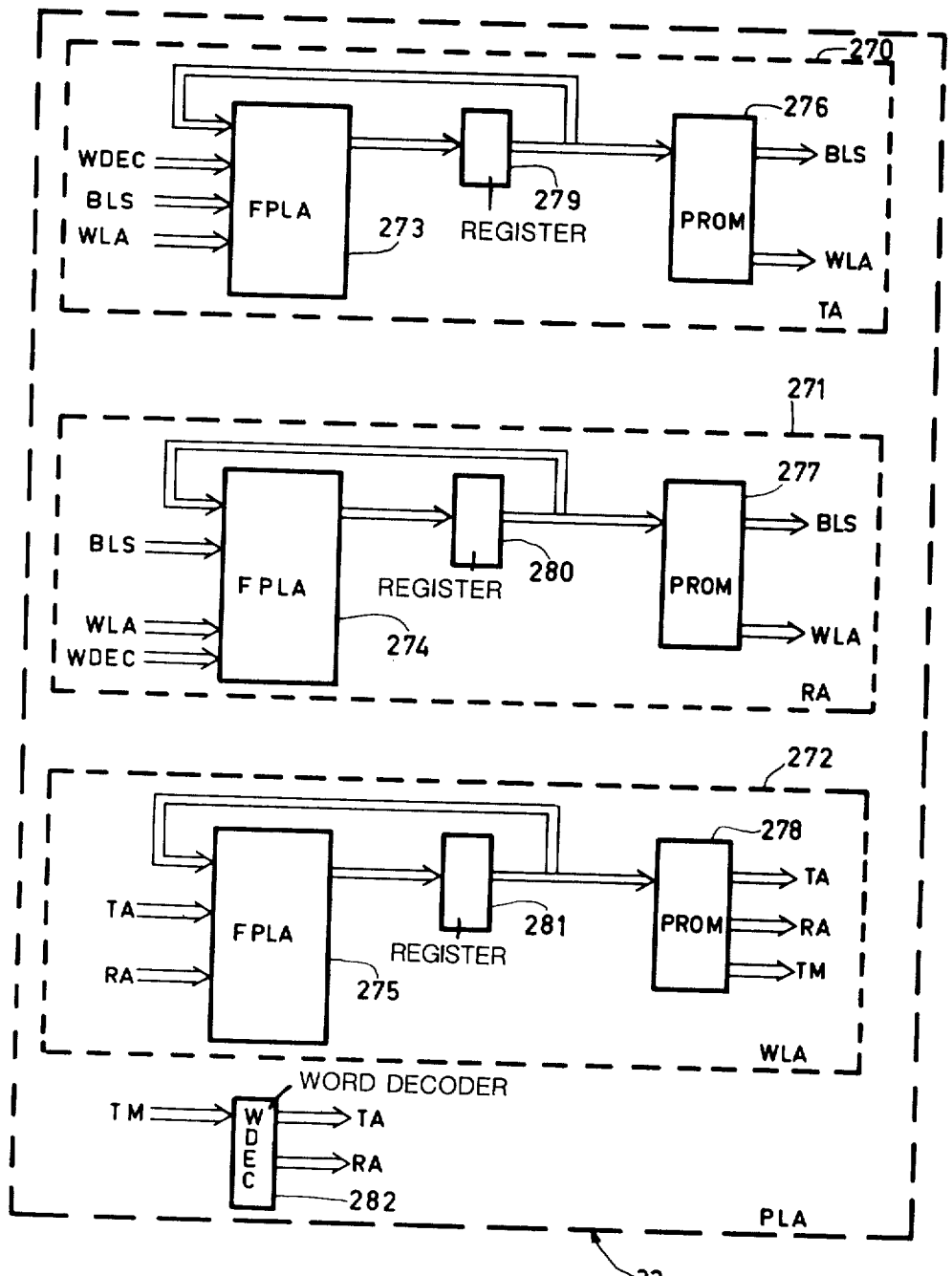
FIG. 31 shows the structure of the packet level automat (PLA)
Figure 31:
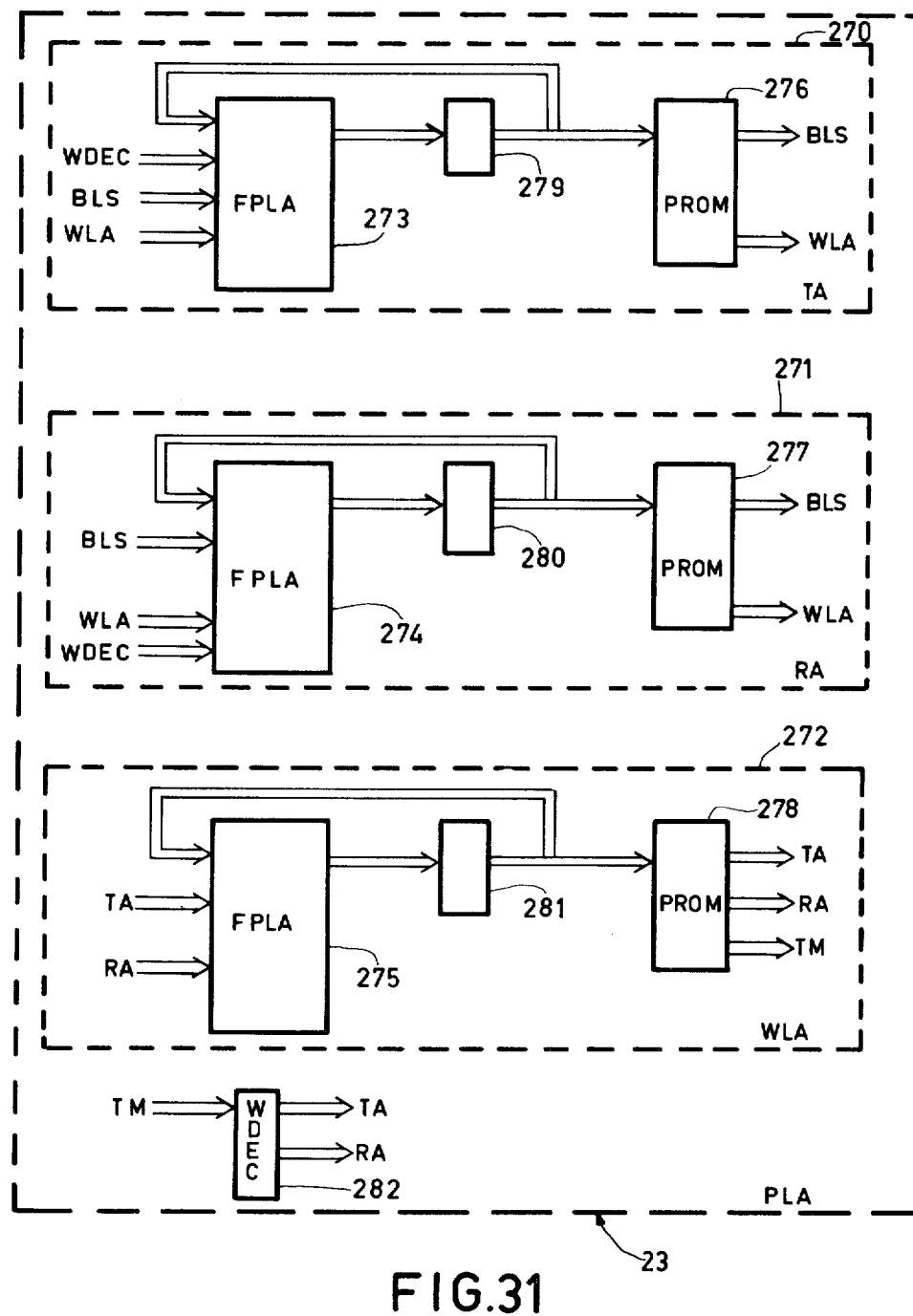

FIG. 31 shows the structure of PLA 23. All the automats of the PLA are of the "Moore" type as already described for the BIC 21 (FIG. 5). In FIG. 30 the automats TA, RA and WLA are represented by 270, 271 and 272 respectively. The FPLAs and the PROMs of TA, RA and WLA are represented by 273, 274, 275 and by 276, 277 and 278 respectively. The status registers linked to the FPLA (input and output) and the PROM of each automatic mechanism are shown as 279 to 281. The information coming from the TM is decoded by a word decoder (WDEC) 282. The system of communications between the automats and the higher (BLS) and lower (TM) levels is described in table VII below.

TABLE VII

| Automat | Input from | Output to |
|---------|------------|-----------|
| TA | BLS | BLS |
|  | WLA |  |
|  | WDEC | WLA |
| RA | BLS | BLS |
|  | WLA | WLA |
|  | WDEC |  |
| WLA | TA | TA |
|  | RA | RA |
|  |  | TM |
|  |  | (interface) |

Figure 32:
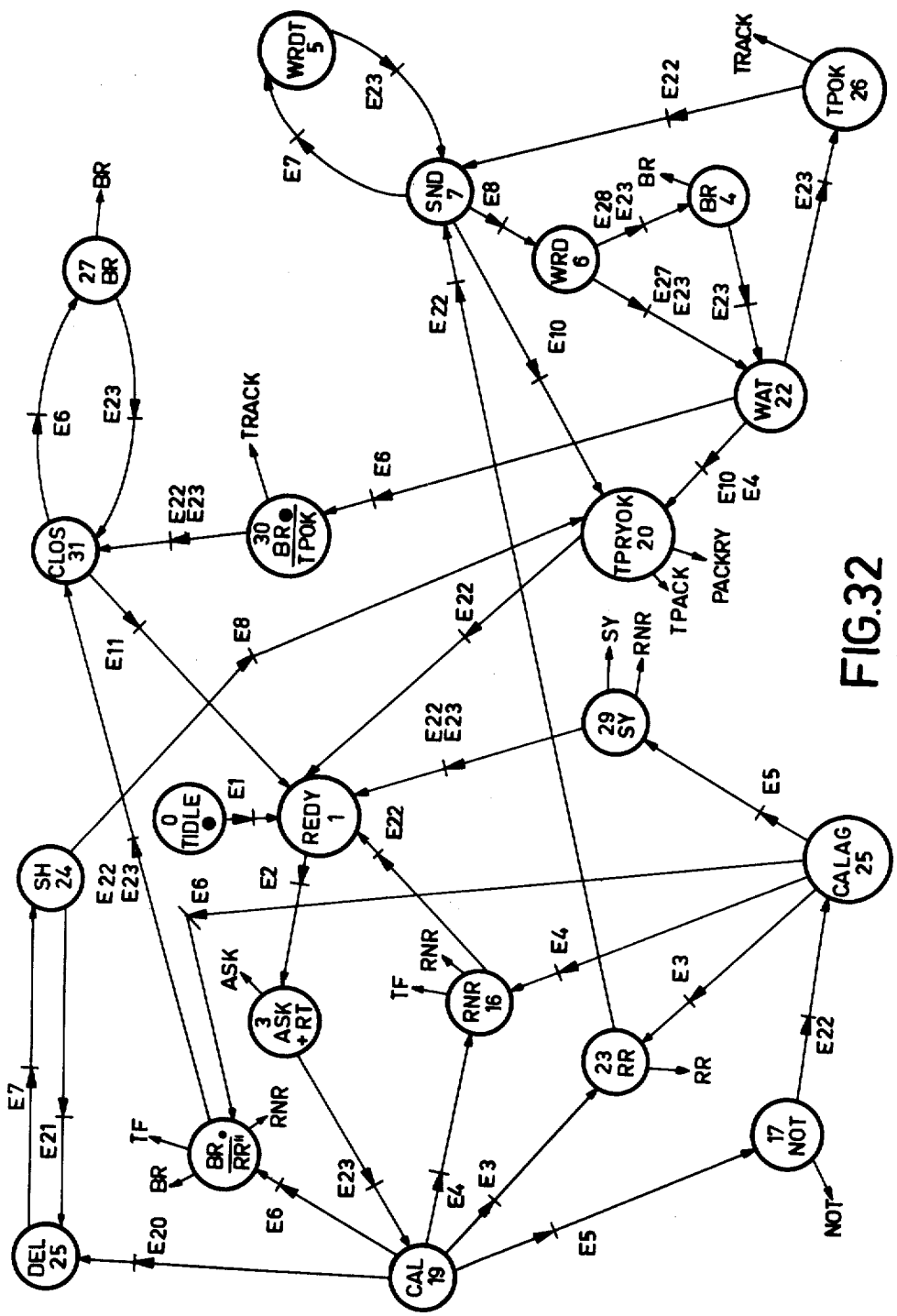
FIG. 32 is a Petri network of the part of the transmission automat (TA) of the PLA responsible for packet transmission (TPA)
Figure 33A:
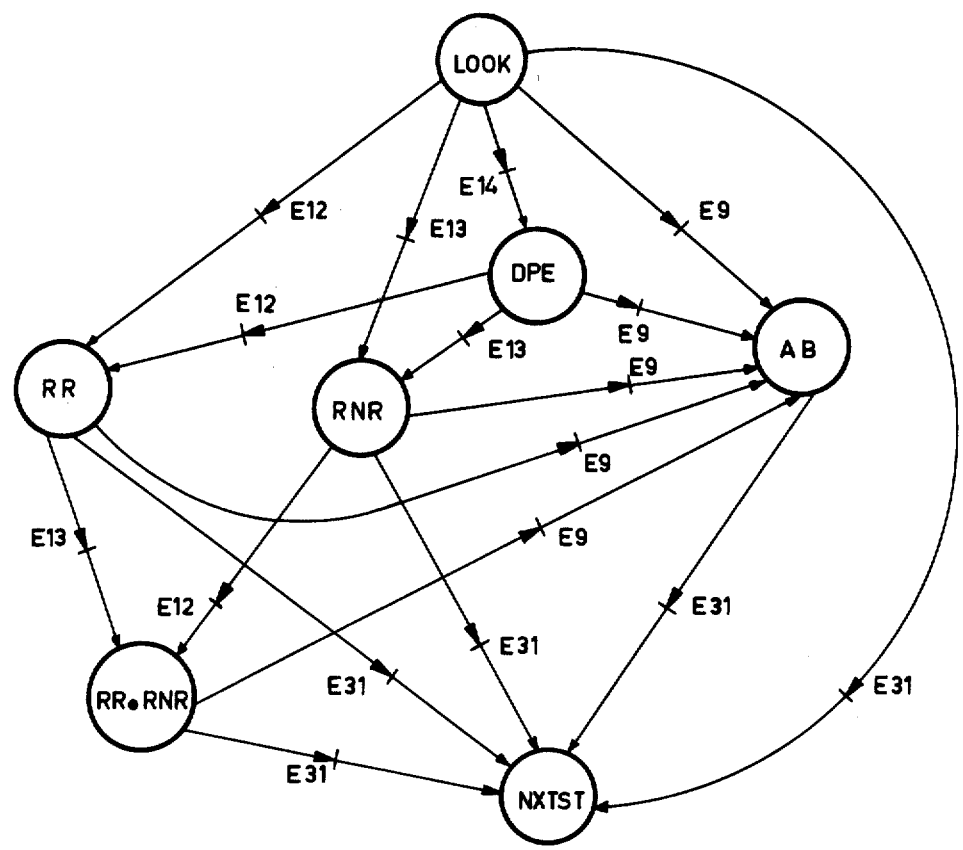
FIGS. 33a, 33b and 33c are Petri networks of the part of the TA of the PLA responsible for analyzing and synchronizing the supervisions arriving from the destinations (TPA)
Figure 33B:
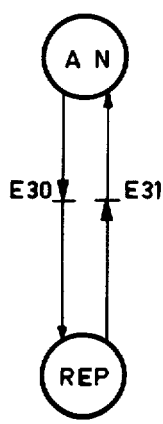
Figure 33C:
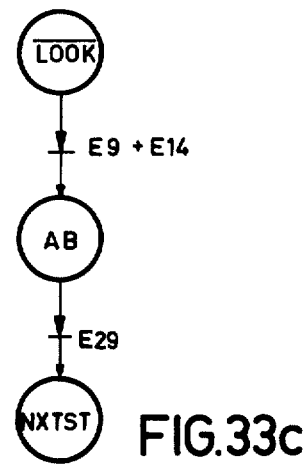

FIG. 32 is a Petri network showing the evolution of the TA for the transmission packets (TPA) and FIGS. 33a, 33b and 33c are Petri networks showing the evolution of the part of the TA for analyzing and synchronizing the supervisions from the destinations (TTA).

The events at packet level are defined below. As already stated, the several automats of BIC 21, BLS 22 and PLA 23 operate in synchronism, i.e. they monitor the appropriate events from the others to switch to the appropriate next state.

The events defined below relate to TA and it is clear that some of them are also necessary for the BLS automat, for example.

Transmission events at packet level relating to TPA and TTA automats

E1—EOI→end of initialization
E2—RTS→request to send
E3—RTS.EOA.RRS.(1+RNRS.$\overline{W}$)
E4—EOA.RNRS
E5—EOA.NOT.RYS
E6—EOA.(RRS.RNRS.W+AB.+RRS.$\overline{RTS}$)
E7—OOFR.EOB.EOP
E8—OOFR.(EOB+EOP)
E9—AB+DPE.B
E10—EOA.(RNRS+AB)
E11—EOA.(RNRS+NOT)+STR
E12—RR→destination ready to receive
E13—RNR→destination not ready to receive
E14—A.DPE→destination parity error in addressed mode
E20—NOT.RYS.EOA
E21—INCON. (unconditional branch)
E22—BLOK→BLS acknowledgment
E23—WLOK→WLA acknowledgment
E27—EOP→end of packet
E28—EOB→end of block
E29—EOA E30—EOA→end of analysis on coherent reply, used to cause the TPA and TTA to switch to transitory states
E31—(OBLRFN.OWLRFN).EOAS→end of analysis, used to switch the TTA to the next state.

The signals defining the events are described below. Some of them are already defined in the description of the protocols (in a general manner) and of the BLS automat, but are redefined for the sake of clarity.

W—If W=1, retry the call in broadcast mode on receipt of RR and RNR. If W=0, transmit the packet at the end of $\theta$T if at least one RR has been received.
RRS—Destination ready (supervision word).
RNRS—Destination not ready (supervision word)
RYS—Retry state (supervision word)
NOT—Nothing received
AB—Cancel (abort)
DPE—Destination parity error
STR—Switch to REDY (ready) state
OOFR—OFIFO output ready to transfer
A—addressed mode
B—broadcast mode
OBLRFN—BLS acknowledgment
OWLRFN—WLA acknowledgment The main states of FIG. 32 are TIDLE (idle) 0, REDY (ready) 1, CAL (call) 19, CALAG (call again) 25, SND (send) 7, WAT (wait) 22 and CLOS (close) 31. The other transitory states will be defined in the following description. The states of FIGS. 33a to 33c. will be defined with reference to the following description. The TA comprises two specialized automats. TPA for packet transmission (FIG. 32), and TTA for analyzing and synchronizing the supervisions from the destinations (FIGS. 33a to 33c), both of them operating synchronously. In a given state, for instance, TTA analyses the supervisions from the destinations and activates certain events which cause TPA to change state. The description below refers to FIGS. 32 and 33.

Initially, TPA is in the TIDLE state and TTA in state $\overline{\text{LOOK}}$, corresponding to the states RDY+SND+IDLE of TPA. The token (.) of TPA is thus in the IDLE state and that of TTA in the $\overline{\text{LOOK}}$ state. The TIDLE state of TPA is entered via an MCL (master clear) or a disconnection command, and the $\overline{\text{LOOK}}$ STATE OF TTA via the two commands or an analysis of the next state. At the end of an initialization (E1), TPA switches to state 1 REDY, TTA remains in state $\overline{\text{LOOK}}$.

Phases REDY (ready) and CAL (call)

As soon as a packet is fully loaded into the BLS'OFIFO, BLS sends a transmission request RTS (E2) which causes TPA to switch to state 3 (ASK+RY), which is the state call or call again (transitory). State LOOK corresponds to the main states CAL+CALAG+WAT+CLOS of TPA. TPA sends a request for transmission of ASK to WLA, this command being loaded into the destination address and priority level registers 37 and 38 of CM.

As soon as an ASK is sent on a channel to the destination (S), WLA activates an event WLOK (E23) which causes the TPA to switch to state CAL 19. The TTA which is in the LOOK state, analyzes each coherent reply coming from the destinations defined in the supervision word ASK. In the addressed mode, the end of analysis (EOA) E30 appears as soon as a coherent reply is received or $\theta$T is reached (A.CA+$\theta$T), while in the broadcast mode EOA appears when time $\theta$T is reached. The end of analysis triggers the appropriate events which cause the TPA to move to a state relative to the result of analysis as described above.

A distinction must be made between E30 (EOA) and E31. The end of analysis (EOA) E30 is defined by $\theta T$ (broadcast mode) and by either the first coherent reply (RR/RNR/AB) or $\theta T$ (addressed mode). The result of EOA (E30) causes the TPA to switch to the transitory states.

E31 comprises E30 synchronized and the acknowledgments of the BLS and WLA, the latter being used to cause the TTA to switch to the next state (NXTST). FIG. 33b shows the use of E30 and E31. The TTA is in the analysis state (AN) and at the end of the analysis, E30 causes the automat to switch to the state REP, in which the result is sent to the TPA, and in which the TTA awaits the reply from block (BLS) and word (WLA) levels. On receiving these replies (E31), the TTA simultaneously switches into analysis state (AN) and the next state (NXTST).

Addressed mode

On receipt of a reply RR (destination ready) and if the conditions defined by E3 exist, the TPA switches to state 23 RR where an event RR is sent to the BLS. On the receipt of E22 (block level OK) from the BLS, the TPA switches to state 7 SND and the TTA to state NXTST (next state) which is LOOK, via LOOK→E12→RR→E31→NXTST (LOOK).

The end of analysis EOA (31) causes the TTA to switch to the appropriate next state (NXTST) depending upon the transistory states and the result of analysis.

On receipt of EOA and RNR (destination not ready) E4, the TPA switches to state 16 RNR and an RNR event is sent to the BLA. On receipt of E22 from the BLS, the TPA switches to state 1 REDY and the evolution of the TTA is: LOOK state→E13→RNR state→E31→NXTST (LOOK) state. On receipt of EOA.AB (abort) the evolution of the TPA is the same as for RNR, except that an event TF (transmission fault) is sent to the BLS. The evolution of the TTA is: LOOK state→E9→AB state→E31→NXTST (LOOK) state. On receipt of EOA.DPE (destination parity error), the evolution of the TPA is the same as for AB where a coherent reply is not received during $\theta T$; the evolution of the TTA is: LOOK state→E14→DPE state→E9→AB state→E31→NXTST (LOOK) state. Otherwise, the evolution of the TPA depends upon the coherent reply received (RR, RNR, AB).

If the result of EOA is "nothing received" during $\theta T$, the TPA switches via E5 to state NOT (nothing), sends a NOT event to the BLS and switches to state 25 CAL.AG on receiving E22 from the BLS. The TTA remains in the LOOK state, i.e. the next state is LOOK. It is clear that the evolution of the TPA from the CAL state to the other main states depends upon the end of analysis (EOA) and also on the special conditions of events E3, E4 and E5. The definition of EOA is: A (addressed mode). CA (coherent reply) + $\theta T$.

Broadcast mode

If the result of EOA indicates all RR replies out, the TPA switches state 7 SND and the TTA to state LOOK, as described for an RR reply in the addressed mode.

If the result of EOA is entirely RNR replies, the TPA switches to state 1 REDY and the TTA to the state LOOK, as described for an RNR reply in the addressed mode.

If the result of EOA gives RR and RNR replies, the TPA switches to state 7 SND via state 23 RR, as already described, if the signal to await RNR ($\overline{W}$) is not activated. If activated (W) the TPA switches to state 31 CLOS via E6, state 11 BR.RR and E22, E23. In state BR.RR the logical links are interrupted before a retry and an RNR event is sent to the BLS. On receipt of E22 from the BLS and E23 from the WLA, the TPA switches to state 31 CLOS. The evolution of the TTA is: LOOK→E13→RNR state→E12→RR.RNR state→E31→NXTST (LOOK) state, or: LOOK state→E12→RR state→E13→RR.RNR state→E31→NXTST (LOOK).

If the result of EOA shows at least one AB reply, the TPA switches to state 31 CLOS via E6→state 11→BR.RR→E22 and E23, as already described, except that in this case the event sent to the BLA is TF. Moreover, a command to interrupt the logical link is sent to all. The evolution of the TTA is: state LOOK→E13→state RNR→E12→state RR.RNR→E9→state AB→E31→state NXTST ($\overline{\text{LOOK}}$).

If nothing is received during $\theta T$, the evolution of the TPA is: state 19 CAL→E5→state 17 NOT→E22→state CAL.AG 25, as already described and the TTA switches back to the state LOOK.

Phase CALAG (call again)

Destinations may be incapable of replying to a request ASK during $\theta T$ because they are occupied. The silence of a destination may not, however, exceed the maximum duration of a logical link $2\theta T$ and every destination which is not faulty will always reply at the end of a logical link.

In state 25 CALAG, the behavior of the TPA and TTA is as described for state 19 CAL in the addressed and broadcast modes, with one exception: the evolution of the TPA is to the states REDY, CLOS and SND via transitory states depending on the analysis of the TTA, while the evolution of the TTA is to the next appropriate state ($\overline{\text{LOOK}}$ or LOOK) via transitory states. The exception is that where no reply is received at the end of $\theta T$, the TPA switches to state 29 SY (synchronization state) via E5. In state 29 SY, RNR is sent to the BLS (addressed mode) and a supervision SY (for synchronization in the broadcast mode) is sent to the destinations. On receiving the reply from the BLS (E22), the TPA switches to state 1 REDY. The evolution of the TAA is: state LOOK→E31→state NXTST ($\overline{\text{LOOK}}$). The situation "no reply" may be caused by the inability of all the destinations to reply to a broadcast call.

Phase SND (send)

During this phase the TPA transmits a packet of data to the destinations. As soon as a word is ready for transfer (E7), the TPA sends a request to the WLA to transmit the word in the next available source channel, and switches from state 7 SND to state 5 WRDT (transmit a word). On the reply WLOK (E23) from the WLA indicating that the word has been transmitted, the TPA switches to state 7 SND. This switching between the states SND and WRDT is repeated until an event E8 indicating the end of a block (EOB) or a packet (EOP). The TTA remains in the state $\overline{\text{LOOK}}$. The appearance of EOB or EOP causes the TPA to switch to state 22 WAT (wait) via transitory state 6 WRD. This state WRD is necessary to allow the transfer of the last word of the packet. If E8 is an EOP, the TPA switches to state 22 WAT via E27/E23, i.e. a request for the transmission of the last word is sent to the WLA which replies with WLOK (E23). If E8 is an EOB, the TPA switches to transitory state 4 BR (interrupt or break the logical link) on the appearance of E28 (EOB to the WLA) and E23 (WLOK from the WLA). In this state 5 BR a supervision word BR (Break) is sent to the destinations to inform them of the interruption of the logical link, and then the TPA switches to state 22 WAT on the reply WLOK from the WLA (23). In this sequence the evolution of the TTA is: state $\overline{\text{LOOK}}$→E31→state NXTST (LOOK).

If, during this data transmission phase (main state SND), the TTA detects the event E9 (parity error in the broadcast mode, or AB), or event E14 (parity error in the addressed mode) it evolves in the following manner: state $\overline{\text{LOOK}}$→E9/E14→state AB→E9→state NXTST $(\overline{\text{LOOK}})$. This is shown in FIG. 33c. Event E29 is $\overline{\text{EOA}}$ because the TTA is not in an analysis phase in LOOK, i.e. the TTA does not await the end of analysis but immediately activates a procedure for the recovery of the packet. On the appearance of E10 the TPA switches to the transitory state 20 (TPRY+OK) which is the state in which the signals relating to the sequences are sent. If E10 follows an event AB, the TPA sends PACKRY (packet retry) to the BLS and on recepit of BLOK (E22) from the BLS, switches to state 1 REDY and the retry sequence may start. The retry of the packet causes the TPA to switch to state 7 SND via state 19 CAL after the updating of the counter CORYN (maximum number of retries); if the packet is retransmitted without any errors, the sequence for transmission in the phase SND is terminated. If the retry was not successful, it is repeated until CORYN=0, when the communication is abandoned and the SIP is informed of the impossibility of transmission.

Phase WAT (wait)

The state 22 WAT is implicitly a call state (CAL) because the transmission of the last word in the packet in state 6 WRD implies that the source wishes to maintain the logical link. In state 22 WAT, the counter $\theta T$ is started.

State WAT (addressed mode)

In the addressed mode the TPA awaits a coherent reply (AB/RR/RNR). If this reply is RR, i.e. if the destination has selected the current source for the next logical link, the TPA switches, on the appearance of E3, to the transitory state 26 TPOK. Here, TPACK (acknowledgment of the transmission of the packet) is sent to the BLS and the appearance of E22 causes the TPA to switch to state 7 SND where the transmission of the next packet may start. The corresponding evolution of the TTA is: state LOOK→state RR→E31→state NXTST (LOOK).

If the destination's reply is RNR, i.e. if the current packet has been correctly received by the destination but it is not ready to receive a new packet from the same source, the TPA switches, on the appearance of E4, to transitory state 20 (TPRY+OK). The acknowledgment of the current packet TPACK is sent to the BLS and, on receipt of BLOK (E22) from the BLS, the TPA switches to state 1 REDY when an explicit call (CAL) may start. The corresponding evolution of the TTA is: state LOOK→state RNR→E31→state NXTST (LOOK).

If the reply is AB (error), on the appearance of E10 the TPA switches to state 20 (TPRY+OK) where PACKRY (packet retry) is sent to the BLS. On the reply BLOK (E22) from the BLS, the TPA switches to state 1 REDY where the retry of the packet may start. As already described, the packet retry is repeated until successful retransmission occurs: otherwise the communication is abandoned when CORYN=0 and the SIP is informed.

If there is no coherent reply, when $\theta T=0$, the evolution of TPA and TTA is the same as that described for a reply AB. There may be a destination fault which can be established by retrying the transmission.

Phase WAT (broadcast mode)

This is similar to the addressed mode.

If all the replies (during $\theta T$) are RR, the evolution of TPA and TTA is the same as that described for RR received in the addressed mode.

If all the replies are RNR, the evolution of TPA and TTA is the same as that described for RNR in the addressed mode.

If a reply AB is received, the evolution of TPA and TTA is the same as that described for AB in the addressed mode.

If the replies received are RR and RNR and if the condition $(\overline{\text{W}})$ exists, the evolution of TPA and TTA is the same as that described for RR in the addressed mode, i.e. the packet is transmitted to the destinations which have replied with RR; clearly, the destinations replying with RNR do not accept the packet which is lost to them. This sequence is used to transmit urgent packets in the broadcast mode.

If the replies received are RR and RNR in the normal broadcast mode, i.e. if $\theta T$ is awaited, (W) the replies are dealt with as RNR and the evolution of TPA and TTA is the same as that described for RNR in the addressed mode, i.e. the packet is validated and a return is made to state 1 REDY when the next explicit call may start. This sequence is normally used when a communication is to be transmitted to all (initialization or updating of multiple file copies, for example).

Phase CLOS (close)

This phase follows the states which comprise the use of a supervision BR (break the logical link), i.e. a BR in the states WAT, CAL or CALAG causes the TPA to switch to state 31 CLOS. Event E6 defines the conditions for a supervision BR. Either the source is not ready to send the next packet $(\overline{\text{RTS}})$ in the state 22 WAT, or an AB is detected or $\theta T$ exceeded in the states CAL and CALAG. In these cases the evolution of the TPA is either: state WAT→E6→transitory state 30 BR.TPOK→E22/E23→state 31 CLOS, or: state 19 CAL→E6→transitory state 11 BR.$\overline{\text{RR}}$→E22/E23→state 31 CLOS, or: state 25 CALAG→E6→state 11 BR.$\overline{\text{RR}}$→E22/E23→state 31 CLOS. In state 30 BR.TPOK, the acknowledgment of the current transmitted packet TPACK is sent to the BLS and, in state 11 BR.$\overline{\text{RR}}$, a transmission fault (TF) or RNR is sent to the BLS. The replies BLOK and WLOK (E22 and E23) cause the TPA to switch to state 31 CLOS. The TTA switches back in state LOOK in all three cases. The destination must recognize BR by RNR to be sure that the logical link is properly interrupted or broken.

If RNR is received in state 31 CLOS, the TPA, on the appearance of E11, switches to state 1 REDY and the TTA evolution is: state LOOK→E31→state NXTST $(\overline{\text{LOOK}})$.

If AB is received in state CLOS, the TTA switches to state 27 BR via E6. Here, the BR has been incorrectly interpreted by the destination and an explicit BR is again sent in state 27 BR. The TPA switches to state 31 CLOS on reply E23 from the WLA and awaits the RNR from the destination. On every AB reception the TPA again switches to state 27 BR, this process being repeated until the retry counter=0 or until an RNR is received. If the retry counter reaches 0, the communication is abandoned, the SIP and BLS are informed and the TPA switches to state 1 REDY on a signal STR (E11). If RNR is received, TPA also switches to state 1 REDY via E11, as already described, and TTA's evolution is: state LOOK→RNR→E31→state NXTST ($\overline{\text{LOOK}}$).

If nothing is received (NOT), it is probable that the destination has switches to the idle state, in which it cannot interpret a supervision BR. In this case, the communication is abandoned, the SIP and BLS are informed and the TPA switches to state 1 REDY via E11 (condition STR). The evolution of the TTA is: LOOK→E31→state NXTST (LOOK).

Phase DEL (delete)

If, when a packet is retransmitted, the source receives no coherent reply from the destination (RR/RNR/AB), the TPA switches to state 25 DEL on the appearance of E20, i.e. on the retry condition (RY) NOT (nothing received). In this state, it is implicit that the packet has been correctly received by the destination and the retransmission of the packet is caused by an incorrect interpretation of the destination's reply by the source. In this case, the destination does not reply to the call because the packet has indeed been properly received and the destination may have given the next logical link to another source. The TPA switches via E7 to state 24 SH where a word from the OFIFO is shifted (erased) and then switching unconditionally via (E21) to state 25 DEL. This switches between the states DEL and SH is repeated until the packet to be recovered has been completely shifted out from the OFIFO. Once the last word of the packet has been shifted out from the OFIFO, the TPA switches to state 20 (TPRY+OK) via E8. In this state, TPACK (packet transmitted) is sent to the BLS and the TPA switches to state REDY on BLOK (E22) from the BLS. The evolution of the TTA in this sequence is: state LOOK→E31→state NXTST ($\overline{\text{LOOK}}$). In state 1 REDY, the normal sequence for the transmission of the next packet may start.

The flow-charts 34a to 34c show the selection mechanisms controlled by the reception automat (RA) relative to the state of the destination. The RA will be described later. With reference to the flow-chart of FIG. 34a, when an addressed call (AASK) is detected by the destination, ref. 280, the sequence executed is determined by the state of the RA. If it is in the idle state (RIDLE), test 281, i.e. if no logical links have already been established, the first call AASK is selected.

Block 286

The address of the selected source becomes the address of the current source CSA (LD→CSSA), the RA switches to state RR (SW→RR), a supervision RR establishing the logical link with the selected source is sent, and an exit made via EXIT while awaiting the data from the source.

If the RA is not in the idle state RIDLE=0 in test 281, the destination has already established a logical link and has already selected the next source. In this case, a test is made on a bit NSB which indicates whether the next source asking for a link is a broadcast call (BASK). If so, NSB=1 in test 282, the current AASK is refused and a branch made to EXIT. A broadcast call (BASK) has a higher priority than an addressed call (AASK). If NSB=0 in test 282, the next source selected is an addressed call and a branch is made to test 288. In test 288, the priority level of the incoming call ASKL is compared with that of the next source selected NASKL. If ASKL is equal to or lower than NASKL (condition O), a branch is made to EXIT, i.e. the current AASK is not selected for the next logical link (RNR is sent to the source concerned, with the RA switches to the appropriate state). The source may repeat the call until it is accepted or up to the specified maximum number of retries, when the call is abandoned. If ASKL is greater than NASKL in test 288 (condition 1) a branch is made to block 289.

Block 289:

The current (incoming) source becomes the next selected source NAS, its address is stored (LD→NAS) and ST→NASK) and a branch is made via EXIT while awaiting the data from the selected source. The next source selected becomes the current source at the end of the current logical link (RA state LOOK).

When a broadcast call (BASK) is detected by the destination, ref. 283, and if the destination is synchronized, SYN=1 in test 284, the sequence executed is determined by the state of the RA. If the RA is in an idle state, RIDLE=1 in test 285, the sequence described for block 286 is executed.

If the RA is not in the idle state RIDLE=0 in test 285, the bit NSB is tested in test 287 to determine whether the next source selected is in the broadcast or addressed mode. If the next source is in the broadcast mode, NSB=1, test 288 is executed as already described. If the priority of the current call is higher than the next call selected (ASKL greater than NASKL) determined by the condition 1, the sequence of block 289 is executed as described and a branch is made to EXIT while awaiting the data from the source.

If ASKL is equal to or less than NASKL (condition O), the current source (incoming) is not selected and a branch is again made to EXIT, with RNR sent to the source at the end of the current logical link.

If, in test 287, the next source selected is in the addressed mode (NSB=0), the selection of the current call as the next call, shown in sequence 289, is directly executed because the broadcast mode has a higher priority than the addressed mode.

In the broadcast mode all the destinations must select the same source (simultaneously use the same mechanism) in order to avoid the dispersion of the RR which might cause deadlocks or misunderstandings. Certain events, e.g. parity error, may interfere with the selection mechanism and cause a loss of synchronization. In this case the destination loses its ability to select a source in the broadcast mode.

Thus, if the destination has lost synchronization, SYN=0 in test 284, a branch is made to EXIT.

SYNL, ref. 290 (FIG. 34b) is the state in which the destination is desynchronized with reference to the other destinations, which causes the RA to switches to state LOOF (SW→LOOF) in block 291. In this state, the destination executes the following operations. The bit NSB is tested in test 292 and if the next source selected is in the addressed mode (NSB=0), an exit from this sequence is made, because the loss of synchronization presents no problem in the addressed mode for the next logical link. If the next source selected is in the broadcast mode NSB=1, it is reset (RST→NASK), ref. 293, and an exit is made via EXIT.

In the sequence shown in FIG. 34c, the destination tries to resynchronize itself by observing the RR emitted by the synchronized destinations, ref. 294, RRB. Here, if SYN=0 in test 295, and if the destination is in the state of rest RIDLE=1 in test 296, the operations of block 297 are executed.

Block 297

The address of the source selected by the synchronized destinations (known from the transmitted RRB) is stored and becomes the current selected source (LD→CSA), a status bit indicating that the next ASK has been selected (ST→NASK), and the RA switches to state SYN (SW→SYN) after sending a reply RRB. An exit is then made and the resynchronized destination awaits the data from the source.

If the destination is occupied, RIDLE=0 in test 296, it already has a logical link with a source in the addressed mode. In this case a reply RNR is sent to all (RNRB), the RA switches to state SYN (SW→SYN) ref. 298, and an exit made from the sequence. In the case of reception of RRB in synchronous mode, this is ignored by the destination.

Figure 35A:
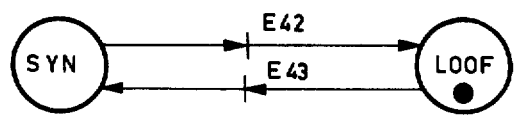
FIGS. 35a and 35b are Petri networks of the reception automat (RA)
Figure 35B:
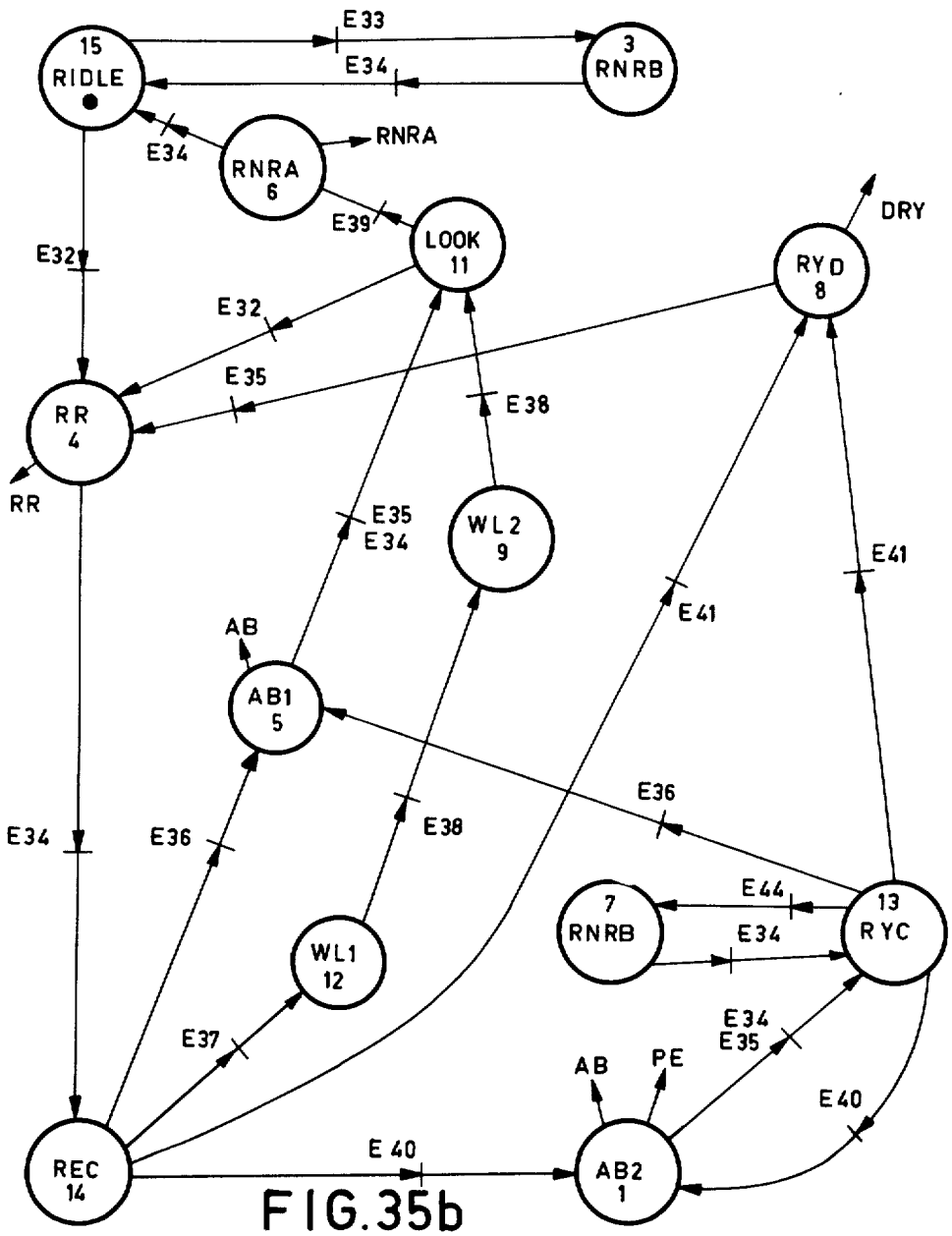

The functioning of the reception automat RA which operates synchronously with the automats of the BIC, BLS, the other automats of the PLA (TPA, TTA and WLA) and TM interface control is shown in the Petri networks of FIGS. 35a and 35b.

The events relative to the RA are defined below.
E32—NASK.PRSZ
E33—PRSZ.BTIMOUT
E34—RWLOK (reception acknowledgment at word level)
E35—RBLOK (reception acknowledgment at block level)
E36—RTIMOUT (watchdog timer)+CIRYNZ
E37—PRSZ (reception packet semaphore)
E38—FCM (reception frequency of a channel or sub frame from the TM)
E39—NASK+PRSZ
E40—SPE (source parity error)
E41—SRYD (retry detection in the source frame)
E42—PE+NASK.PE (PRSZ+RYC)+RTIMOUT
E43—BTIMOUT (watchdog timer)

The signals defining the events are described below:
NASK—next ASK (call)
PRS—semaphore (indicator) of the reception packet. PRS≈0 indicates that the IFIFO is available. PRS=0 (PRSZ) either when a BR is detected and PRSZ is reset, or when a complete packet is received, indicated by EIPT (end of reception packet transfer); here the IFIFO is not available until the BLS reloads the semaphore. PRS is incremented by 1 each time a packet word is received.
BTIMOUT—watchdog timer facilitating the transmission of broadcast RNR to all (RNRB) every $\theta$T when the RA is occupied, i.e. on condition (RIDLE.PRSZ-+RYC), RYC being the retry state. In fact a reply (RNR/RR) is always guaranteed by the destination within 2 $\theta$T.

RWLOK—reception acknowledgement at word level by the WLA in reply to a supervision word from the RA.
RBLOK—reception acknowledgment at block level by the BLS in reply to events from the RA.
RTIMOUT—reception watchdog timer facilitating the detection of an abnormal signal from the source during a logical link.
CIRYNZ—reception retry counter=0.
SPE—detection of a parity error in the source frame.
SRYD—detection of the retry supervision coming from the current source.
RRB—destination ready in the broadcast mode.
SY—synchronization supervision from the source which has not received a reply to a broadcast call (BASK) because some destinations are out of synchronism.
PE—general parity error.

The Petri network of FIG. 35a shows the states of synchronization (SYN) and desynchronization (LOOF) of the RA, as described with reference to FIG. 34. The switches between these states is controlled by events E42 and E43. If the destination is out of synchronism, the RA is in state LOOF ("LOOK FOR") where synchronization is sought. The destination is resynchronized on E43, either by observing the synchronized destinations (RRB), or by a synchronization supervision (SY) issued by the source, and the automat switches to state SYN. In this state, the destination may lose its synchronism on the appearance of E42 (which comprises several conditions, e.g. parity error, abnormal silence of the source, etc.), causing the automat to switch to state LOOF.

The Petri network of FIG. 35b shows the evolution of the RA in state SYN. If the RA is in the idle state 15 RIDLE, which has the token (.), the appearance of E33 (semaphore≈0 and clock BTIMOUT activated) causes the RA to switch to state 3 RNRB. In this state the RA is occupied and emits RNRB (broadcast) every $\theta$T. Event E34 causes the RA to switch to state 15 RIDLE. The RA switches from state RIDLE into state 4 RR where a reply RR is sent to the source on the appearance of E32 (next call and semaphore≈0).

The acknowledgment from the WLA (E34) causes the RA to switch to reception state 14 REC and in this state the words of the incoming packet are loaded into the IFIFO.

The RA switches to waiting state 12 WL1 on the appearance either of E37 (semaphore=0) or an EIPT (end of packet transfer), or a BR received from the source. In state 14 REC, the last word of the packet is loaded into the IFIFO with EIPT on receipt of a BR. States 12, WL1 and 9, WL2 introduce a delay making it possible for the last word received to pass through the IFIFO in order to have the time to reinitialize PRS before switching to analysis state 11 LOOK via E38. The RA switches to state 12 WL1 on E37, and state WL2 on E38.

There are several possibilities in the state LOOK. If 32 appears (NASK and semaphore≠0), the NASK becomes the selected current call and RR is sent to the source, while the RA switches to state 4 RR, where the reception sequence for the next packet may be executed. If the semaphore PRSZ=0, an occupied state is indicated where there is no next call $\overline{\text{NASK}}$ (E39). In this case, the RA switches to state 6 RNRA where BR is validated to the source by RNRA, with the RA switching to state 15 RIDLE on the reply from the WLA (E34).

On the detection of a parity error in the source frame SPE (E40) in the packet reception state REC, the RA switches to state 1 AB2 where a supervision AB is sent to the source, and an event PE (parity error) is sent to BLS. On receipt of the replies RWLOK and RBLOK (E34, E35), the RA switches to state 13 RYC which is the retry state. In this state the RA awaits E41, the detection of the retry supervision (SRYD) coming from the source, before switching to state 8 RYD (packet recovery). In state RYD, an RY detection event (DRY) is sent to the BLS. On receipt of RBLOK (E35), the RA switches to state 4 RR, a reply RR is sent to the source and on receipt of RWLOK (E34) from the WLA the RA switches to state 14, REC where the packet recovery is executed. The detection of each parity error (E40) in state RYC causes the automat to switch to state AB2. The retry counter is updated each time and when it reaches O (CIRYNZ), the communication is abandoned and the BLS and the SIP are informed of the impossibility of reception, with the RA switches to state LOOK via state 5 AB1.

If, in state 14 REC or state 13 RYC an abnormal silence on the part of the source is detected (E36), the RA switches to state 5 AB1 where a supervision AB (abort) is sent to the BLS. On the appearance of events E34/E35, the RA switches to state LOOK where the next path is selected in relation to the analysis made.

If the RA is in retry state 13 RYC at the end of each θT (E44), is automatically switches to state 7 RNRB where a reply RNRB is sent to all, i.e. at the end of every θT. The RA again switches to state RYC on receipt of reply RWLOK (E34) from the WLA.

In state 14 REC, on receipt of a supervision RY (E41), the automat switches to state 8 RYD in order to recover an incomplete packet.

Figure 36:
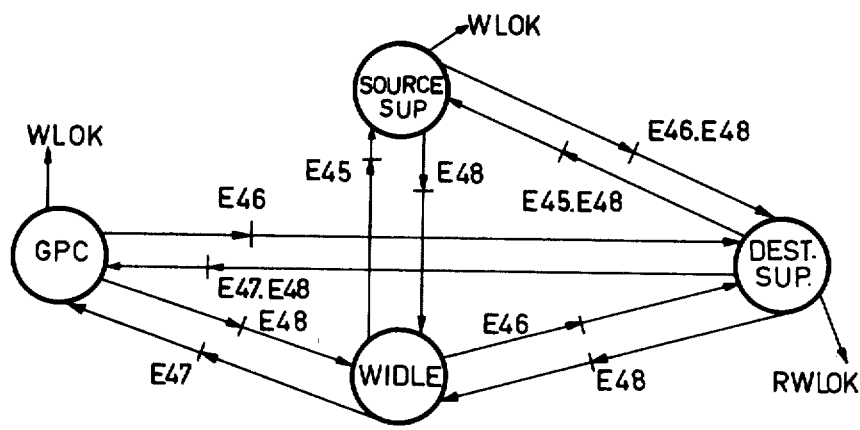
FIG. 36 is a Petri network of the word level automat (WLA)

The Petri net of the word level automat WLA is shown in FIG. 36 and the events relative to the WLA are defined below.

E45 = ASK + RY + WORD + SY + BR + TW (coming from the TPA)

E46 = RRA + RRB + RNR + AB (coming from the TTA)

E47 = GCP (coming from the BLS via OFIFO)

E48 = TMEM: TM Emission, acknowledgment of a reply implicit in order RTS from the CM.

All the conditions comprising the above events have already been defined.

It is the WLA's responsibility, on a request from the TPA or the RA, to load the appropriate channels with the transmission information (data or supervision) or the reception information (supervisions) needed to control the bi-directional logical links ("full duplex"). The reception supervisions have higher priority than transmission supervisions.

The WLA is in the idle state WIDLE which has the token (.). On appearance of E45, which may be a supervision word or data from the TPA, the WLA switches to state SOURCE SUP, in which the request from the source is executed (e.g. a call ASK loaded into the source channel) and an acknowledgment WLOK sent to the TPA. On the receipt of E48 (TM Emission, acknowledgment), the WLA switches to state WIDLE.

The WLA switches from the state WIDLE to the state DEST SUP on request (E46) from the RA. In the state DEST SUP, the request from the RA is executed and an acknowledgment RWLOK sent to the RA, while the WLA switches to the state WIDLE on receipt of E48. If, in state RIDLE, the WLA receives simultaneous requests from the TPA and the RA (E45, E46), is switching to state DEST SUP as the requests from the RA have a higher priority. In this case, after executing the request from the RA, the WLA switches to state SOURCE SUP on receipt of E48 (conditions E45, E48), if, in state SOURCE SUP, a request appears from the RA (E46), the next evolution of the WLA will be to state DEST SUP (conditions E46, E48).

The WLA may switch, to state GPC (state of execution of a general purpose command received from the BLS) from state WIDLE on receipt of E47 or state DEST SUP on receipt of the consecutive events E47, E48. In this state, an acknowledgment WLOK is sent to the BLS, while the WLA switches to state WIDLE on receipt of E48 or to state DEST SUP on receipt of E46.

Figure 37:
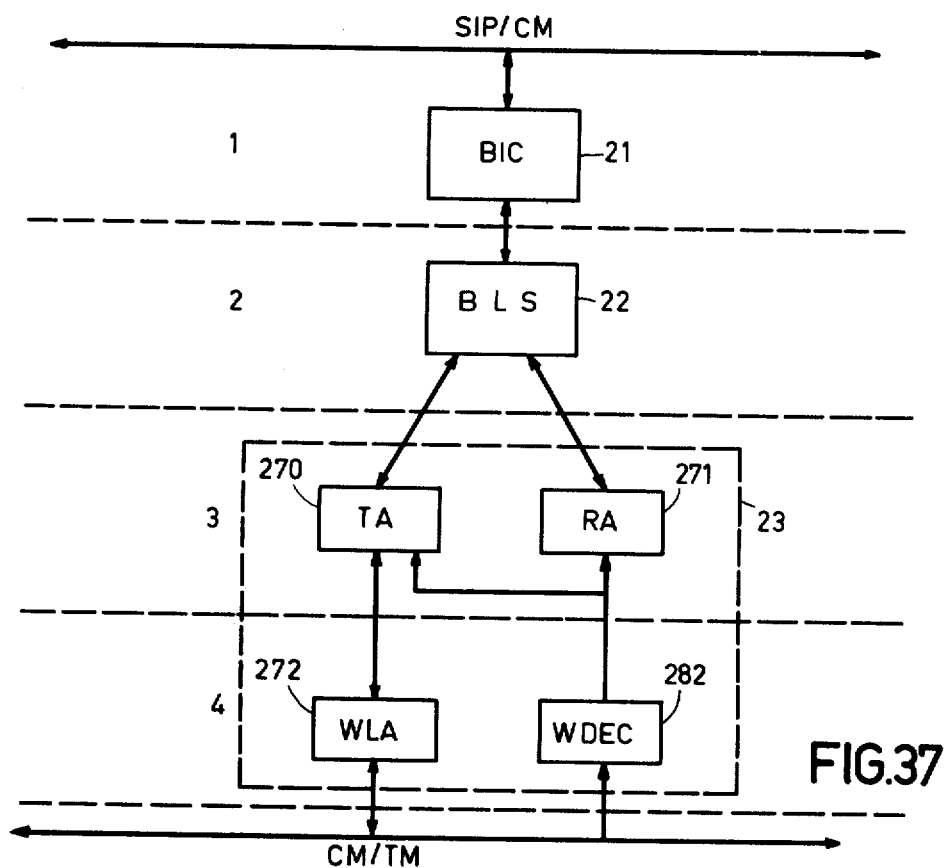
FIG. 37 is a synoptic diagram of the CM's monitoring system.
Figure 36:
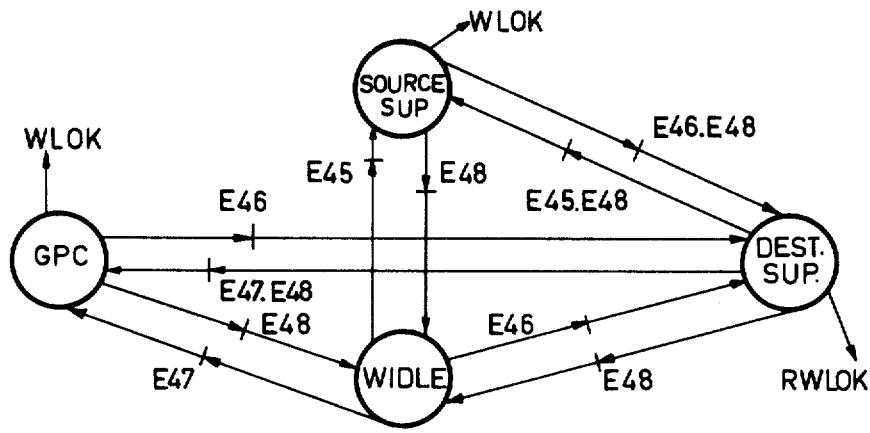
Figure 37:
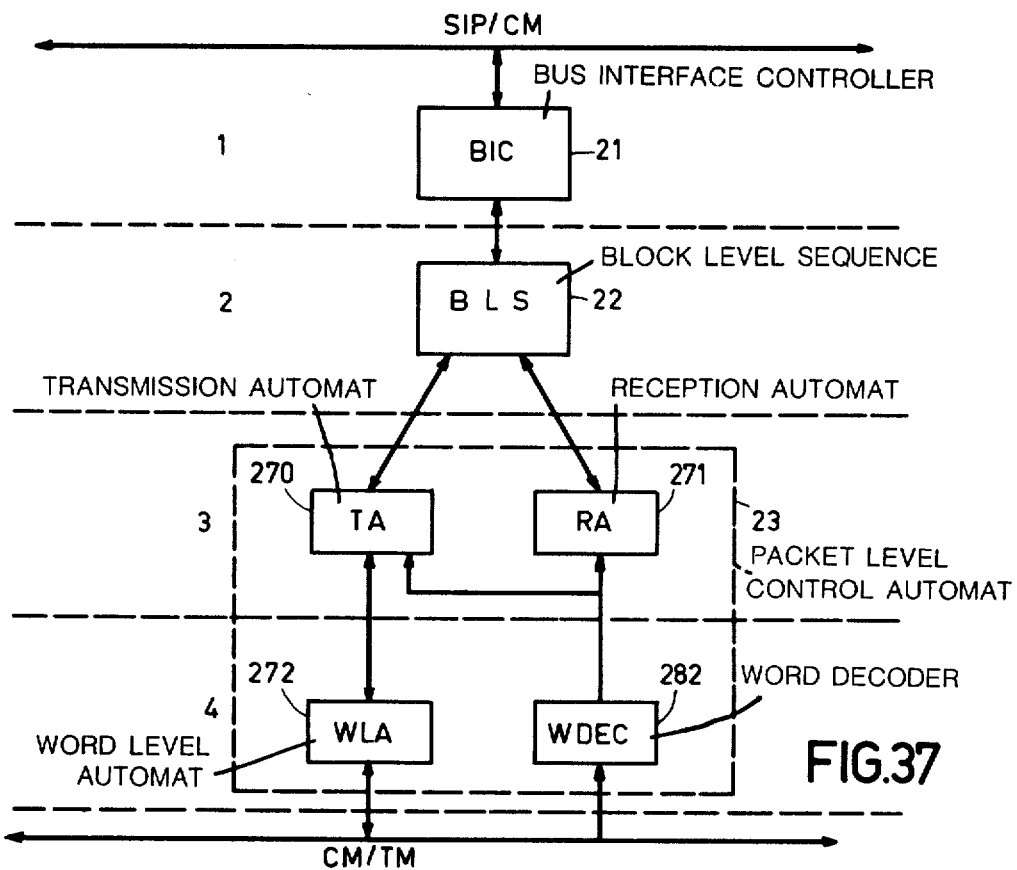

FIG. 37 is a synoptic diagram of the CM from the control viewpoint. At level 1 (BIC), the physical interface SIP/CM is controlled by BIC 21. At level 2 (block), the direct bi-directional access ("full duplex") of the input/output buffers of the SIP, the control in the event of retries and faults and the division of the block into packets are performed by BLS 22. At level 3, (packet), the communications protocols are controlled by TA 270 and RA 271 or PLA 23. At level 4 (word) the various output and input words and the CM/TM physical interface are controlled by WLA 272 and WDEC 282 or PLA 23. The arrows show the directions of control and communication between the various components and levels. At each level, specific events define the communication with the upper and lower level.

Figure 38:
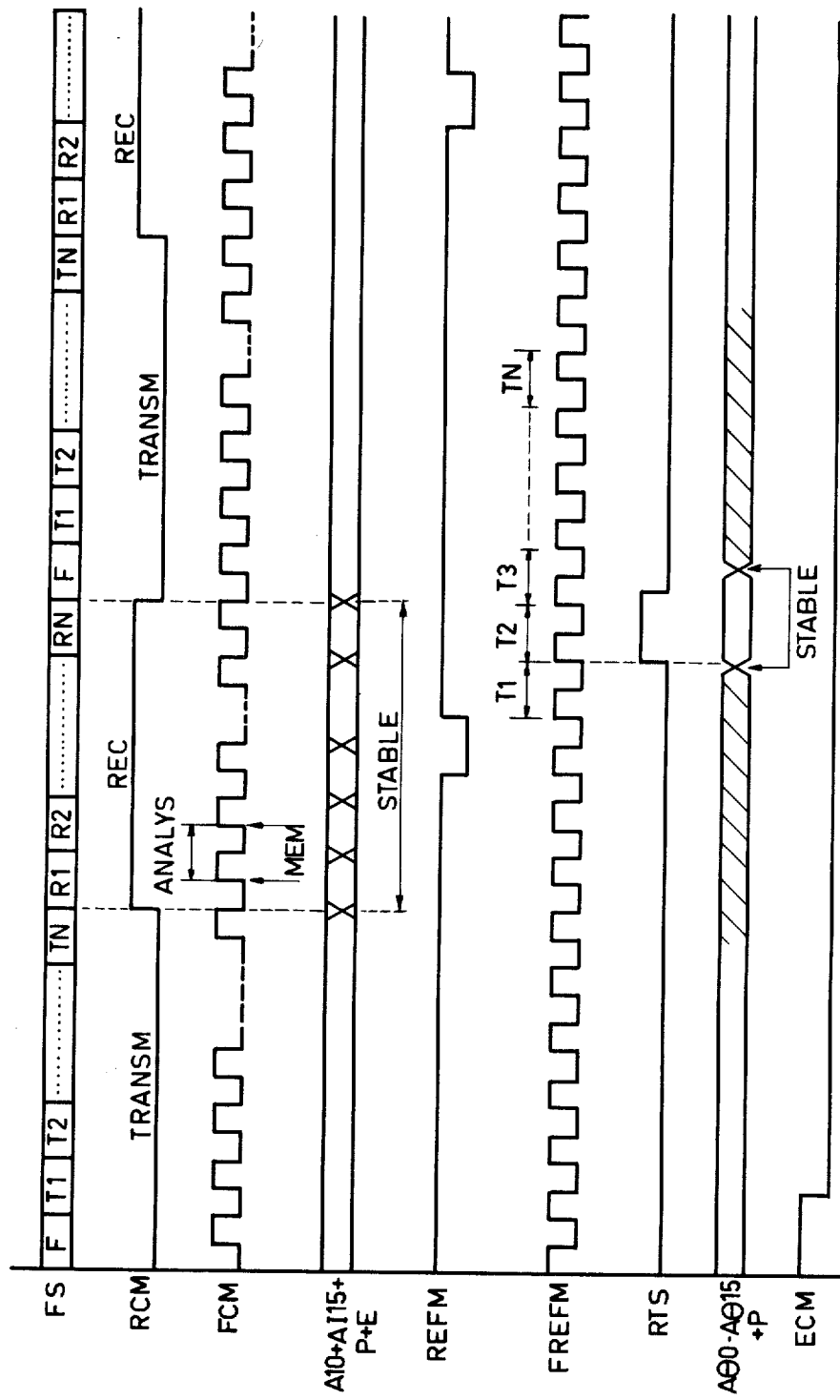
FIG. 38 is a synchronisation diagram of the interface between the CM and the transport module (TM).

FIG. 38 is a synchronization diagram of the CM/TM interface. The frames and subframes or channels in a frame (FS) are provided by the TM. Each frame (F) consists of N output subframes (T1, T2 ... TN) and N input subframes (R1, R2 ... RN) where N depends upon the number of LS linked to the communications network.

Initialization phase

The initialization phase (synchronization and insertion of the data in the right channel or subframe) is signaled by ECM (end of insertion) coming from TM, which is reset as soon as the TM is operational. When the TM is no longer operational (incorrect insertion or desynchronization), the event NOTOP already described appears, ECM is set to 1 and information on the state of TM is sent to the SIP.

Data reception phase

This phase is indicated by the signal RCM = 1 from the TM. During this phase, all the words received are stored in a D-type register of the WDEC 282 on the leading edge of FCM (reception clock coming from the TM) and analyzed until the next leading edge (address, code, etc.). The incoming data from the TM consists of 18 bits (16 data bits AOO to A15 + 1 parity bit P + 1 bit specifying the presence or absence of an error E).

Data transmission phase

The TM supplies the CM with a reference pulse REFM making it possible to prepare the data in advance in order to transmit them in the subframe selected by the CM (3 subframes in advance). The CM may use several non-consecutive subframes depending on a fixed allocation made at each CM. Depending on the subframes allocated to the CM, the latter may send a request to transmit (RTS) in order to transmit its words which must be stable during RTS. The TM performs the transmission by a transmission clock FREFM. The output data from the CM consists of 17 bits (16 data bits AOO to AO15+1 parity bit P). FIG. 38 shows the transmission of the data in subframe T2 by way of example. The division of a frame (F) into transmission and reception phases allows all the LSs wishing to communicate to transmit within their own subframes during the transmission phase and then the TM retransmits the same information during the reception phase allowing all the LSs to receive the communications intended for them. During the transmission phase, the WLA 272 is responsible for synchronization, i.e. the generation of RTS and the stability of the data. During the reception phase, WDEC 282 stores and analyzes the incoming words.

APPENDIX I

Physical Interface SIP/CM

| Type of wire | Number of wires | Description | Name | Source | Dest. | Function |
|---|---|---|---|---|---|---|
| address | 16 | address lines | ADRON-ADREN | SIP | SIP | addressing |
| control | 1 | bus synchronization | BULKN | SIP | SIP CM | synchronization |
| control | 1 | bus priority input | BPRNN | SIP CM | or SIP | selection of next master |
| control | 1 | bus priority output | BPRON | SIP | SIP or CM | selection of next master |
| control | 1 | bus request | BREQN | SIP | control of bus | request for bus |
| control | 1 | bus busy | CBUSYN | SIP CM | SIP CM | control of bus |
| control | 1 | communication module interruption | CMITN | XM | SIP | interruption |
| data | 16 | data bus | DATON DATFN | SIP CM | SIP CM | data bus |
| control | 1 | initialization | INITN | SIP | CM | initialization |
| control | 1 | I/O READ command | IORON | SIP | CM | exchange sync. signal |
| control | 1 | I/O WRITE command | IOWON | SIP | CM | exchange sync. signal |
| control | 1 | READ store command | MRDON | CM | SIP | exchange sync. signal |
| control | 1 | WRITE store command | MWTON | CM | SIP | exchange sync. signal |
| control | 1 | XFER acknowledge | XACKN | CM SIP | SIP CM | exchange sync. signal |

APPENDIX II

Physical interface CM/TM

| N° of wires | Description | Name | Source | Destination | Function |
|---|---|---|---|---|---|
| 16 | Reception, data (address, command, data). | AI0-AI15 | TM | CM | Command or data |
| 1 | Parity bit | P | TM | CM | Control reception parity errors |
| 1 | Error bit | E | TM | CM | Indicates an error on the network |
| 16 | Transmission data (address, command, data). | AØ0-AØ15 | CM | TM | Command or data |
| 1 | Parity bit | P | CM | TM | Control of transmission parity errors |
| 1 | Signal indicating reception phase. | RCM | TM | CM | Permits SL to receive data |
| 1 | Reception clock | FCM | TM | CM | Storage of data in CM |
| 1 | Reference pulse | REFM | TM | CM | Advance preparation of data to be transmitted (synchronization). |
| 1 | Request to send | RTS | CM | TM | Request to transmit in a transmission scale |
| 1 | Transmission frequency | FREFM | TM | CM | Clock provided by TM for transmission of data |

What is claimed is:

1. A distributed data processing sytem comprising a general, passive, communications network, a plurality of local systems which each include at least one central processing unit, a memory connected to said processing unit and associated thereto, at least one peripheral device, and at least one residential process, wherein the control of the data processing in each local system is distributedly effected by the local system itself, wherein each local system is interfaced to the network by a systems intercommunication processing means, the set of intercommunications processing means constituting a distributed coordination, communication and control means for the data processing system as a whole, each systems intercommunication processing means being attached to the network by a communication module, the set of communication modules constituting a distributed control means for controlling communication protocols on the network for the data processing system as a whole, each communication module having:

> sequencing means for controlling in the communication protocols in a first sequence of steps an addressed logical link from a source local system to a single destination local system and for controlling in a second sequence of steps a broadcast logical link from a source local system to one or more destination local systems, said first and second sequences comprising:
>> conditionally executable logical link establishing steps, comprising for each addressed and broadcast logical link an inherent priority level signalization;
>> logical link maintaining steps;
>> logical link closing steps;
>> logical link breaking steps;
>> error detection steps for detecting an erroneous transmission and thereupon retrying the erroneous transmission up to a predetermined maximum number of retries,
>> logical link cancelling steps;
>> in a source station said second sequence including a supervision word (BASK) sending step for calling all stations connected to the network to function as a destination stations in said sequence;
>> in a destination station said first sequence including an addressed link selecting step for selecting a single addressed link upon coexistence of at least two establishing steps of first sequences both addressing the latter destination station as based on the associated priority level signalizations;
>> in a destination station said second sequence comprising a broadcast mode selecting step for selecting a single broadcast link upon coexistence of at least two establishing steps of one said second sequence and at least one further first and/or second sequences all addressing the latter destination station as based on associated priority level signalizations;
>> in a destination station said second sequence including a synchronization step for synchronizing the destination station in question to detect the same network sequence of steps for preventing a dispersion of the prevailing broadcast logical link;
>> in a destination station said second sequence including a conditionally executable resynchronization step for detecting upon loss of synchronization signals emanated from further destination stations for resynchronizing thereto the detecting station;
>> in a destination station said first and second sequences including conditionally executable steps for defining after the start of the establishing step associated to the logical link in question a duration (T) during which positive or negative replies of a destination station are guaranteed, but for granting after said duration a next logical link as based upon priority level signalization in thereupon executed steps, said duration having a modifiable value.

2. A distributed data processing system as claimed in claim 1 wherein in a source station the establishing step of said first sequence includes a supervision word sending step (AASK) to the addressed destination upon local availability of a complete information packet, while in the destination station said establishing step includes a priority selecting step among all addressed and braodcast calls received and thereupon generating a positive reply (RRA) to the detected source station if the destination station is ready to receive, but generating a negative reply (RNRA) to any non-selected station and also if the destination station is not ready to receive; wherein a positive reply to a source station includes signalization implying a negative reply to any other source station.

3. A distributed data processing system as claimed in claim 1, wherein in a source station in a first or second sequence said logical link breaking step includes a break supervision word (BR) sending step upon completed transmission of a message or unreadiness to transmit the next information packet;

> wherein in a destination station in a first sequence said logical link breaking step includes sending a reply (RNRA) to the source station for signalling a non-selected situation or unreadiness to receive the next following information packet;
> wherein in a destination station in a second sequence said logical link breaking step includes sending a reply (RNRB) to the source station signalizing a transition to a different second sequence initialized by a higher priority source station;
> wherein in a source station in a first or second sequence after execution of a breaking step in case of incomplete transmission of the current message includes a retrying step for the broken off logical link, but for abandoning the logical link upon the number of retries reaching an excessive value.

4. A distributed data processing system as claimed in claim 3, wherein, in a source station in a first or second sequence said logical link cancelling step includes during a closing step of the associated logical link detecting an error signalling abort supervision word (AB) from at least one destination station and thereupon repeating its most recently sent supervision word (ASK or BR) either until correctly closing the logical link in question, but for abandoning the logical link upon the number of repetitions reaching an excessive value while still receiving any abort supervision word; and during a maintaining step of the associated logical link detecting an error signalling abort supervision word (AB) from at least one destination station and thereupon repeating its most recently sent information packet accompanied by a retry supervision word, either until correct transfer is signalled by the relevant destination station(s) after switchover thereof to a recovery step, but for abandoning the logical link upon the number of repetitions reaching an excessive value while still receiving any abort supervision word;

and in a destination station in a first or second sequence said logical link breaking step includes detecting a silence condition from a source station for at least a time (OR) and thereupon sending an abort supervision word to the source station in question.

5. A distributed data processing system as claimed in claim 1, wherein in a source station the establishing step of said second sequence includes a waiting step during said interval (T) and thereafter, upon exclusively receiving positive reply signalizations (RRB) of destination stations transmitting a first message packet over the network; but upon receiving at least one negative reply signalization (RNRB) accessing a connection table for retrieving therefrom control data; said control data selectively controlling (a) in a non-waiting mode transferring a first message packet on the network upon at least one received positive reply signalization (RRB);

(b) in a waiting mode waiting while retrying said supervision word (BASK) sending until receiving exclusively positive replies and thereupon transmitting a first message packet on the network;

(c) but abandoning the logical link upon the number of retries reaching an excessive value.

6. A distributed data processing system as claimed in claim 5, wherein in a source station in a first or second sequence after said establishing step, said maintaining step includes a transmitting step of a next information packet upon receiving only positive replies from any linked destination station (RRA or RRB) if the preceding packet is not the last packet of the message, but on receiving at least one negative reply from a linked station:

(a) in the non-waiting mode upon reception of at least one positive reply transmitting said next information packet on the network;

(b) in the waiting mode waiting while retrying said supervision word (BASK) sending until receiving exclusively positive replies and thereupon transmitting said next information packet on the network;

(c) but abandoning the logical link upon the number of retries reaching an excessive value.

7. A system as claimed in claim 1, characterized in that said types of logical links also comprise the unidirectional addressed logical link between a source (Si) and a destination (Dj); the bi-directional addressed logical link (Si) and (Dj) and (Sj) and (Di) between two of said communications modules (CMi) and (CMj); the multiple bi-directional logical link between several communication modules (CMi), (CMj), (CMk); the simultaneous addressed logical links (Si) and (Dj), (Sj) and (Dk), (Sk) and (Di), and the broadcast logical link between a source (Si) and all the destinations connected to said communications network.

8. A system as claimed in claims 7 or 5, wherein each communication module (CM) comprises (a) an interface controller (BIC) having a first microprogrammed control automat for interfacing to the associated systems intercommunications processor, by means of bidirectional direct access to an attached systems intercommunications processor;

(b) a block level sequencer (BLS) having a second microprogrammed control automat for controlling said first and second sequences on the level of an information block;

(c) a packet level control automat (PLA) for dividing an information block received into at least one information packet of at most a predetermined size and for receiving and/or transmitting information packets via a logical link and for retransmitting a packet upon detection of a fault, furthermore comprising a transmission control automat (TA), a reception control automat (RA), a word level control automat (WLA) and a word decoder (WDEC).

9. A system as claimed in claim 8, characterized in that said CM also comprises stores of the FIFO type, the first (OFIFO) to store the output packets, the second (IFIFO) to store the input packets, each of said FIFO being capable of storing at least one of said packets; a group of random access registers (SP) to store the command parameters relating to the connections and transfers of said logical links; a random access store to store the parameters relating to the connection table (CT); three counters respectively defining the parameters θT, θR and the packet reception semaphore (PRS); a specialized arithmetic unit (AU) to perform operations on the address and length parameters relating to the packets; a store (PROM) for storing the command field of the supervision words; a first register (OMB) for the temporary storage of the data from said (SIP); a second store (IMB) for temporarily storing the data intended for said (SIP); a third register (SIPAD) specifying the address of the buffer of said (SIP); a fourth register (SAD) defining the source address; a fifth register (DAD) defining the destination address in the addressed mode; a sixth register (DPL) defining the priority level of the output communication; a seventh register defining the value of the reception watchdog timer (RTV), logic circuits ensuring the compatibility of interfaces with said (SIP) and the transport module (TM), said components being linked via the internal buses of the CM and the special connections, the control of said components being performed by the synchronized microcommands of said (BIC), said (BLS) and said (PLA).

10. A system as claimed in claim 9, characterized in that said (BIC) also comprises an (FLPA) linked to a state register, itself linked to a microprogrammed (PROM) and reconnected to said (FPLA), the microcommands stored in said PROM being selected as a function of the state of said (FPLA), the state of said (FPLA) being related to the events coming from said (BLS) and the SIP/CM interface, and the selected microcommand of said (PROM) being send to said BLS and said SIP/CM interface, said (BIC) comprising means, on a request from said BLS, to transmit an interrupt to said (SIP) and to control said interface with said SIP for direct access; means on requests from said (SIP) to execute said requests by loading said (OMB) via said (SIP/CM) interface for a write request, and by transmitting the content of said (IMB) via said (SIP) for a read request; and means for synchronization said (BLS) at the end of each event relative to said (BIC).

11. A system as claimed in claim 9, characterized in that said (BLS) also comprises a state sequencer linked to a microprogrammed (PROM) comprising said control sequences for said protocols and linked to a first (FPLA) comprising the starting addresses of said sequences, said state sequencer comprising a second (FPLA) linked to a state register connected to said second (FPLA) evolving as a function of its current state, and the microcommand of said (PROM), the control sequence of said (PROM) being selected as a function of the evolution of said state sequencer in combination with the events coming from said (BIC) or said (PLA), or the unconditional events defined by said sequencer, or the conditional events defined by a conditional test performed in a branch address register.

12. A system as claimed in claim 11, characterized in that said control sequences of said protocols also comprise; sequence 1 for loading the parameters relating to a data block for transmission into said (SP) and said (CT); sequence 2 for loading the starting address of the next block to be transmitted into said (SP) and for starting the transmission of said current block; sequence 3 for initializing the transmission of said current block; sequence 4 for dividing said current block into packets for loading into said OFIFO and to request said (PLA) to transmit the first packet of said current block; sequence 5 to load the number of retries to be made if the transmission request is not accepted; sequence 6 to request the retransmission of the packet on the receipt of RNR from the destionation(s) if, after decrementation said retry parameter is not zero and to inform said (SIP) if said retry parameter reaches zero; sequence 7, to load the value of the emission watchdog timer into said counter ($\theta$T) if nothing is received from the destination(s) relative to a call during $\theta$T; sequence 8 to retry said transmission on the detection of a transmission fault if the retry parameter (CORYN) after decrementation is not zero and to inform said (SIP) if said parameter (CORYN) is zero; sequence 9 to inform said (SIP) of the transmission of said packet without fault; sequence 10 either to retransmit a packet, or to abandon it and inform said (SIP) if said parameter (CORYN) is zero after decrementation; sequence 11 to inform said SIP if the communications network is not operational; sequence 12 to load a command (GCP) into said (OFIFO); sequence 13 to update said (CT); sequence 14 to load the starting address of an input block into said SIP; sequence 15 to initialized the parameters relative to the input block; sequence 16 to assemble the input packets in said (IFIFO) and load them into the allocated buffer of said (SIP); sequence 17 to decrement the retry parameter (CIRYN) on detection of a parity error either by switching to the retry state if said CIRYN is not zero, or to inform said (SIP) if said parameter (CIRYN) is at zero; sequence 18 to update the retry and recovery parameters on detection of a parity error; sequence 19 to inform said (SIP) on the detection of an abnormal silence on the part of the source; sequence 20 on detection of a retry request from the source to assemble said packet in said (IFIFO) and to load them into the allocated buffer of said (SIP); sequence 21 to inform said SIP when the communications network is inoperational in reception mode; the sequence of execution of said control sequences being a function of the state of said (BLS) state sequencer and of events from said (BIC) and (PLA).

13. A system as claimed in claim 9, characterized in that said (PLA) comprising said (TA), said (RA), said (WLA) and said (WDEC) also comprises means for permitting said TA to control the transmission of the packet by a first part (TPA), and to analyze the supervision words and the synchronizations coming from the destinations by a second part (TTA); means allowing said RA to select the sources and receive said packets; means allowing said (WLA) to transmit words of different types into the appropriate channels, said words coming from said (TA) and said (RA); means allowing said WDEC to decode words coming from said (TM), said (WDEC) sending said decoded words to said (TA) and said (RA).

14. A system as claimed in claim 13, characterized in that each of said control automats (TA), (RA) and (WLA) also comprise an (FPLA) linked to a state register, itself connected to a microprogrammed (PROM) and reconnected to the input of said (FPLA), the microcommands stored in said (PROM) being selected as a function of the state of said (FPLA), the state of said (FPLA), of said (TA) being a function of the events received from said (WDEC), (BLS) and (WLA), and the selected microcommand of said (PROM) of said (TA) being sent to said (BLS) and (WLA); the state of said (FPLA) of said (RA) being a function of the events coming from said (BLS), (WLA) and (WDEC), and the selected microcommand of said (PROM) of said (RA) being sent to said (BLS) and (WLA); the state of said (FPLA) of said (WLA) being a function of the events coming from said (TA) and (RA), and the selected microcommand of said (PROM) of said (WLA) being send to said (TA), (RA) and (TM).

* * * * *